United States Patent
Ouchi et al.

(10) Patent No.: US 10,959,193 B2
(45) Date of Patent: Mar. 23, 2021

(54) TERMINAL DEVICE, BASE STATION DEVICE, AND METHOD

(71) Applicant: SHARP KABUSHIKI KAISHA, Sakai (JP)

(72) Inventors: Wataru Ouchi, Sakai (JP); Toshizo Nogami, Sakai (JP); Kazuyuki Shimezawa, Sakai (JP); Kimihiko Imamura, Sakai (JP); Naoki Kusashima, Sakai (JP); Alvaro Ruiz Delgado, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/501,569

(22) PCT Filed: Aug. 4, 2015

(86) PCT No.: PCT/JP2015/072065
§ 371 (c)(1),
(2) Date: Feb. 3, 2017

(87) PCT Pub. No.: WO2016/021588
PCT Pub. Date: Feb. 11, 2016

(65) Prior Publication Data
US 2017/0230917 A1    Aug. 10, 2017

(30) Foreign Application Priority Data

Aug. 4, 2014    (JP) .............................. JP2014-158780

(51) Int. Cl.
*H04W 52/36*    (2009.01)
*H04W 16/32*    (2009.01)
(Continued)

(52) U.S. Cl.
CPC ......... *H04W 52/367* (2013.01); *H04L 1/1812* (2013.01); *H04L 5/0055* (2013.01);
(Continued)

(58) Field of Classification Search
CPC ..... H04L 1/1812; H04L 43/16; H04L 5/0055; H04W 16/32; H04W 52/367;
(Continued)

(56) References Cited

U.S. PATENT DOCUMENTS 9,319,194 B2 *   4/2016   Dinan .................... H04L 5/0007
9,686,817 B2 *   6/2017   Heo ...................... H04W 76/048
(Continued)

OTHER PUBLICATIONS

"3GPP TS 36.213 V11.2.0 (Feb. 2013): 3rd Generation Partnership Project; Technical Specification Group Radio Access Network; Evolved Universal Terrestrial Radio Access (E-UTRA); Physical layer procedures (Release 11)", 3GPP Organizational Partners, 2013, 173 pages.
(Continued)

*Primary Examiner* — Dung B Huynh
(74) *Attorney, Agent, or Firm* — Birch, Stewart, Kolasch & Birch, LLP

(57) ABSTRACT

Provided is a transmission unit that, if transmission of a PUCCH of a first CG overlaps transmission of a PUSCH and/or a PUCCH of a second CG in a certain subframe and UCI including HARQ-ACK is transmitted on the PUCCH of the first CG, upon transmit power of the PUCCH of the first CG exceeding a first upper limit value, performs scaling on the transmit power of the PUCCH of the first CG such that the transmit power of the PUCCH does not exceed the first upper limit value, and upon the transmit power of the PUCCH of the first CG not exceeding the first upper limit value, sets the transmit power of the PUCCH of the first CG to power required for the PUCCH of the first CG.

2 Claims, 10 Drawing Sheets

US 10,959,193 B2

Page 2

(51) Int. Cl.
*H04W 52/38* (2009.01)
*H04W 52/30* (2009.01)
*H04W 52/14* (2009.01)
*H04W 52/34* (2009.01)
*H04W 72/04* (2009.01)
*H04L 1/18* (2006.01)
*H04L 5/00* (2006.01)
H04L 12/26 (2006.01)
H04W 88/02 (2009.01)

(52) U.S. Cl.
CPC ......... *H04W 16/32* (2013.01); *H04W 52/146* (2013.01); *H04W 52/30* (2013.01); *H04W 52/34* (2013.01); *H04W 52/38* (2013.01); *H04W 72/04* (2013.01); *H04W 72/0413* (2013.01); *H04L 43/16* (2013.01); *H04W 72/0473* (2013.01); *H04W 88/02* (2013.01)

(58) Field of Classification Search
CPC ......... H04W 72/0413; H04W 72/0473; H04W 88/02; H04W 52/146
See application file for complete search history.

(56) References Cited

U.S. PATENT DOCUMENTS

| | | | |
|---|---|---|---|
| 9,900,844 B2 * | 2/2018 | Papasakellariou | H04W 52/367 |
| 2003/0108013 A1 * | 6/2003 | Hwang | H04W 52/146 370/335 |
| 2003/0112786 A1 * | 6/2003 | Terry | H04W 52/262 370/342 |
| 2005/0265292 A1 * | 12/2005 | Atsuta | H04W 52/34 370/335 |
| 2010/0034114 A1 * | 2/2010 | Kim | H04L 1/0026 370/252 |
| 2010/0041428 A1 * | 2/2010 | Chen | H04W 52/146 455/522 |
| 2010/0054147 A1 * | 3/2010 | Ishii | H04L 1/1671 370/252 |
| 2010/0118805 A1 * | 5/2010 | Ishii | H04W 52/367 370/329 |
| 2010/0195575 A1 * | 8/2010 | Papasakellariou | H04W 36/385 370/328 |
| 2010/0331037 A1 * | 12/2010 | Jen | H04L 1/1887 455/522 |
| 2011/0038271 A1 * | 2/2011 | Shin | H04W 52/08 370/252 |
| 2011/0081936 A1 * | 4/2011 | Haim | H04W 52/367 455/522 |
| 2011/0141928 A1 * | 6/2011 | Shin | H04L 1/0028 370/252 |
| 2011/0249818 A1 * | 10/2011 | Sawada | H04W 52/10 381/2 |
| 2011/0287804 A1 * | 11/2011 | Seo | H04W 52/146 455/522 |
| 2012/0034927 A1 * | 2/2012 | Papasakellariou | H04L 1/1861 455/450 |
| 2012/0044882 A1 * | 2/2012 | Kim | H04W 72/0473 370/329 |
| 2012/0058797 A1 * | 3/2012 | Gaal | H04W 52/44 455/522 |
| 2012/0178494 A1 * | 7/2012 | Haim | H04W 52/365 455/522 |
| 2012/0188947 A1 * | 7/2012 | Larsson | H04W 52/146 370/328 |
| 2013/0114505 A1 * | 5/2013 | Haim | H04W 52/0216 370/328 |
| 2013/0176953 A1 * | 7/2013 | Stern-Berkowitz | H04W 52/146 370/329 |
| 2013/0188580 A1 * | 7/2013 | Dinan | H04W 52/281 370/329 |
| 2013/0201841 A1 * | 8/2013 | Zhang | H04W 72/04 370/252 |
| 2013/0215811 A1 * | 8/2013 | Takaoka | H04W 52/367 370/311 |
| 2013/0215849 A1 * | 8/2013 | Heo | H04W 52/365 370/329 |
| 2013/0265981 A1 * | 10/2013 | Yang | H04W 52/146 370/329 |
| 2013/0272229 A1 * | 10/2013 | Dinan | H04W 52/367 370/329 |
| 2013/0272231 A1 * | 10/2013 | Dinan | H04W 52/34 370/329 |
| 2013/0279433 A1 | 10/2013 | Dinan | |
| 2014/0029586 A1 * | 1/2014 | Loehr | H04W 56/0005 370/336 |
| 2014/0056258 A1 * | 2/2014 | Xu | H04W 52/367 370/329 |
| 2014/0092865 A1 * | 4/2014 | Heo | H04W 4/70 370/331 |
| 2014/0119313 A1 * | 5/2014 | Yang | H04W 74/0833 370/329 |
| 2014/0192738 A1 * | 7/2014 | Nam | H04L 5/001 370/329 |
| 2014/0348078 A1 * | 11/2014 | Kim | H04W 52/146 370/329 |
| 2014/0349701 A1 * | 11/2014 | Vajapeyam | H04W 52/34 455/522 |
| 2014/0369324 A1 * | 12/2014 | Lin | H04W 52/146 370/336 |
| 2015/0036566 A1 * | 2/2015 | Blankenship | H04W 52/281 370/311 |
| 2015/0078286 A1 * | 3/2015 | Kim | H04L 1/18 370/329 |
| 2015/0208366 A1 * | 7/2015 | Papasakellariou | H04W 74/0833 370/311 |
| 2015/0245344 A1 * | 8/2015 | You | H04J 11/00 370/280 |
| 2015/0271765 A1 * | 9/2015 | Hakola | H04W 52/34 370/329 |
| 2015/0282102 A1 * | 10/2015 | Kakishima | H04W 52/40 370/328 |
| 2015/0312866 A1 * | 10/2015 | Kakishima | H04W 52/265 370/328 |
| 2015/0327243 A1 * | 11/2015 | Yin | H04L 5/001 370/329 |
| 2015/0341864 A1 * | 11/2015 | Yang | H04W 52/50 455/522 |
| 2015/0341865 A1 * | 11/2015 | Yang | H04W 52/146 455/522 |
| 2015/0358924 A1 * | 12/2015 | Papasakellariou | H04W 72/0406 370/329 |
| 2015/0358960 A1 * | 12/2015 | Zhang | H04L 5/0035 455/450 |
| 2016/0014702 A1 * | 1/2016 | Papasakellariou | H04W 52/146 370/329 |
| 2016/0029239 A1 * | 1/2016 | Sadeghi | H04W 24/10 370/252 |
| 2016/0044600 A1 * | 2/2016 | Kim | H04W 72/04 455/127.1 |
| 2016/0119883 A1 * | 4/2016 | Lee | H04W 52/365 370/329 |
| 2016/0205632 A1 * | 7/2016 | Yi | H04W 52/146 455/522 |
| 2016/0212769 A1 * | 7/2016 | Huang | H04W 52/34 |
| 2016/0286497 A1 * | 9/2016 | Park | H04W 76/15 |
| 2016/0337987 A1 * | 11/2016 | Yi | H04W 52/146 |
| 2017/0013563 A1 * | 1/2017 | Yang | H04W 52/146 |
| 2017/0013564 A1 * | 1/2017 | Yi | H04W 52/36 |
| 2017/0013565 A1 * | 1/2017 | Pelletier | H04W 52/146 |
| 2017/0048803 A1 * | 2/2017 | Yi | H04W 52/146 |
| 2017/0105181 A1 * | 4/2017 | Seo | H04W 52/325 |
| 2017/0164356 A1 * | 6/2017 | Kakishima | H04W 52/40 |

(56) References Cited

U.S. PATENT DOCUMENTS

2017/0188311 A1\* 6/2017 Hwang ............. H04W 72/0413
2017/0223694 A1\* 8/2017 Han .................. H04W 72/1284

OTHER PUBLICATIONS

HTC, "UL Dynamic Power-Sharing in Dual Connectivity", R1-142290, 3GPP TSG RAN WG1 Meeting #77, Seoul, Republic of Korea, May 2014, 4 pages.

Huawei, Hisilicon, "Uplink Power allocation in Dual connectivity", R1-141134, 3GPP TSG RAN WG1 Meeting #76bis, Shenzhen, China, Mar. 2014, 4 pages.

InterDigital, "Power sharing in dual connectivity", R1-142347, 3GPP TSG-RAN WG1 #77, Seoul, Republic of Korea, May 2014, 4 pages.

LG Electronics, "Physical layer impact of dual connectivity", R1-140321, 3GPP TSG RAN WG1 Meeting #76, Prague, Czech Republic, Feb. 2014, 3 pages.

NTT Docomo, Inc., "Deployment scenarios and design goals for dual connectivity", R2-130444, 3GPP TSG-RAN WG2 #81, St. Julian's, Malta, Jan. 2013, 6 pages.

Intel Corporation, "Discussion on physical layer aspects for support of dual connectivity", 3GPP TSG-RAN WG1 #77, R1-142569, May 18, 2014, pp. 1-5.

\* cited by examiner

TERMINAL DEVICE, BASE STATION DEVICE, AND METHOD

TECHNICAL FIELD

Embodiments of the present invention relate to a technique of a terminal device, a base station device, and a method that enable efficient transmit power control and transmit control.

This application claims priority based on Japanese Patent Application No. 2014-158780 filed on Aug. 4, 2014, the contents of which are incorporated herein by reference.

BACKGROUND ART

The 3rd Generation Partnership Project (3GPP), which is a standardization project, standardized the Evolved Universal Terrestrial Radio Access (hereinafter referred to as EUTRA), in which high-speed communication is realized by adopting an orthogonal frequency-division multiplexing (OFDM) communication scheme and flexible scheduling using a unit of prescribed frequency and time called resource block.

Moreover, the 3GPP has been discussing Advanced EUTRA, which realizes higher-speed data transmission and has backward compatibility with EUTRA. EUTRA relates to a communication system based on a network in which base station devices have substantially the same cell configuration (cell size), but, regarding Advanced EUTRA, discussion has been made on a communication system based on a network (different-type radio network, heterogeneous network) in which base station devices (cells) having different configurations coexist in the same area.

Discussion has been made on a dual connectivity technique, in which, in a communication system where cells (macro cells) having large cell radii and cells (small cells) having smaller cell radii than those of the macro cells coexist as in a heterogeneous network, a terminal device performs communication by connecting to a macro cell and a small cell at the same time (NPL 1).

In NPL 1, discussion has advanced regarding a network based on a situation that, when a terminal device is to establish dual connectivity with a cell (macro cell) having a large cell radius (cell size) and a cell (small cell (or pico cell)) having a small cell radius, a backbone network (backhaul) between the macro cell and the small cell is slow, and a delay occurs. Specifically, there is a possibility that it is impossible or difficult to enable a function which has been enabled in prior scenarios, due to delay in exchange of control information or user information between the macro cell and the small cell.

Meanwhile, NPL 2 describes a method of, when a terminal device connects, at the same time, to a plurality of cells connected via a high-speed backhaul, feeding back channel state information of each cell.

CITATION LIST

Non Patent Literature

NPL 1: R2-130444, NTT DOCOMO, 3GPP TSG RAN2 #81, Jan. 28-Feb. 1, 2013
NPL 2: rd Generation Partnership Project; Technical Specification Group Radio Access Network; Evolved Universal Terrestrial Radio Access (E-UTRA); Physical layer procedures (Release 10), February 2013, 3GPP TS 36.213 V11.2.0 (2013-2).

SUMMARY OF INVENTION

Technical Problem

When information sharing is restricted between cells, it is not possible to directly use the conventional transmit power control method and transmit control method.

The present invention has been made in view of the above, and an object of the present invention is to provide a terminal device, a base station device, and a method that enable efficient transmit power control and transmit control.

Solution to Problem (1) In order to accomplish the object described above, the present invention is contrived to provide the following means. Specifically, a terminal device according to an aspect of the present invention is a terminal device configured to communicate with a base station device. The terminal device includes a transmission unit that, if transmission of a physical uplink control channel (PUCCH) of a first cell group (CG) overlaps transmission of a physical uplink shared channel (PUSCH) and/or a PUCCH of a second CG in a certain subframe and uplink control information (UCI) including hybrid auto repeat request-acknowledgement (HARQ-ACK) is transmitted on the PUCCH of the first CG, upon transmit power of the PUCCH of the first CG exceeding a first upper limit value, scales the transmit power of the PUCCH of the first CG such that the transmit power of the PUCCH does not exceed the first upper limit value, and upon the transmit power of the PUCCH of the first CG not exceeding the first upper limit value, sets the transmit power of the PUCCH of the first CG to power required for the PUCCH of the first CG.

(2) A method according to an aspect of the present invention is a method in a terminal device configured to communicate with a base station device. The method includes the steps of: if transmission of a physical uplink control channel (PUCCH) of a first cell group (CG) overlaps transmission of a physical uplink shared channel (PUSCH) and/or a PUCCH of a second CG in a certain subframe and uplink control information (UCI) including hybrid auto repeat request-acknowledgement (HARQ-ACK) is transmitted on the PUCCH of the first CG, upon transmit power of the PUCCH of the first CG exceeding a first upper limit value, performing scaling on the transmit power of the PUCCH of the first CG such that the transmit power of the PUCCH does not exceed the first upper limit value; and upon the transmit power of the PUCCH of the first CG not exceeding the first upper limit value, setting the transmit power of the PUCCH of the first CG to power required for the PUCCH of the first CG.

(3) A base station device according to an aspect of the present invention is a base station device configured to communicate with a terminal device. The base station device includes a transmission unit that transmits a first parameter regarding guaranteed power for a first cell group (CG) and a second parameter regarding guaranteed power for a second CG through a higher layer signal.

(4) A method according to one aspect of the present invention is a method in a base station device configured to communicate with a terminal device. The method includes the step of transmitting a first parameter regarding guaranteed power for a first cell group (CG) and a second parameter regarding guaranteed power for a second CG through a higher layer signal.

Advantageous Effects of Invention

According to the present invention, it is possible to improve transmission efficiency in a radio communication system in which a base station device and a terminal device communicate.

DESCRIPTION OF EMBODIMENTS

First Embodiment

A first embodiment of the present invention will be described below. Description will be given with reference to a communication system (cellular system) in which a base station device (base station, NodeB, or eNodeB (eNB)) and a terminal device (terminal, mobile station, user device, or user equipment (UE)) communicate in a cell.

Main physical channels and physical signals used in EUTRA and Advanced EUTRA will be described. "Channel" means a medium used to transmit a signal, and "physical channel" means a physical medium used to transmit a signal. In the present embodiment, "physical channel" may be used as a synonym of "signal". Addition of physical channels and changes and addition in terms of configuration and format type may be made to physical channels in the EUTRA and the Advanced EUTRA in the future. However, the description of the present embodiment will not be affected even if any change or addition is made.

In EUTRA and Advanced EUTRA, scheduling of physical channels or physical signals is managed by the use of radio frames. Each radio frame is 10 ms in length and is constituted of 10 subframes. In addition, each subframe is constituted of two slots (i.e., each subframe is 1 ms in length, and each slot is 0.5 ms in length). Moreover, scheduling is managed by using resource blocks as the minimum unit of scheduling for allocating physical channels. The resource block is defined by a certain frequency domain that is constituted of a set of subcarriers (e.g., 12 subcarriers) on a frequency axis and a certain transmission time slot (one slot).

Figure 1:
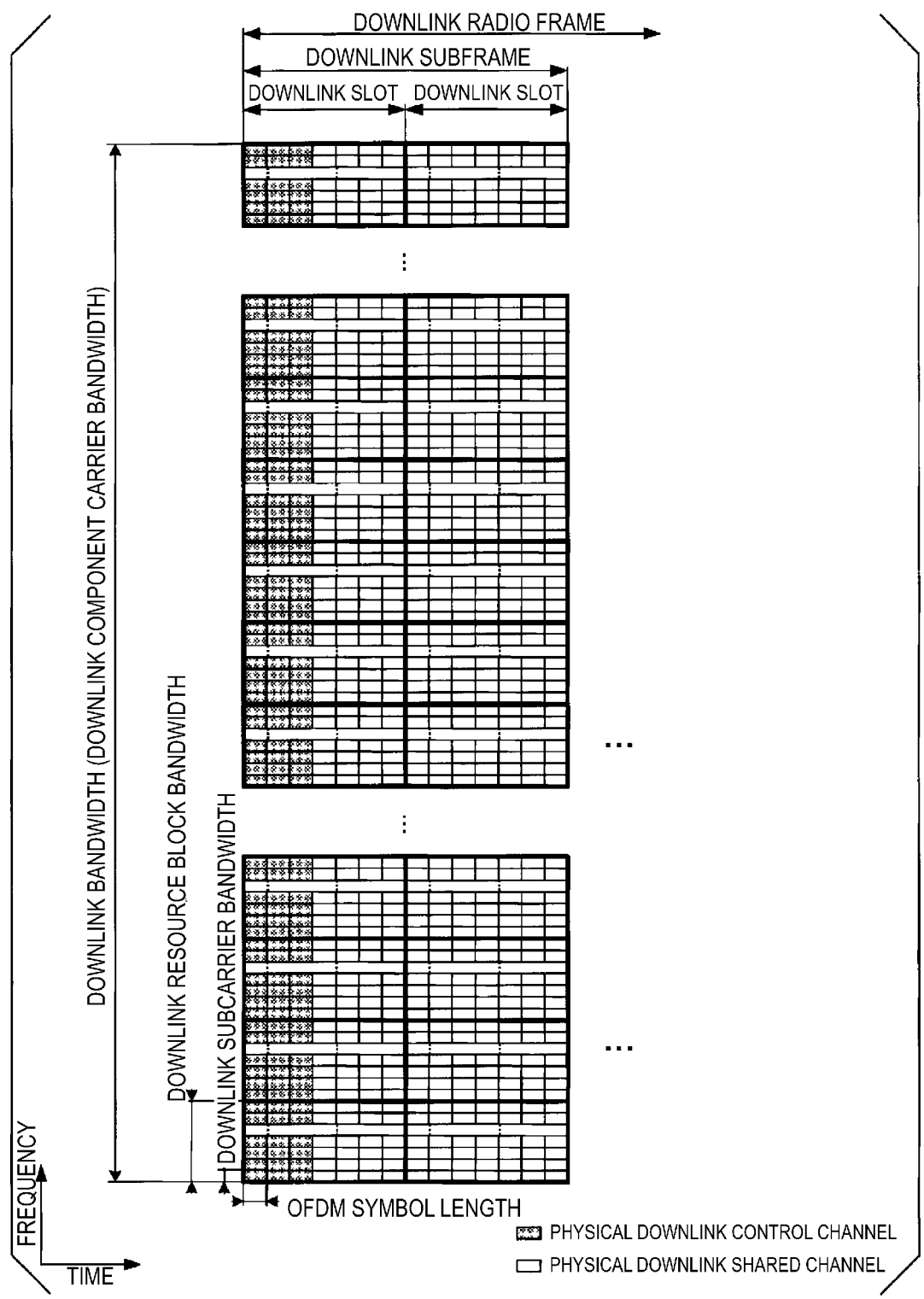
FIG. 1 is a diagram illustrating an example of a downlink radio frame configuration according to a first embodiment.

FIG. 1 is a diagram illustrating an example of a downlink radio frame configuration according to the present embodiment. An OFDM access scheme is employed for the downlink. In the downlink, a PDCCH, an EPDCCH, a physical downlink shared channel (PDSCH), and the like are allocated. A downlink radio frame is constituted of downlink resource block (RB) pairs. Each of the downlink RB pairs is a unit for allocation of downlink radio resources and the like and is defined by the frequency band of a predefined width (RB bandwidth) and a predetermined time duration (two slots=one subframe). Each downlink RB pair is constituted of two downlink RBs (RB bandwidth * slot) that are continuous in the time domain. A single downlink RB is constituted by twelve subcarriers in the frequency domain. In the time domain, the downlink RB is constituted by seven OFDM symbols when a normal cyclic prefix is added while constituted by six OFDM symbols when a cyclic prefix that is longer than a normal one is added. A domain defined by a single subcarrier in the frequency domain and a single OFDM symbol in the time domain is referred to as "resource element (RE)". A physical downlink control channel is a physical channel on which downlink control information such as a terminal device identifier, scheduling information on physical downlink shared channel, scheduling information on physical uplink shared channel, a modulation scheme, a coding rate, and a retransmission parameter is transmitted. Note that, although a downlink subframe in a single component carrier (CC) is described here, a downlink subframe is defined for each CC and downlink subframes are synchronized between the CCs.

Although not illustrated here, synchronization signals, a physical broadcast channel, or a downlink reference signal (RS) may be mapped to a downlink subframe. Examples of a downlink reference signal are a cell-specific reference signal (CRS: cell-specific RS), which is transmitted through the same transmission port as that for a PDCCH, a channel state information reference signal (CSI-RS), which is used to measure channel state information (CSI), a terminal-specific reference signal (URS: UE-specific RS)), which is transmitted through the same transmission port as that of one or some PDSCHs, and a demodulation reference signal (DMRS), which is transmitted through the same transmission port as that for an EPDCCH. Moreover, carriers to which no CRS is mapped may be used. In this case, a signal (referred to as "enhanced synchronization signal") similar to a signal corresponding to one or some transmission ports (e.g., only transmission port 0) or all the transmission ports for the CRSs can be inserted into one or some subframes (e.g., the first and sixth subframes in the radio frame) as time and/or frequency tracking signals.

Figure 2:
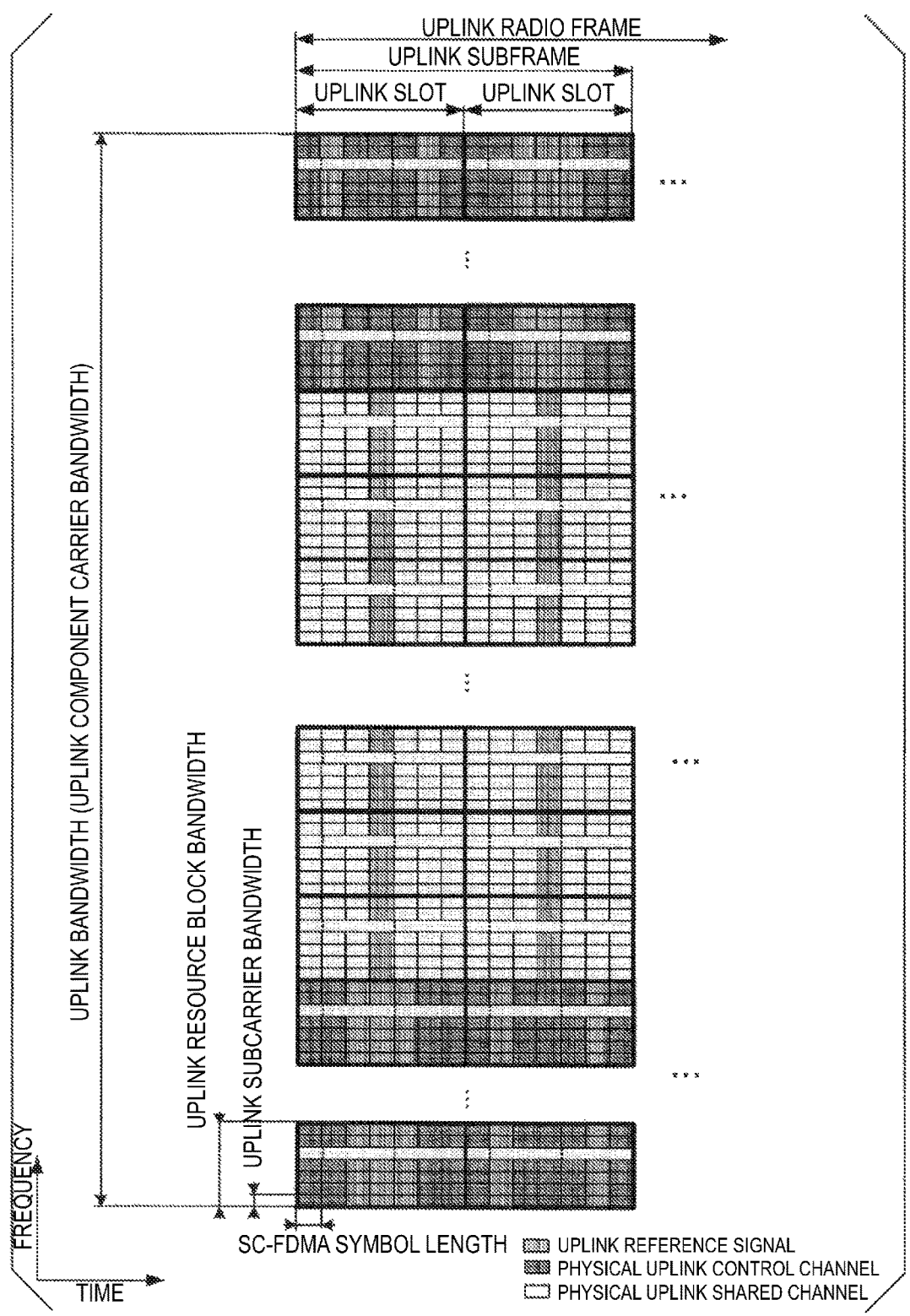
FIG. 2 is a diagram illustrating an example of an uplink radio frame configuration according to the first embodiment.

FIG. 2 is a diagram illustrating an example of an uplink radio frame configuration according to the present embodiment. An SC-FDMA scheme is employed for the uplink. In the uplink, a physical uplink shared channel (PUSCH), a PUCCH, and the like are allocated. An uplink reference signal is assigned to one or some of PUSCHs and PUCCHs. An uplink radio frame is constituted of uplink RB pairs. Each of the uplink RB pairs is a unit for allocation of uplink radio resources and the like and is defined by the frequency band of a predefined width (RB bandwidth) and a predetermined time duration (two slots=one subframe). Each uplink RB pair is constituted of two uplink RBs (RB bandwidth*slot) that are continuous in the time domain. A single uplink RB is constituted by twelve subcarriers in the frequency domain. In the time domain, the uplink RB is constituted by seven SC-FDMA symbols when a normal cyclic prefix is added while being constituted by six SC- FDMA symbols when a cyclic prefix that is longer than a normal one is added. Note that, although an uplink subframe in a single CC is described here, an uplink subframe is defined for each CC.

A synchronization signal is constituted of three kinds of primary synchronization signals and secondary synchronization signals constituted by 31 kinds of codes that are interleaved in the frequency domain. 504 patterns of cell identifiers (physical cell identities; PCIs) for identifying base station devices, and frame timing for radio synchronization are indicated by the combinations of the primary synchronization signals and the secondary synchronization signals. The terminal device identifies the physical cell ID of a received synchronization signal by cell search.

A physical broadcast channel (PBCH) is transmitted for the purpose of notifying (configuring) a control parameter (broadcast information (system information)) commonly used among the terminal devices within the cell. The terminal devices in the cell are notified of the radio resource in which broadcast information is transmitted on the physical downlink control channel, and, for broadcast information that is not notified on the physical broadcast information channel, a layer-3 message (system information) for notifying of the broadcast information on the physical downlink shared channel is transmitted in the notified radio resource.

As the broadcast information, a cell global identifier (CGI), which indicates a cell-specific identifier, a tracking area identifier (TAI) for managing standby areas in paging, random access configuration information (such as a transmission timing timer), shared radio resource configuration information, neighboring cell information, and uplink access control information of the cell, and the like are notified.

Downlink reference signals are classified into a plurality of types according to their use. For example, a cell-specific reference signal (cell-specific RS) is a pilot signal transmitted with prescribed power from each cell and is a downlink reference signal periodically repeated in the frequency domain and the time domain under a prescribed rule. The terminal device receives cell-specific RSs to measure the reception quality of each cell. The terminal device also uses cell-specific RSs as reference signals for demodulation of a physical downlink control channel or physical downlink shared channel transmitted at the same time as the cell-specific RSs. The sequence used for a cell-specific RS is a sequence distinguishable among the cells.

The downlink reference signal is also used for estimation of downlink channel variation. Downlink reference signals used for estimation of downlink channel variations are referred to as "channel state information reference signals (CSI-RS)". Downlink reference signals individually configured for the terminal devices are referred to as UE-specific reference signals (URS), demodulation reference signal (DMRS), or dedicated RS (DRS), and are referenced for a channel compensation process for demodulating an enhanced physical downlink control channel or a physical downlink shared channel.

A physical downlink control channel (PDCCH) is transmitted by using several OFDM symbols (e.g., 1 to 40 OFDM symbols) from the start of each subframe. An enhanced physical downlink control channel (EPDCCH) is a physical downlink control channel allocated to the OFDM symbols to which the physical downlink shared channel PDSCH is allocated. The PDCCH or EPDCCH is used for notifying each terminal device of radio resource allocation information according to scheduling determined by the base station device and information indicating an adjustment amount for an increase or decrease in transmit power. Hereafter, the term "physical downlink control channel (PDCCH)" means both PDCCH and EPDCCH, unless otherwise specified.

The terminal device needs to monitor physical downlink control channels to find and receive a physical downlink control channel addressed to the terminal device itself, before transmitting and receiving downlink data or a layer-2 message or layer-3 message, which is higher-layer control information (such as a paging or handover command), and thereby acquire, from the physical downlink control channel, radio resource allocation information called uplink grant in the case of transmission and downlink grant (downlink assignment) in the case of reception. Note that it is also possible to configure the physical downlink control channel so that the physical downlink control channel is to be transmitted in a dedicated resource block region allocated to each terminal device by the base station device, instead of transmission in OFDM symbols described above.

The physical uplink control channel (PUCCH) is used to perform reception acknowledgment (HARQ-ACK; hybrid automatic repeat request-acknowledgment or ACK/NACK; acknowledgment/negative acknowledgment) for downlink data transmitted by using the physical downlink shared channel, downlink channel (channel state) information (CSI), and uplink radio resource allocation request (radio resource request, scheduling request (SR)).

CSI includes a channel quality indicator (CQI), a precoding matrix indicator (PMI), a precoding type indicator (PTI), and a rank indicator (RI), which can be used respectively for specifying (representing) a preferable modulation scheme and coding rate, a preferable precoding matrix, a preferable PMI type, and a preferable rank. The term "indication" may be used as a notation for each of the indicators. Moreover, CQI and PMI are classified into wideband CQI and PMI assuming transmission using all the resource blocks in a single cell and subband CQI and PMI assuming transmission using some continuous resource blocks (subbands) in a single cell. Moreover, PMI may be a type of PMI that represents a single preferable precoding matrix by using two kinds of PMIs, a first PMI and a second PMI, in addition to a normal type of PMI, which represents a single preferable precoding matrix by using a single PMI.

A physical downlink shared channel (PDSCH) is also used to notify the terminal device of broadcast information (system information) that is not notified by paging or on the physical broadcast information channel, in addition to downlink data, as a layer-3 message. Radio resource allocation information on the physical downlink shared channel is provided by the physical downlink control channel. The physical downlink shared channel is allocated to OFDM symbols other than the OFDM symbols used for the transmission of the physical downlink control channel and is transmitted. In other words, the physical downlink shared channel and the physical downlink control channel are time-multiplexed in a single subframe.

The physical uplink shared channel (PUSCH) mainly transmits uplink data and uplink control information and may also include uplink control information such as CSI and ACK/NACK. Moreover, the physical uplink shared channel is also used by the terminal device to notify the base station device of a layer-2 message and layer-3 message, which are higher-layer control information, in addition to uplink data. Radio resource allocation information on the physical uplink shared channel is provided by the physical downlink control channel, as in the case of downlink.

The uplink reference signal (also referred to as "uplink pilot signal" or "uplink pilot channel") includes a demodulation reference signal (DMRS) to be used by the base station device to demodulate the physical uplink control channel (PUCCH) and/or physical uplink shared channel (PUSCH), and a sounding reference signal (SRS) to be mainly used by the base station device to estimate an uplink channel state. Moreover, the sounding reference signal includes a periodic sounding reference signal (periodic SRS), which is transmitted periodically, and an aperiodic sounding reference signal (aperiodic SRS), which is transmitted in response to a request from the base station device.

A physical random access channel (PRACH) is a channel used to notify of (configure) a preamble sequence and includes guard time. The preamble sequence is configured so that the base station device is notified of information by using a plurality of sequences. For example, when 64 sequences are prepared, 6-bit information can be provided to the base station device. The physical random access channel is used by the terminal device to access the base station device.

The terminal device uses the physical random access channel to request an uplink radio resource when no physical uplink control channel is configured for an SR or to request the base station device for a transmission timing adjustment information (also referred to as timing advance (TA) command) necessary for matching uplink transmission timing to a reception timing window of the base station device, for example. Moreover, the base station device may use a physical downlink control channel to request the terminal device to start a random access procedure.

A layer-3 message is a message exchanged between the RRC (radio resource control) layers of the terminal device and the base station device and handled in a protocol for a control-plane (C-plane), and may be used as a synonym of RRC signaling or RRC message. A protocol handling user data (uplink data and downlink data) is referred to as user-plane (UP (U-plane)) in contrast to control-plane. Here, a transport block, which is physical-layer transmission data, includes C-plane messages and U-plane data of higher layers. Detailed description of other physical channels is omitted.

A communicable range (communication area) of each frequency controlled by a base station device is assumed as a cell. Here, the communication area covered by a base station device may be different in size and shape for each frequency. Moreover, the covered area may be different for each frequency. A radio network in which cells having different types of base station devices and different cell radii coexist in the areas of the same frequency and/or different frequencies to form a single communication system, is referred to as "heterogeneous network".

The terminal device operates by assuming the inside of a cell as a communication area. When the terminal device moves from a cell to a different cell, the terminal device moves to an appropriate different cell through a cell reselection procedure when having no radio connection (during no communication) or through a handover procedure when having a radio connection (during communication). The appropriate cell is in general a cell that is determined that access from the terminal device is not prohibited on the basis of information specified by the corresponding base station device and that has a downlink reception quality satisfying a prescribed condition.

Moreover, the terminal device and the base station device may employ a technique for aggregating the frequencies (component carriers or frequency band) of a plurality of different frequency bands through carrier aggregation and treating the resultant as a single frequency (frequency band). The component carrier includes an uplink component carrier corresponding to the uplink and a downlink component carrier corresponding to the downlink. In this specification, "frequency" and "frequency band" may be used as synonyms.

For example, when five component carriers each having a frequency bandwidth of 20 MHz are aggregated through carrier aggregation, a terminal device capable of carrier aggregation performs transmission and reception with the five component carriers as a single frequency band of 100 MHz. Note that component carriers to be aggregated may have contiguous frequencies or frequencies some or all of which are discontiguous. For example, assuming that usable frequency bands include a band of 800 MHz, a band of 2 GHz, and a band of 3.5 GHz, a component carrier may be transmitted in the band of 800 MHz, another component carrier may be transmitted in the band of 2 GHz, and the other component carrier may be transmitted in the band of 3.5 GHz.

It is also possible to aggregate a plurality of contiguous or discontiguous component carriers in the same frequency band. The frequency bandwidth of each component carrier may be a narrower frequency bandwidth (e.g., 5 MHz or 10 MHz) than the receivable frequency bandwidth (e.g., 20 MHz) of the terminal device, and the frequency bandwidths to be aggregated may be different from each other. Each frequency bandwidth is preferably equal to any of the frequency bandwidths of traditional cells in consideration of backward compatibility, but may be a frequency bandwidth different from any of the frequency bandwidths of traditional cells.

Moreover, component carriers (carrier types) without backward compatibility may be aggregated. Note that the number of uplink component carriers to be allocated to (configured for or added for) the terminal device by the base station device is preferably the same as or fewer than the number of downlink component carriers.

A cell constituted by an uplink component carrier in which an uplink control channel is configured for a radio resource request and a downlink component carrier having a cell-specific connection with the uplink component carrier is referred to as "primary cell (PCell)". A cell constituted by component carriers other than those of the primary cell is referred to as "secondary cell (SCell)". The terminal device receives a paging message, detects update of broadcast information, carries out an initial access procedure, configures security information, and the like in a primary cell, and need not perform these operations in a secondary cell.

Although a primary cell is not a target of activation and deactivation controls (in other words, considered as being activated at any time), a secondary cell has activated and deactivated states, the change of which is explicitly specified by the base station device or is made on the basis of a timer configured for the terminal device for each component carrier. The primary cell and secondary cell are collectively referred to as "serving cell."

Carrier aggregation is communication using a plurality of component carriers (frequency bands) by a plurality of cells and is also referred to as "cell aggregation." The terminal device may have radio connection with the base station device via a relay station device (or repeater) for each frequency. In other words, the base station device of the present embodiment may be replaced with a relay station device.

The base station device manages a cell, which is an area where terminal devices can communicate with the base station device, for each frequency. A single base station device may manage a plurality of cells. Cells are classified into a plurality of kinds depending on the sizes of the areas (cell sizes) in which communication is possible with terminal devices. For example, cells are classified into macro cells and small cells. Moreover, small cells are classified into femto cells, pico cells, and nano cells depending on the sizes of the areas. When a terminal device can communicate with a certain base station device, a cell configured to be used for the communication with the terminal device is referred to as "serving cell" while the other cells not used for the communication are referred to as "neighboring cell", among the cells of the base station device.

In other words, in carrier aggregation, a plurality of serving cells thus configured include one primary cell and one or a plurality of secondary cells.

The primary cell is a serving cell in which an initial connection establishment procedure has been performed, a serving cell in which a connection re-establishment procedure has been started, or a cell indicated as a primary cell during a handover procedure. The primary cell operates at a primary frequency. At a point of time when a connection is (re)established, or later, a secondary cell may be configured. The secondary cell operates at a secondary frequency. The connection may be referred to as "RRC connection." For the terminal device supporting CA, a single primary cell and one or more secondary cells are aggregated.

Figure 3:
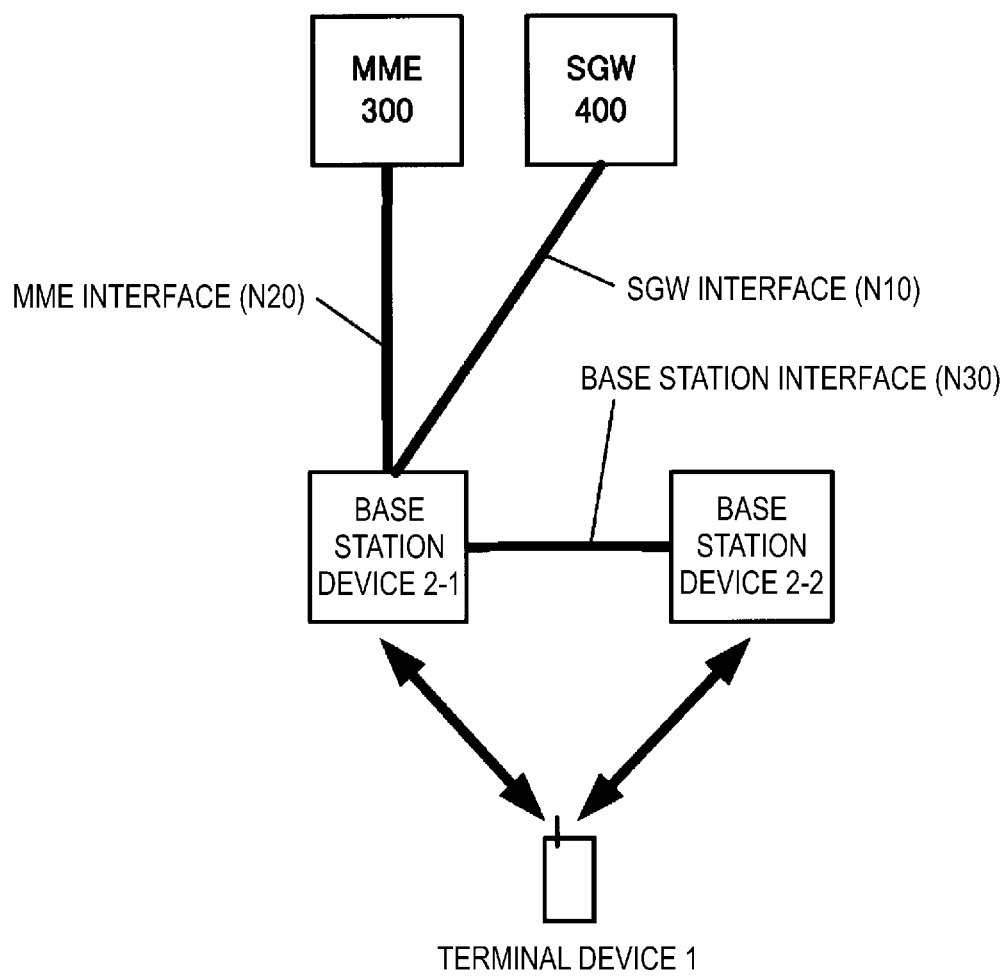
FIG. 3 is a diagram illustrating a basic architecture of dual connectivity according to the first embodiment.
Figure 4:
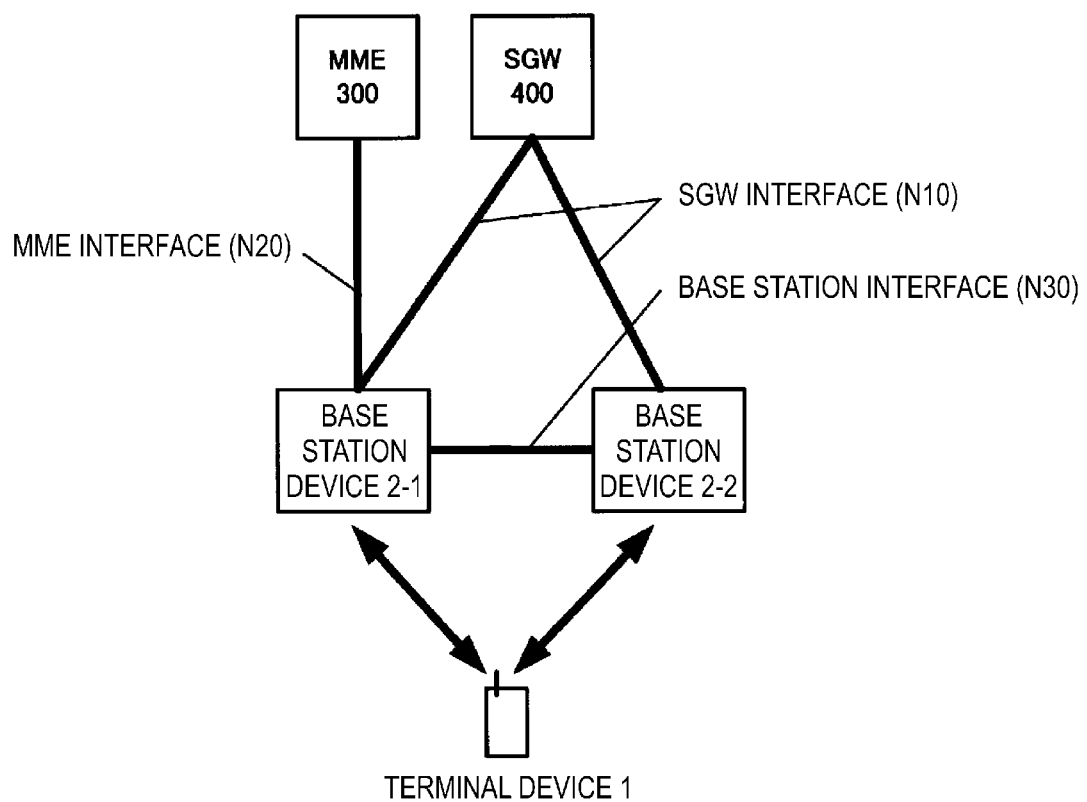
FIG. 4 is a diagram illustrating a basic architecture of dual connectivity according to the first embodiment.

A basic configuration (architecture) of dual connectivity will be described with reference to FIG. 3 and FIG. 4. FIG. 3 and FIG. 4 illustrate a state that a terminal device 1 connects to a plurality of base stations 2 (denoted as "base station device 2-1" and "base station device 2-2" in the drawings) at the same time. The base station device 2-1 is a base station device constituting a macro cell, and the base station device 2-2 is a base station device constituting a small cell. A technique in which the terminal device 1 connects to the plurality of base station devices 2 at the same time by using the plurality of cells belonging to the plurality of base station devices 2 as described above is referred to as "dual connectivity." The cells belonging to the respective base station devices 2 may be operated at the same frequency or different frequencies.

Note that carrier aggregation is different from dual connectivity in that one base station device 2 manages a plurality of cells and the frequencies of the respective cells are different from each other. In other words, carrier aggregation is a technique for connecting one terminal device 1 and one base station device 2 via a plurality of cells having different frequencies, while dual connectivity is a technique for connecting one terminal device 1 and a plurality of base station devices 2 via a plurality of cells having the same frequency or different frequencies.

The terminal device 1 and the base station devices 2 can apply a technique used for carrier aggregation, to dual connectivity. For example, the terminal device 1 and the base station devices 2 may apply a technique of allocation of a primary cell and secondary cells or activation/deactivation, to cells connected through dual connectivity.

In FIG. 3 and FIG. 4, the base station device 2-1 or the base station device 2-2 is connected to MME 300 and SGW 400 via a backbone network. The MME 300 is a host control station device corresponding to a mobility management entity (MME) and has the functions of managing mobility and performing authentication control (security control) for the terminal device 1, and configuring paths for user data to the base station devices 2. The SGW 400 is a host control station device corresponding to a serving gateway (S-GW) and has the functions of transmitting user data through the path for user data to the terminal device 1 configured by the MME 300.

Moreover, in FIG. 3 and FIG. 4, the connection path between the base station device 2-1 or the base station device 2-2 and the SGW 400 is referred to as "SGW interface N10." Moreover, the connection path between the base station device 2-1 or the base station device 2-2 and the MME 300 is referred to as "MME interface N20." Moreover, the connection path between the base station device 2-1 and the base station device 2-2 is referred to as "base station interface N30." The SGW interface N10 is also referred to as "S1-U interface" in EUTRA. Moreover, the MME interface N20 is also referred to as "S1-MME interface" in EUTRA. Moreover, the base station interface N30 is also referred to as "X2 interface" in EUTRA.

As an architecture for enabling dual connectivity, a configuration as illustrated in FIG. 3 may be employed. In FIG. 3, the base station device 2-1 and the MME 300 are connected via the MME interface N20. Moreover, the base station device 2-1 and the SGW 400 are connected via the SGW interface N10. Moreover, the base station device 2-1 provides, to the base station device 2-2, the communication path to the MME 300 and/or SGW 400 via the base station interface N30. In other words, the base station device 2-2 is connected to the MME 300 and/or the SGW 400 via the base station device 2-1.

Moreover, as another architecture for enabling dual connectivity, a configuration as illustrated in FIG. 4 may be employed. In FIG. 4, the base station device 2-1 and the MME 300 are connected via the MME interface N20. Moreover, the base station device 2-1 and the SGW 400 are connected via the SGW interface N10. The base station device 2-1 provides, to the base station device 2-2, the communication path to the MME 300 via the base station interface N30. In other words, the base station device 2-2 is connected to the MME 300 via the base station device 2-1. Moreover, the base station device 2-2 is connected to the SGW 400 via the SGW interface N10.

Note that a configuration in which the base station device 2-2 and the MME 300 are directly connected via the MME interface N20 may be employed.

On the basis of description from a different point of view, dual connectivity is an operation whereby a prescribed terminal device consumes radio resources provided from at least two different network points (master base station device (MeNB or Master eNB) and secondary base station device (SeNB or Secondary eNB)). In other words, in dual connectivity, a terminal device is configured to establish an RRC connection to at least two network points. In dual connectivity, the terminal device may be connected via a non-ideal backhaul in an RRC connected (RRC_CONNECTED) state.

In dual connectivity, a base station device that is connected to at least the S1-MME and that acts as the mobility anchor of the core network is referred to as "master base station device." Additionally, a base station device that is not the master base station device and that provides supplemental radio resources to the terminal device is referred to as "secondary base station device". A group of serving cells that is associated with the master base station device may be referred to as "master cell group" (MCG), and a group of serving cells that is associated with the secondary base station device may be referred to as "secondary cell group" (SCG). Note that the cell groups may be serving cell groups.

In dual connectivity, the primary cell belongs to the MCG. Moreover, in the SCG, the secondary cell corresponding to the primary cell is referred to as "primary secondary cell" (pSCell). Note that the pSCell may be referred to as "special cell" or "special secondary cell" (Special SCell). Some of the functions (for example, functions of transmitting and receiving the PUCCH) of the PCell (the base station device constituting the PCell) may be supported in the special SCell (the base station device constituting the special SCell). Moreover, only some of the functions of the PCell may be supported in the pSCell. For example, the function of transmitting the PDCCH may be supported in the pSCell. Moreover, the function of transmitting the PDCCH may be supported in the pSCell using a search space different from the CSS or the USS. For example, the search space different from a USS is a search space determined on the basis of a value defined in the specification, a search space determined on the basis of an RNTI different from a C-RNTI, a search space determined on the basis of a value configured by a higher layer that is different from the RNTI, or the like. Moreover, the pSCell may constantly be in an activated state. Moreover, the pSCell is a cell capable of receiving the PUCCH.

In dual connectivity, the data radio bearer (DRB) may be individually allocated to the MeNB and the SeNB. On the other hand, the signaling radio bearer (SRB) may be allocated only to the MeNB. In dual connectivity, a duplex mode may be configured individually for the MCG and the SCG or the PCell and the pSCell. In dual connectivity, the MCG and the SCG or the PCell and the pSCell need not necessarily be synchronized with each other. In dual connectivity, a plurality of parameters for timing adjustment (TAG or Timing Advance Group) may be configured for each of the MCG and the SCG. In other words, the terminal device is capable of performing uplink transmission at a plurality of different timings in each CG.

In dual connectivity, the terminal device is allowed to transmit the UCI corresponding to the cells in the MCG only to the MeNB (the PCell) and to transmit the UCI corresponding to the cells in the SCG only to SeNB (the pSCell). For example, the UCI is an SR, HARQ-ACK, and/or CSI. Additionally, in each UCI transmission, a transmission method using the PUCCH and/or the PUSCH is applied to each cell group.

All signals can be transmitted and received in the primary cell, but some signals cannot be transmitted and received in the secondary cell. For example, the physical uplink control channel (PUCCH) is transmitted only in the primary cell. Moreover, unless a plurality of timing advance groups (TAG) are configured between the cells, the physical random access channel (PRACH) is transmitted only in the primary cell. Moreover, the physical broadcast channel (PBCH) is transmitted only in the primary cell. Moreover, a master information block (MIB) is transmitted only in the primary cell. Signals that can be transmitted and received in the primary cell are transmitted and received in the primary secondary cell. For example, the PUCCH may be transmitted in the primary secondary cell. Moreover, the PRACH may be transmitted in the primary secondary cell, regardless of whether a plurality of TAGs are configured. Moreover, the PBCH and the MIB may be transmitted in the primary secondary cell.

In the primary cell, radio link failure (RLF) is detected. In the secondary cell, even if conditions for the detection of RLF are in place, the detection of the RLF is not recognized. However, in the primary secondary cell, the RLF is detected if the conditions are in place. When the RLF is detected in the primary secondary cell, the higher layer of the primary secondary cell notifies the higher layer of the primary cell that the RLF has been detected. Semi-persistent scheduling (SPS) or discontinuous transmission (DRX) may be used in the primary cell. The same DRX as in the primary cell may be used in the secondary cell. Fundamentally, in the secondary cell, information/parameters on the MAC configuration are shared with the primary cell/primary secondary cell of the same cell group. Some of the parameters (for example, sTAG-Id) may be configured for each secondary cell. Some of the timers or counters may be applied only to the primary cell and/or the primary secondary cell. A timer or counter to be applied may be configured only to the secondary cell.

Figure 5:
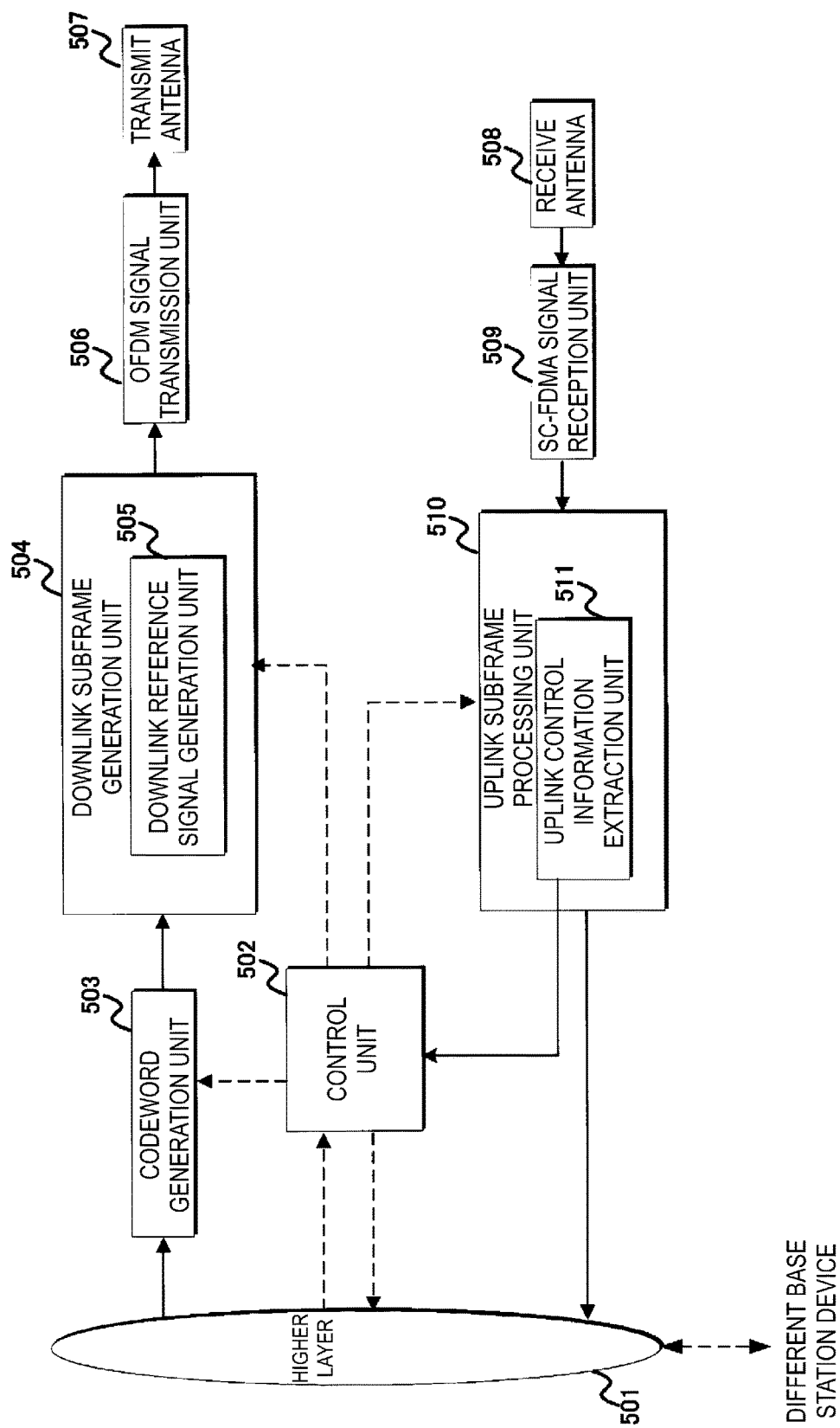
FIG. 5 is a diagram illustrating an example of a block configuration of a base station device according to the first embodiment.

FIG. 5 is a schematic diagram illustrating an example of a block configuration of the base station device 2-1 and the base station device 2-2 according to the present embodiment. The base station device 2-1 and base station device 2-2 each include a higher layer (higher-layer control information notification unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink reference signal generation unit 505. Moreover, the uplink subframe processing unit 510 includes an uplink control information extraction unit (CSI acquisition unit) 511.

Figure 6:
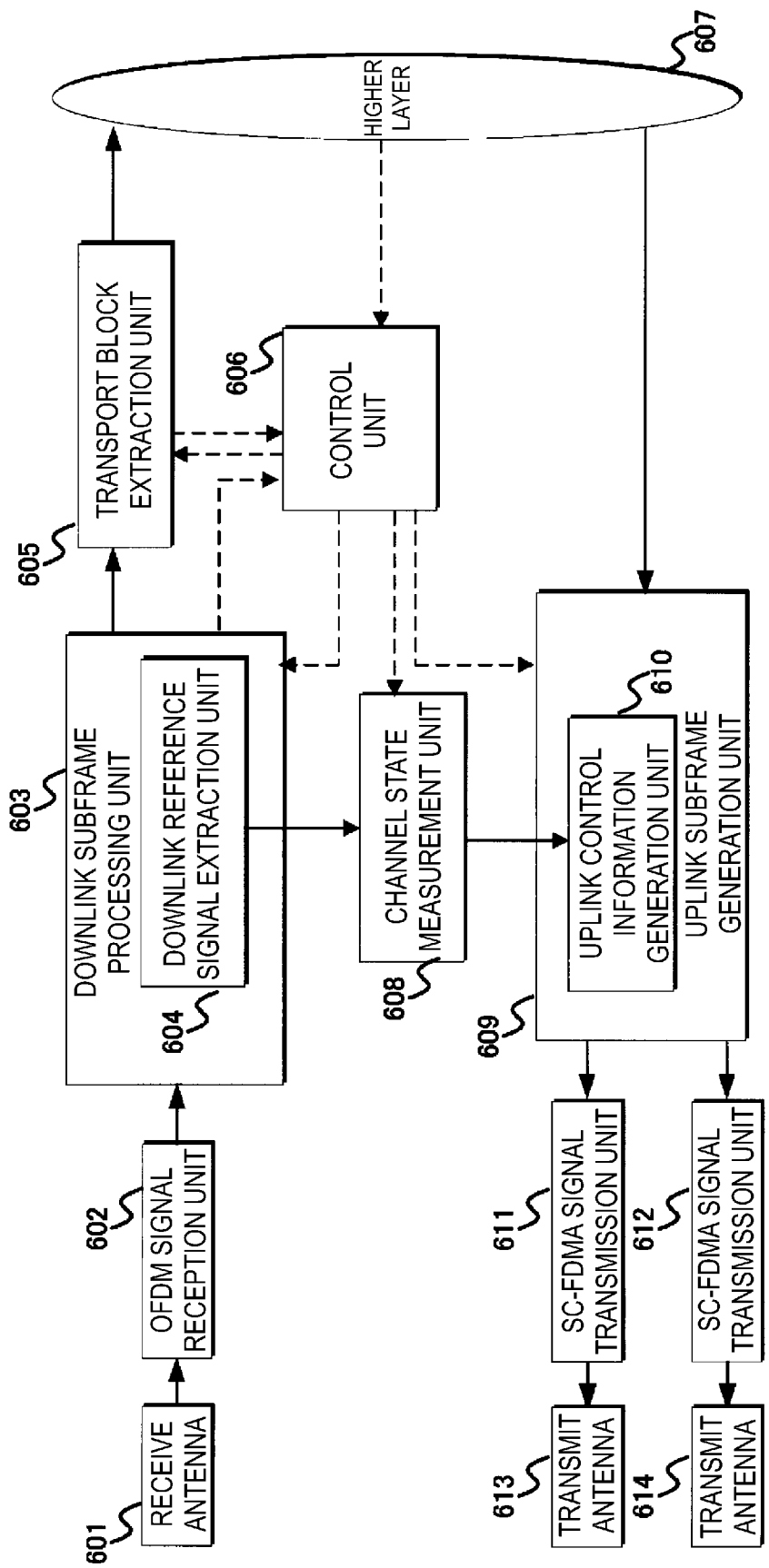
FIG. 6 is a diagram illustrating an example of a block configuration of a terminal device according to the first embodiment.

FIG. 6 is a schematic diagram illustrating an example of a block configuration of the terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation unit (UCI generation unit) 610.

First, a flow of downlink data transmission and reception will be described with reference to FIG. 5 and FIG. 6. In the base station device 2-1 or the base station device 2-2, the control unit 502 holds a modulation and coding scheme (MCS) indicating the modulation scheme, coding rate and the like in the downlink, downlink resource allocation indicating the RBs to be used for data transmission, and information to be used for HARQ control (redundancy version, HARQ process number, and new data indicator) and controls the codeword generation unit 503 and the downlink subframe generation unit 504 on the basis of such information. Downlink data (also referred to as a downlink transport block) transferred from the higher layer 501 is subjected to error correction coding, rate matching, and the like in the codeword generation unit 503 under the control of the control unit 502, and then a codeword is Generated. Two codewords at maximum are transmitted at the same time in a single subframe of a single cell. In the downlink subframe generation unit 504, downlink subframes are generated in accordance with an instruction from the control unit 502. First, a codeword generated in the codeword generation unit 503 is converted into a modulation symbol sequence through a modulation process, such as phase shift keying (PSK) modulation or quadrature amplitude modulation (QAM). Moreover, a modulation symbol sequence is mapped to REs of some RBs, and a downlink subframe for each antenna port is generated through a precoding process. In this operation, the transmission data sequence transferred from the higher layer 501 includes higher-layer control information, which is control information of the higher layer (e.g., dedicated (individual) radio resource control (RRC) signaling). Moreover, in the downlink reference signal generation unit 505, a downlink reference signal is generated. The downlink subframe generation unit 504 maps the downlink reference signal to the REs in the downlink subframes in accordance with an instruction from the control unit 502. The downlink subframe generated in the downlink subframe generation unit 504 is modulated to an OFDM signal in the OFDM signal transmission unit 506 and then transmitted via the transmit antenna 507. Although a configuration including one OFDM signal transmission unit 506 and one transmit antenna 507 is provided as an example here, a configuration including a plurality of OFDM signal transmission units 506 and transmit antennas 507 may be employed when downlink subframes are transmitted on a plurality of antenna ports. Moreover, the downlink subframe generation unit 504 may also have the capability of generating physical-layer downlink control channels, such as the PDCCH and the EPDCCH, and mapping the channels to REs in downlink subframes. The plurality of base station devices (base station device 2-1 and base station device 2-2) transmit separate downlink subframes.

In the terminal device 1, an OFDM signal is received by the OFDM signal reception unit 602 via the receive antenna 601, and an OFDM demodulation process is performed on the signal. The downlink subframe processing unit 603 first detects physical-layer downlink control channels, such as the PDCCH and the EPDCCH. More specifically, the downlink subframe processing unit 603 decodes the signal by assuming that the PDCCH and the EPDCCH have been transmitted in the regions to which the PDCCH and EPDCCH can be allocated, and checks cyclic redundancy check (CRC) bits added in advance (blind decoding). In other words, the downlink subframe processing unit 603 monitors the PDCCH and the EPDCCH. When the CRC bits match the ID (a terminal-specific identifier assigned to each terminal, such as a cell-radio network temporary identifier (C-RNTI) or a semi persistent scheduling-C-RNTI (SPS-C-RNTI), or a temporally C-RNTI assigned by the base station device in advance, the downlink subframe processing unit 603 recognizes that the PDCCH or the EPDCCH has been detected and extracts the PDSCH by the use of control information included in the detected PDCCH or EPDCCH. The control unit 606 holds MCS indicating the modulation scheme, coding rate, and the like in the downlink based on the control information, downlink resource allocation indicating RBs to be used for downlink data transmission, and information to be used for HARQ control, and controls the downlink subframe processing unit 603, the transport block extraction unit 605, and the like on the basis of such information. More specifically, the control unit 606 performs control so as to carry out an RE demapping process and a demodulation process corresponding to the RE mapping process and the modulation process in the downlink subframe generation unit 504, and the like. The PDSCH extracted from the received downlink subframe is transferred to the transport block extraction unit 605. The downlink reference signal extraction unit 604 in the downlink subframe processing unit 603 extracts the downlink reference signal from the downlink subframe. In the transport block extraction unit 605, a rate matching process, error correction decoding corresponding to the rate matching process and the error correction coding in the codeword generation unit 503, and the like are performed, and a transport block is extracted and transmitted to the higher layer 607. The transport block includes higher-layer control information, and the higher layer 607 notifies the control unit 606 of a necessary physical-layer parameter on the basis of the higher-layer control information. The plurality of base station devices 2 (base station device 2-1 and base station device 2-2) transmit separate downlink subframes, and the terminal device 1 receives the downlink subframes. Hence, the above-described processes may be carried out on the downlink subframe of each of the plurality of base station devices 2. In this case, the terminal device 1 may or need not recognize that a plurality of downlink subframes have been transmitted from the plurality of base station devices 2. If the terminal device 1 does not recognize the above, the terminal device 1 may simply recognize that a plurality of downlink subframes have been transmitted from a plurality of cells. Moreover, the transport block extraction unit 605 determines whether the transport block has been detected correctly and transmits the determination result to the control unit 606.

Next, a flow of uplink signal transmission and reception will be described. In the terminal device 1, a downlink reference signal extracted by the downlink reference signal extraction unit 604 is transferred to the channel state measurement unit 608 in accordance with an instruction from the control unit 606, the channel state and/or interference is measured in the channel state measurement unit 608, and further a CSI is calculated on the basis of the measured channel state and/or interference. The control unit 606 instructs the uplink control information generation unit 610 to generate HARQ-ACK (DTX (not transmitted yet), ACK (detection succeeded), or NACK (detection failed)) and to map the HARQ-ACK to a downlink subframe on the basis of the determination result whether the transport block is correctly detected. The terminal device 1 performs these processes on the downlink subframe of each of a plurality of cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to RBs in an uplink subframe, and the uplink subframe is generated. Here, the PUCCH and the uplink subframe including the PUCCH are generated for each connectivity group (referred to also as "serving cell group" or "cell group"). Although the details of connectivity groups are to be described later, two connectivity groups are assumed here and correspond to the base station device 2-1 and the base station device 2-2. The uplink subframe of one of the connectivity groups (e.g., the uplink subframe transmitted to the base station device 2-1) is subjected to the SC-FDMA modulation to generate an SC-FDMA signal, and the SC-FDMA signal is transmitted via the transmit antenna 613 by the SC-FDMA signal transmission unit 611. The uplink subframe of the other connectivity group (e.g., the uplink subframe transmitted to the base station device 2-2) is subjected to the SC-FDMA modulation to generate an SC-FDMA signal, and the SC-FDMA signal is transmitted via the transmit antenna 614 by the SC-FDMA signal transmission unit 612. Alternatively, it is also possible to transmit uplink subframes of the two or more connectivity groups at the same time by the use of a single subframe.

Each of the base station device 2-1 and the base station device 2-2 receives an uplink subframe of one connectivity group. Specifically, the SC-FDMA signal is received by the SC-FDMA signal reception unit 509 via the receive antenna 508, and an SC-FDMA demodulation process is performed on the signal. In the uplink subframe processing unit 510, RBs to which the PUCCH is mapped are extracted in accordance with an instruction from the control unit 502, and, in the uplink control information extraction unit 511, the CSI included in the PUCCH is extracted. The extracted CSI is transferred to the control unit 502. The CSI is used for control of downlink transmission parameters (MCS, downlink resource allocation, HARQ, and the like) by the control unit 502.

Figure 7:
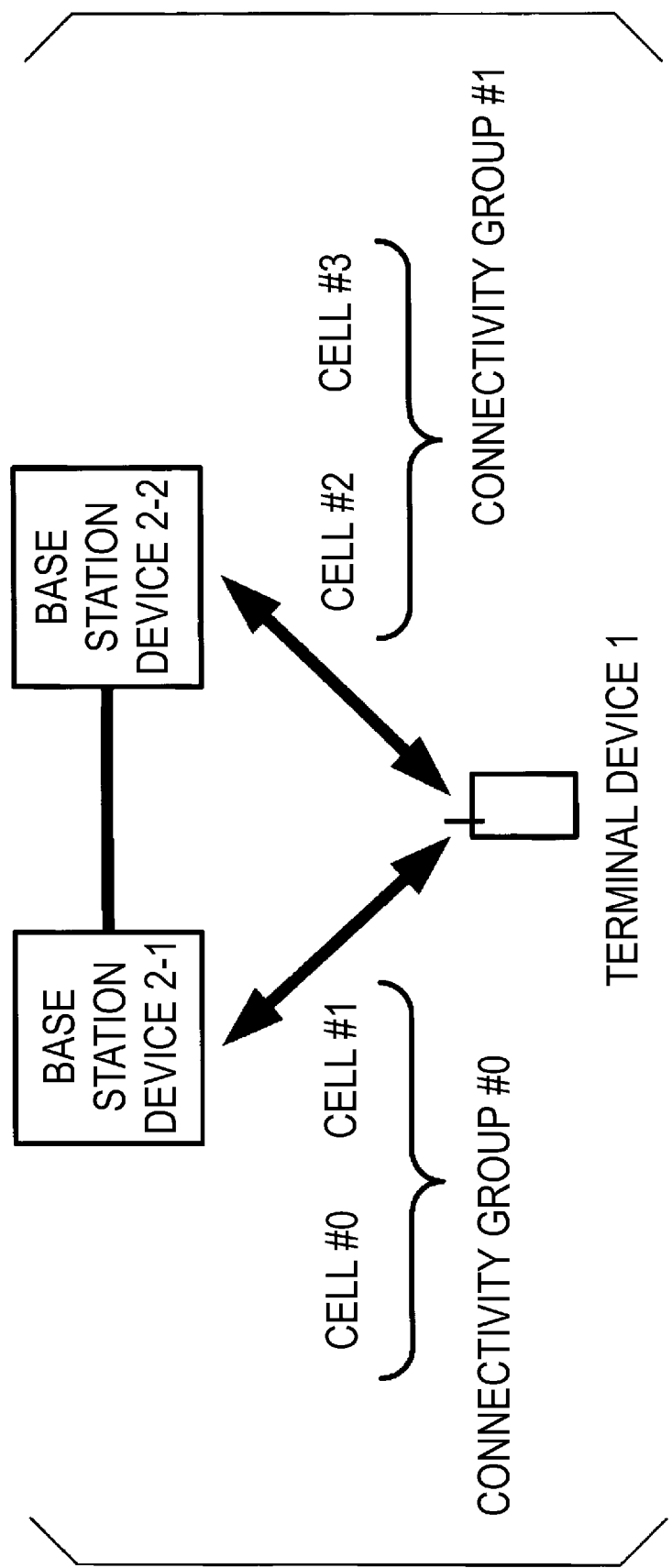
FIG. 7 is a diagram illustrating an example of a connectivity group according to the first embodiment.

FIG. 7 illustrates an example of a connectivity group (cell group). The base station device 2-1 and base station device 2-2 perform communications with the terminal device 1 in a plurality of serving cells (cell #0, cell #1, cell #2, and cell #3). The cell #0 is a primary cell, and the other cells, specifically, the cell #1, cell #2, and cell #3, are secondary cells. The four cells are covered (provided) by the base station device 2-1 and the base station device 2-2, which are two different base station devices in actual. The cell #0 and the cell #1 are covered by the base station device 2-1, and the cell #2 and the cell #3 are covered by the base station device 2-2. Serving cells are classified into a plurality of groups, and each group is referred to as "connectivity group". Here, serving cells connected over a low-speed back haul may be classified into different groups, while serving cells capable of using a high-speed backhaul or serving cells that are provided by the same device and hence need not use any backhaul may be classified into the same group. The serving cells of the connectivity group to which the primary cell belongs may be referred to as "master cell", and the serving cells of the other connectivity group may be referred to as "assistant cell." Moreover, one of the serving cells of each connectivity group (e.g., the serving cell having the smallest cell index in the connectivity group) may be referred to as "primary secondary cell" or "PS cell (also represented by pSCell)" in short. Note that the serving cells in each connectivity have component carriers of different carrier frequencies. In contrast, the serving cells of different connectivity groups may have component carriers of different carrier frequencies or may have component carriers of the same carrier frequency (the same carrier frequency may be configured). For example, the carrier frequencies of the downlink and uplink component carriers of the cell #1 are different from those of the cell #0. In contrast, the carrier frequencies of the downlink and uplink component carriers of the cell #2 may be different from or the same as those of the cell #0. Moreover, an SR is preferably transmitted for each connectivity group. The serving cell group including the primary cell may be referred to as "master cell group", and the serving cell group not including the primary cell (but including the primary secondary cell) may be referred to as "secondary group."

The terminal device 1 and the base station devices 2 may use, for example, any of the following methods (1) to (5) as a method of grouping serving cells. Note that connectivity groups may be configured by using a method different from (1) to (5).

(1) A connectivity identifier value is configured for each serving cell, and the serving cells for which the same connectivity identifier value is configured are regarded as being in a group. Note that the connectivity identifier value of the primary cell may take a prescribed value (e.g., 0) without being configured.

(2) A connectivity identifier value is configured for each secondary cell, and the secondary cells for which the same connectivity identifier value is configured are regarded as being in a group. Secondary cells for which no connectivity identifier value is configured are regarded as being in the same group as that of the primary cell.

(3) A SCell timing advanced group (STAG) identifier value is configured for each secondary cell, and the secondary cells for which the same STAG identifier value is configured are regarded as being in a group. Moreover, secondary cells for which no STAG identifier is configured are regarded as being in the same group as that of the primary cell. Note that this group is commonly used as a group for performing timing adjustment for uplink transmission with respect to downlink reception.

(4) One of the values 1 to 7 is configured for each secondary cell as a secondary cell index (serving ell index). The primary cell is assumed to have a serving cell index of 0. Secondary cells are grouped on the basis of the serving cell indices. For example, secondary cells each having a secondary cell index of one of 1 to 4 can be regarded as being in the same group as that of the primary cell, while secondary cells each having a secondary cell index of one of 5 to 7 can be regarded as being in a group different from that of the primary cell.

(5) One of the values 1 to 7 is configured for each secondary cell as a secondary cell index (serving cell index). The primary cell is assumed to have a serving cell index of 0. The base station devices 2 make notification of the serving cell index of each cell belonging to each group.

Here, connectivity identifiers, STAG identifiers, and secondary cell indices may be configured for the terminal device 1 by the base station device 2-1 or the base station device 2-2 by the use of dedicated RRC signaling.

Figure 8:
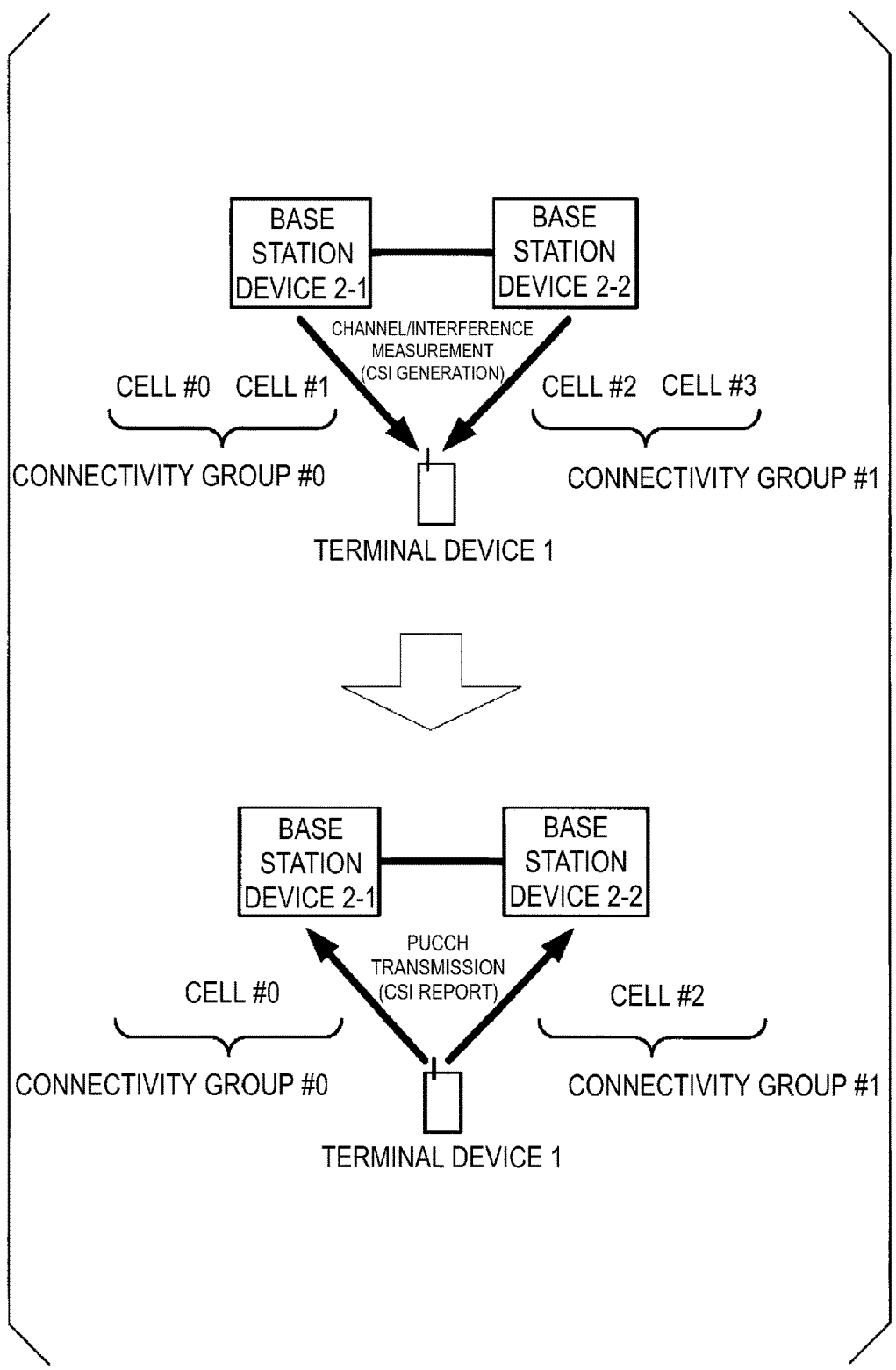
FIG. 8 is a diagram illustrating an example of CSI generation and report in connectivity groups according to the first embodiment.

FIG. 8 is a diagram illustrating an example of CSI generation and report in the connectivity groups of the terminal device 1. The base station device 2-1 and/or base station device 2-2 configures, in the terminal device 1, parameters for a downlink reference signal of each serving cell and transmits the downlink reference signal in the provided serving cell. The terminal device 1 receives the downlink reference signal of each serving cell and performs channel measurement and/or interference measurement. Note that downlink reference signals described here can include a CRS, a non-zero power CSI-RS, and zero power CSI-RS. Preferably, the terminal device 1 performs channel measurement by the use of non-zero power CSI-RS and performs interference measurement by the use of zero power CSI-RS. Further, the terminal device 1 calculates an RI indicating a preferable rank, a PMI indicating a preferable precoding matrix, and a CQI, which is the largest index corresponding to the modulation scheme and coding rate that satisfy required quality (e.g., the transport block error rate does not exceed 0.1) in a reference source on the basis of the channel measurement result and the interference measurement result.

Next, the terminal device 1 reports the CSI. In this operation, the CSI of each serving cell belonging to each connectivity group is reported by the use of an uplink resource (PUCCH resource or PUSCH resource) in a cell of the connectivity group. Specifically, in a subframe, the CSI of the cell #0 and the CSI of the cell #1 are transmitted on the PUCCH of the cell #0, which is the PS cell of the connectivity group #0 and also the primary cell. Moreover, in a subframe, the CSI of the cell #0 and the CSI of the cell #1 are transmitted on the PUSCH of one of the cells belonging to the connectivity group #0. Moreover, in a subframe, the CSI of the cell #2 and the CSI of the cell #3 are transmitted on the PUCCH of the cell #2, which is the PS cell of the connectivity group #1. Moreover, in a subframe, the CSI of the cell #2 and the CSI of the cell #3 are transmitted on the PUSCH of one of the cells belonging to the connectivity group #1. In a sense, each PS cell can provide some of the primary cell functions CSI transmission using the PUCCH) of traditional carrier aggregation. CSI report for each serving cell in each connectivity group behaves as CSI report for each serving cell in carrier aggregation.

The PUCCH resource for the periodic CSI of a serving cell belonging to a connectivity group is configured in the PS cell in the same connectivity group.

The base station device 2 transmits information for configuring a PUCCH resource for the periodic CSI in the PS cell, to the terminal device 1. When receiving information for configuring a PUCCH resource for the periodic CSI in the PS cell, the terminal device 1 reports the periodic CSI by the use of the PUCCH resource. The base station device 2 does not transmit information for configuring a PUCCH resource for the periodic CSI in any cell other than the PS cell, to the terminal device 1. When receiving information for configuring a PUCCH resource for the periodic CSI in any cell other than the PS cell, the terminal device 1 performs error handling while not reporting the periodic CSI by the use of the PUCCH resource.

Figure 9:
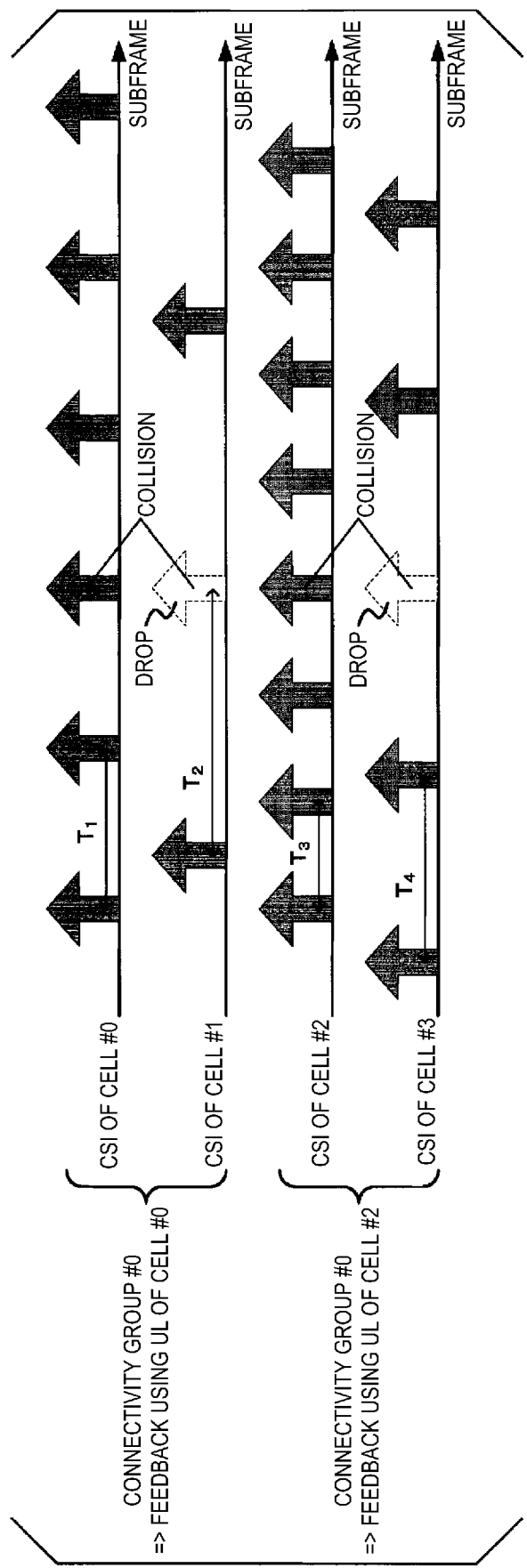
FIG. 9 is a diagram illustrating an example of periodic CSI report according to the first embodiment.

FIG. 9 illustrates an example of periodic CSI report. A periodic CSI is periodically fed back from the terminal device 1 to each of the base station devices 2 in the subframes of a period configured through dedicated RRC signaling. Moreover, a periodic CSI is normally transmitted on the PUCCH. Periodic CSI parameters (subframe period, offset from a reference subframe to a start subframe, and report mode) may be configured for each serving cell. A PUCCH resource index for the periodic CSI may be configured for each connectivity group. Here, the periods for the cell #0, #1, #2, and #3 are assumed to be configured respectively as $T_1$, $T_2$, $T_3$, and $T_4$. The terminal device 1 performs uplink transmission of the periodic CSI of the cell #0 in the subframes having a T period and performs uplink transmission of the periodic CSI of the cell #1 in the subframes having a $T_2$ period, by the use of the PUCCH resource of the cell #0, which is the PS cell of the connectivity group #0 and also the primary cell. The terminal device 1 performs uplink transmission of the periodic CSI of the cell #2 in the subframes having a $T_3$ period and performs uplink transmission of the periodic CSI of the cell #3 in the subframes having a $T_4$ period, by the use of the PUCCH resource of the cell #2, which is the PS cell of the connectivity group #1. When periodic CSI reports between a plurality of serving in a single connectivity group collide with each other (a plurality of periodic CSI reports occur in a single subframe), only one of the periodic CSI reports is transmitted, and the other periodic CSI reports are dropped (not transmitted).

As a method of determining which one of uplink resources (PUCCH resource or PUSCH resource) is to be used to transmit a periodic CSI report and/or HARQ-ACK, the terminal device 1 can use the following methods. Specifically, the terminal device 1 determines an uplink resource (PUCCH resource or PUSCH resource) on which a periodic CSI report and/or HARQ-ACK are transmitted in accordance with any one of the following (D1) to (D6), for each connectivity group.

(D1) When more than one serving cells are configured for the terminal device 1 and concurrent transmission of the PUSCH and PUCCH is not configured, and when the uplink control information of a connectivity group only includes a periodic CSI in a subframe n and the PUSCH is not transmitted in the connectivity group, the uplink control information is transmitted on the PUCCH of the PS cell in the connectivity group.

(D2) When more than one serving cells are configured for the terminal device 1 and concurrent transmission of the PUSCH and PUCCH is not configured, and when the uplink control information of a connectivity group includes a periodic CSI and/or HARQ-ACK in the subframe n and the PUSCH is transmitted in the PS cell in the connectivity group, the uplink control information is transmitted on the PUSCH of the PS cell in the connectivity group.

(D3) When more than one serving cells are configured for the terminal device 1 and concurrent transmission of the PUSCH and PUCCH is not configured, and when the uplink control information of a connectivity group includes a periodic CSI and/or HARQ-ACK in the subframe n, the PUSCH is not transmitted in the PS cell in the connectivity group, and the PUSCH is transmitted by the use of at least one of the secondary cells other than the PS cell in the connectivity group, the uplink control information is transmitted on the PUSCH of the secondary cell having the smallest cell index in the connectivity group.

(D4) When more than one serving cells are configured for the terminal device 1 and concurrent transmission of the PUSCH and PUCCH is configured, and when the uplink control information of a connectivity group only includes a periodic CSI in the subframe n, the uplink control information is transmitted on the PUCCH of the PS cell of the connectivity group.

(D5) When more than one serving cells are configured for the terminal device 1 and concurrent transmission of the PUSCH and PUCCH is configured, and when the uplink control information of a connectivity group includes a periodic CSI and HARQ-ACK in the subframe n and the PUSCH is transmitted in the PS cell in the connectivity group, the HARQ-ACK is transmitted on the PUCCH of the PS cell in the connectivity group, and the periodic CSI is transmitted on the PUSCH of the PS cell in the connectivity group.

(D6) When more than one serving cells are configured for the terminal device 1 and concurrent transmission of the PUSCH and PUCCH is configured, and when the uplink control information of a connectivity group includes a periodic CSI and HARQ-ACK in the subframe n and the PUSCH is not transmitted in the PS cell in the connectivity group and the PUSCH is transmitted in at least one of other secondary cells in the same connectivity group, the HARQ-ACK is transmitted on the PUCCH of the PS cell in the connectivity group, and the periodic CSI is transmitted on the PUSCH of the secondary cell having the smallest secondary cell index in the connectivity group.

As described above, in the communication system including the terminal device 1 and the plurality of base station devices 2, each of which communicates by the use of at least one serving cells, the terminal device 1 configures, in the higher-layer control information acquisition unit, a connectivity identifier for each serving cell, and calculates, in the channel state information generation unit, periodic channel state information for each serving cell. When reports of periodic channel state information of serving cells having the same connectivity identifier value collide with each other in one subframe, the uplink control information generation unit drops all the pieces of periodic channel state information other than one piece and generates uplink control information, and the uplink control information transmission unit transmits an uplink subframe including the uplink control information. At least one of the base station device 2-1 and the base station device 2-2 configures, in the higher-layer control information notification unit, a value corresponding to each of the plurality of base station devices, as a connectivity identifier for each serving cell (for example, a first value for the serving cell of the base station device 2-1 and a second value for the serving cell of the base station device 2-2). Moreover, each of the base station device 2-1 and base station device 2-2 receives, in the uplink control information reception unit, an uplink subframe, and, when reports of periodic channel state information of two or more serving cells having the connectivity identifier value corresponding to the first base station device collide with each other in one of the uplink subframes, extracts, in the uplink control information extraction unit, uplink control information including only one piece of periodic channel state information of the colliding pieces of periodic channel state information. Preferably, the CSI of each the serving cell of each of the connectivity groups is transmitted and received in an uplink subframe in the PS cell of the connectivity group.

Here, the functions of the higher-layer control information notification unit may be included in both or only one of the base station device 2-1 and the base station device 2-2. Note that the functions being included in only one of the base station device 2-1 and the base station device 2-2 means that, in dual connectivity, higher-layer control information is transmitted from one of the base station device 2-1 and the base station device 2-2 and does not mean that the base station device 2-1 or the base station device 2-2 has a configuration of not including the higher-layer control information notification unit itself. The base station device 2-1 and base station device 2-2 have a backhaul transmission/reception mechanism. When the base station device 2-2 makes a configuration associated with the serving cells provided by the base station device 2-1 (including a connectivity group configuration for the serving cells), the base station device 2-1 transmits information indicating the configuration to the base station device 2-2 via a backhaul, and the base station device 2-2 makes the configuration (configuration in the base station device 2-2 or signaling to the terminal device 1) on the basis of the information received via the backhaul. In contrast, when the base station device 2-1 makes a configuration associated with the serving cells provided by the base station device 2-2, the base station device 2-2 transmits information indicating the configuration to the base station device 2-1 via the backhaul, and the base station device 2-1 makes the configuration (configuration in the base station device 2-1 or signaling to the terminal device 1) on the basis of the information received via the backhaul. Alternatively, some of the functions of the higher-layer control information notification unit may be included in the base station device 2-2, and the other functions may be included in the base station device 2-1. In this case, the base station device 2-1 may be referred to as "master base station device", and the base station device 2-2 may be referred to as "assist base station device." The assist base station device is capable of providing, to the terminal device 1, a configuration associated with the serving cells provided by the assist base station device (including a connectivity group configuration for the serving cells). In contrast, the master base station device is capable of providing, to the terminal device 1, a configuration associated with the serving cells provided by the master base station device (including connectivity group configuration for the serving cells).

The terminal device 1 is capable of recognizing that the terminal device 1 is communicating only with the base station device 2-1. In other words, the higher-layer control information acquisition unit can acquire pieces of higher-layer control information notified by the base station device 2-1 and the base station device 2-2 as those notified by the base station device 2-1. Alternatively, the terminal device 1 is capable of recognizing that the terminal device 1 is communicating with two base station devices, namely, the base station device 2-1 and base station device 2-1. Specifically, the higher-layer control information acquisition unit can acquire a piece of higher-layer control information notified by the base station device 2-1 and a piece of higher-layer control information notified by the base station device 2-2 and merge the pieces together.

With this configuration, each of the base station devices 2 can receive a desired periodic CSI report directly from the terminal device 1 without involving the other base station device 2. Hence, even when the base station devices 2 are connected to each other through a low-speed backhaul, scheduling can be performed by the use of a timely periodic CSI report.

Next, non-periodic CSI report will be described. A non-periodic CSI report is transmitted on a PUSCH in accordance with an instruction made by using a CSI request field in an uplink grant transmitted in a PDCCH or EPDCCH. More specifically, the base station device 2-1 or the base station device 2-2 first configures n kinds (where n is a natural number) of combinations of serving cells (or combinations of CSI processes) in the terminal device 1 through dedicated RRC signaling. The CSI request field can express n+2 kinds of states. The states indicate that any non-periodic CSI report is not fed back, a CSI report in the serving cell allocated by an uplink grant (or in the CSI process of the serving cell allocated by an uplink grant) is fed back, and CSI reports in the n kinds (where n is a natural number) of combinations of serving cells (or combinations of CSI processes) configured in advance are fed back. The base station device 2-1 or the base station device 2-2 configures a value for a CSI request field on the basis of a desired CSI report, and the terminal device 1 determines a CSI report to be made on the basis of the CSI request field value and makes the CSI report. The base station device 2-1 or the base station device 2-2 receives the desired CSI report.

As an example of a non-periodic CSI report during dual connectivity, n kinds (where n is a natural number) of combinations of serving cells (or combinations of CSI processes) are configured for each connectivity group. For example, the base station device 2-1 or the base station device 2-2 configures n kinds (where n is a natural number) of combinations of serving cells of the connectivity group #0 (or combinations of CSI processes of the connectivity group #0) and n kinds (where n is a natural number) of combinations of serving cells of the connectivity group #1 (or combinations of CSI processes of the connectivity group #0) in the terminal device 1. The base station device 2-1 or the base station device 2-2 configures a value for a CSI request field on the basis of the desired CSI report. The terminal device 1 determines the connectivity group to which the serving cell belongs, the PUSCH resource being allocated to the serving cell by an uplink grant requesting a non-periodic CSI report, determines the CSI report to be made, by the use of the n kinds (where n is a natural number) of combinations of serving cells (or combinations of CSI processes) corresponding to the connectivity group to which the serving cell belongs, the PUSCH resource being allocated to the serving cell by the uplink grant requesting the non-periodic CSI report, and makes a non-periodic CSI report on the PUSCH allocated by the uplink grant requesting the non-periodic CSI report. The base station device 2-1 or the base station device 2-2 receives the desired CSI report.

As another example of a non-periodic CSI report during dual connectivity, one of then kinds (where n is a natural number) of combinations of serving cells (or combinations of CSI processes) is configured. Each of the n kinds (where n is a natural number) of combinations of serving cells (or combinations of CSI processes) is limited to a combination of serving cells belonging to any of the connectivity groups (or a combination of CSI processes of serving cells belonging to any of the connectivity groups). The base station device 2-1 or the base station device 2-2 configures a value for a CSI request field on the basis of the desired non-periodic CSI report, and the terminal device 1 determines the non-periodic CSI report to be made on the basis of the value for the CSI request field to thereby make the non-periodic CSI report. The base station device 2-1 or the base station device 2-2 receives the desired non-periodic CSI report.

With this configuration, each of the base station devices 2 can receive a desired non-periodic CSI report directly from the terminal device 1 without involving the other base station device 2. Moreover, each PUSCH only includes non-periodic CSI reports of the serving cells belonging to a single connectivity group (or CSI processes of the serving cells belonging to a single connectivity group), and hence each of the base station devices 2 can receive a non-periodic CSI report independent of the configuration of the other base station 2, from the terminal device 1. Hence, even when the base station devices 2 are connected to each other through a low-speed backhaul, scheduling can be performed by the use of timely periodic CSI report.

Next, uplink power control of the terminal device 1 in dual connectivity will be described. Here, uplink power control includes power control in uplink transmission. Uplink transmission includes transmission of uplink signals/uplink physical channels, such as a PUSCH, PUCCH, PRACH, and SRS. In the following description, the MeNB may collectively make notifications of (configure) parameters associated with both the MeNB and SeNB. The SeNB may collectively make notifications of (configure) parameters associated with both the MeNB and SeNB. The MeNB and SeNB may make notifications of (configure) respective parameters associated with the MeNB and SeNB.

Figure 10:
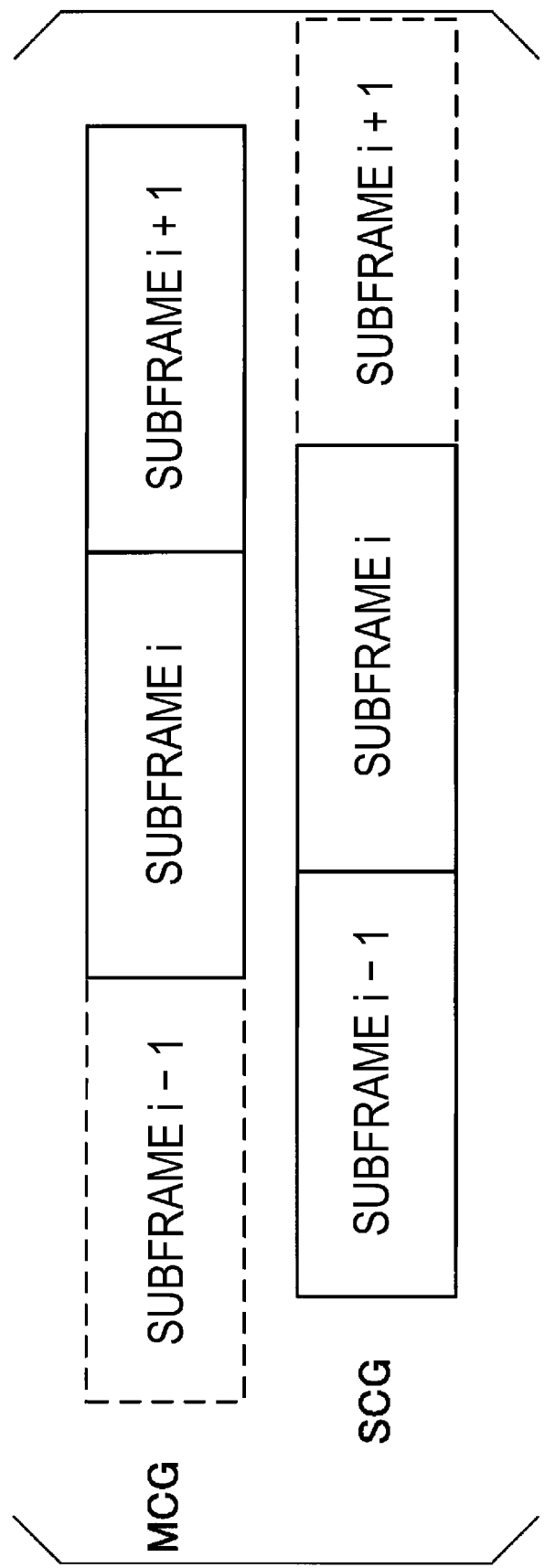
FIG. 10 is a diagram illustrating an example of subframes in uplink transmission in dual connectivity.

FIG. 10 is a diagram illustrating an example of subframes in uplink transmission in dual connectivity. In this example, the uplink transmission timing in the MCG and the uplink transmission timing in the MCG are different from each other. For example, subframe i in the MCG overlaps subframe i−1 in the SCG and subframe i in the SCG. The subframe i in the SCG overlaps the subframe i in the MCG and subframe i+1 in the MCG. For this reason, in dual connectivity, transmit power control for uplink transmission in a cell group preferably takes into account transmit power of two subframes that each subframe overlap in the other cell group.

The terminal device 1 may individually perform uplink power control for the MCG including the primary cell and the SCG including the primary secondary cell. Note that uplink power control includes transmit power control for uplink transmission. Uplink power control includes transmit power control of the terminal device 1.

For the terminal device 1, the maximum allowable output power $P_{EMAX}$ of the terminal device 1 is configured by the use of higher-layer dedicated signaling and/or higher-layer shared signaling (e.g., system information block (SIB)). This maximum allowable output power may be referred to as "higher-layer maximum output power". For example, $P_{EMAX, c}$, which is the maximum allowable output power in the serving cell c, is given on the basis of P-Max configured for the serving cell c. In other words, $P_{EMAX, c}$ takes the same value as P-Max in the serving cell c.

For the terminal device 1, a power class $P_{PowerClass}$ of the terminal device 1 is defined in advance for each frequency band. Power class is the maximum output power defined without taking into account allowable error defined in advance. For example, power class is defined as 23 dBm. The maximum output power may be configured for each of the MCG and SCG on the basis of the power class defined in advance. Power classes may be defined for each of the MCG and SCG independently.

For the terminal device 1, the configured maximum output power is configured for each serving cell. For the terminal device 1, the configured maximum output power $P_{CMAX, c}$ for the serving cell c is configured. $P_{CMAX}$ is the total of $P_{CMAX, c}$. Note that the configured maximum output power may be referred to as "physical-layer maximum output power."

$P_{CMAX, c}$ is a value equal to or greater than $P_{CMAX\_L, c}$ and equal to or smaller than $P_{CMAX\_H, c}$. For example, the terminal device 1 sets $P_{CMAX}$ within the range. $P_{CMAX\_L, c}$ is the minimum value of the $P_{EMAX, c}$ and $P_{PowerClass}$. $P_{CMAX\_L, c}$ is the minimum value of a value based on $P_{EMAX, c}$ and a value based on $P_{PowerClass}$. The value based on $P_{PowerClass}$ is the value obtained by subtracting a value based on maximum power reduction (MPR) from $P_{PowerClass}$. MPR is the maximum power reduction for maximum output power and is determined on the basis of the modulation scheme and the configuration of the transmission bandwidth for the uplink channel and/or uplink signal to be transmitted. For each subframe, MPR is evaluated for each slot and is given on the basis of evaluation for each slot and the maximum value obtained through transmission in the slot. The maximum MPR in the two slots of a subframe is used for the entire subframe. In other words, MPR may be different for each subframe, and hence $P_{CMAX\_L, c}$ may also be different for each subframe. As a result, $P_{CMAX, c}$ may also be different for each subframe.

The terminal device 1 can configure or determine $P_{CMAX}$ for each of the MeNB (MCG) and SeNB (SCG). In other words, the total power allocation can be configured or determined for each cell group. The total configured maximum output power for the MeNB is defined as $P_{CMAX, MeNB}$, and the total power allocation for the MeNB is defined as $P_{alloc\_MeNB}$. The total configured maximum output power for the SeNB is defined as $P_{CMAX, SeNB}$, and the total power allocation for the SeNB is defined as $P_{alloc\_SeNB}$. $P_{CMAX, MeNB}$ and $P_{alloc\_MeNB}$ may be the same value. $P_{CMAX, SeNB}$ and $P_{alloc\_SeNB}$ may be the same value. In other words, the terminal device 1 performs transmit power control so that the total output power (allocation power) of the cells associated with the MeNB is to be equal to or smaller than $P_{CMAX, MeNB}$ or $P_{alloc\_MeNB}$ and the total output power (allocation power) of the cells associated with the SeNB is equal to or smaller than $P_{CMAX, SeNB}$ or $P_{alloc\_SeNB}$. Specifically, the terminal device 1 performs scaling on transmit power of uplink transmission for each cell group so that the value configured for the cell group is not exceeded. Here, scaling is to stop transmission or reduce transmit power for uplink transmission with a lower priority for each cell group, on the basis of the priorities for uplink transmissions to be performed at the same time and the configured maximum output power for the cell group. Note that, when transmit power control is performed for each uplink transmission, the method described in the present embodiment is used for each uplink transmission.

$P_{CMAX, MeNB}$ and/or $P_{CMAX, SeNB}$ is configured on the basis of the minimum guaranteed power configured through higher-layer signaling. In the following, details of the minimum guaranteed power are described.

The minimum guaranteed power is configured for each cell group. When the minimum guaranteed power is not configured by higher-layer signaling, the terminal device 1 may set the minimum guaranteed power to a predefined value (e.g., 0). The configured maximum output power of the MeNB is defined as $P_{MeNB}$. The configured maximum output power of the SeNB is defined as $P_{SeNB}$. For example, each of $P_{MeNB}$ and $P_{SeNB}$ may be used as the minimum powers guaranteed to maintain the minimum communication quality for uplink transmission to the corresponding one of the MeNB and SeNB. The minimum guaranteed power is also referred to as "guaranteed power", "held power", or "required power."

The guaranteed power may be used, when the total of the transmit power of the uplink transmission to the MeNB and the transmit power of the uplink transmission to the SeNB exceeds $P_{CMAX}$, to maintain the transmission or transmission quality of a channel or signal with a higher priority on the basis of the priority levels defined in advance or the like. It is also possible to assume each of $P_{MeNB}$ and $P_{SeNB}$ as the minimum required power (i.e., guaranteed power) to be used in communication and use, in the calculation of power allocation for each CG, the power as a power value to be reserved for the CGs other than the calculation target CG.

$P_{MeNB}$ and $P_{SeNB}$ can be defined as absolute power values (e.g., represented in the unit of dBm). In the case of using absolute power values, $P_{MeNB}$ and $P_{SeNB}$ are configured. The total value of $P_{MeNB}$ and $P_{SeNB}$ is preferably equal to or smaller than $P_{CMAX}$ but is not limited thereto. When the total value of $P_{MeNB}$ and $P_{SeNB}$ is greater than $P_{CMAX}$, the process for reducing the total power to $P_{CMAX}$ or lower by scaling is further required. For example, in the scaling, each of the total power value of the MCG and the total power value of SCG is multiplied by a single coefficient that is a value smaller than one.

Each of $P_{MeNB}$ and $P_{SeNB}$ may be defined as the ratio (scale or relative value) to $P_{CMAX}$. For example, each of $P_{MeNB}$ and $P_{SeNB}$ may be expressed in the unit of dB with respect to the decibel value of $P_{CMAX}$, or as the ratio to the true value of $P_{CMAX}$. The ratio of $P_{MeNB}$ and the ratio of $P_{SeNB}$ are configured, and $P_{MeNB}$ and $P_{SeNB}$ are determined on the basis of the ratios. In the case of expression using ratios, the total value of the ratio of $P_{MeNB}$ and the ratio of $P_{SeNB}$ is preferably equal to or lower than 100%.

The above may alternatively be expressed as follows. $P_{MeNB}$ and/or $P_{SeNB}$ can be configured commonly or independently as parameters for uplink transmission via higher-layer signaling. $P_{MeNB}$ indicates the minimum ensured power with respect to the total transmit power allocated to each or all uplink transmissions in the cells belonging to the MeNB. $P_{SeNB}$ indicates the minimum ensured power with respect to the total transmit power allocated to each or all uplink transmissions in the cells belonging to the SeNB. Each of $P_{MeNB}$ and $P_{SeNB}$ is a value equal to or greater than zero. The total of $P_{MeNB}$ and $P_{SeNB}$ may be configured so as not to exceed $P_{CMAX}$ or prescribed maximum transmit power. In the following description, the minimum ensured power may also be referred to as "ensured power" or "guaranteed power."

Note that guaranteed power may be configured for each serving cell. Alternatively, guaranteed power may be configured for each cell group. Alternatively, guaranteed power may be configured for each base station device (MeNB and SeNB). Alternatively, guaranteed power may be configured for each uplink signal. Alternatively, guaranteed power may be configured for higher-layer parameter. Only $P_{MeNB}$ may be configured through an RRC message while $P_{SeNB}$ is not configured through an RRC message. In this case, the value (remaining power) obtained by subtracting configured $P_{MeNB}$ from $P_{CMAX}$ may be set as $P_{SeNB}$.

Guaranteed power may be set for each subframe irrespective of whether there is uplink transmission. Moreover, guaranteed power need not be applied to subframes (e.g., a downlink subframe in a TDD UL-DL configuration) for which no uplink transmission is expected (the terminal device has recognized that no uplink transmission is to be performed). In other words, to determine transmit power for a certain CG, no guaranteed power need be reserved for the other CG. Moreover, guaranteed power may be applied to subframes in which periodic uplink transmission occurs (e.g., P-CSI, trigger type 0 SRS, TTI bundling, SPS, RACH transmission in higher-layer signaling, or the like). Information indicating whether the guaranteed power is valid or invalid for all subframes may be notified through a higher layer.

A subframe set to which the guaranteed power is applied may be notified as a higher-layer parameter. Note that the subframe set to which guaranteed power is applied may be configured for each serving cell. Alternatively, the subframe set to which guaranteed power is applied may be configured for each cell group. Alternatively, the subframe set to which guaranteed power is applied may be configured for each uplink signal. Alternatively, the subframe set to which guaranteed power is applied may be configured for each base station device (MeNB and SeNB). The subframe set to which guaranteed power is applied may be in common among the base station devices (MeNB and SeNB). In this case, the MeNB and SeNB may be synchronized. When the MeNB and SeNB are asynchronous, the subframe set to which guaranteed power is applied may be set separately.

When guaranteed power is configured for each of the MeNB (MCG and serving cells belonging to the MCG) and the SeNB (SCG and serving cells belonging to the SCG), whether to consistently set the guaranteed power for all the subframes may be determined on the basis of the frame structure type set for the MeNB (MCG and serving cells belonging to the MCG) and the SeNB (SCG and serving cells belonging to the SCG). For example, when the frame structure types for the MeNB and SeNB are different from each other, the guaranteed power may be set for all the subframes. In this case, MeNB and SeNB need not be synchronized. When the MeNB and SeNB (the subframes and radio frames of MeNB and SeNB) are synchronized, the guaranteed power need not be considered for FDD uplink subframes (uplink cell subframes) overlapping the downlink subframes in a TDD UL-DL configuration. In other words, the maximum value of the uplink power for the uplink transmission in an FDD uplink subframe in this case may be $P_{UE\_MAX}$ or $P_{UE\_MAX, c}$.

Details of a method of configuring (method of determining) $P_{alloc, MeNB}$ and/or $P_{alloc, SeNB}$ will be described below.

An example of determination of $P_{alloc,\ MeNB}$ and/or $P_{alloc,\ SeNB}$ is carried out through the following steps. In the first step, $P_{pre\_MeNB}$ and $P_{pre\_SeNB}$ are obtained respectively in the MCG and SCG. Each of $P_{pre\_MeNB}$ and $P_{pre\_SeNB}$ is given by the smallest value of the total power required for actual uplink transmission in the corresponding one of the cell groups and the guaranteed power (i.e., $P_{MeNB}$ or $P_{SeNB}$) configured for the corresponding cell group. In the second step, the remaining power is allocated (added) to $P_{pre\_MeNB}$ and/or $P_{pre\_SeNB}$ in a prescribed method. The remaining power is power obtained by subtracting $P_{pre\_MeNB}$ and $P_{pre\_SeNB}$ from $P_{CMAX}$. Part of or all the remaining power can be used. The powers determined through these steps are used as $P_{alloc,\ MeNB}$ and $P_{alloc,\ SeNB}$.

An example of power required for actual uplink transmission is power determined on the basis of allocation of actual uplink transmission and transmit power control for the uplink transmission. For example, when uplink transmission relates to a PUSCH, the power is determined at least on the basis of the number of RBs to which the PUSCH is allocated, estimation of downlink path loss calculated in the terminal device 1, values referred to by a transmit power control command, and parameters configured through higher-layer signaling. When uplink transmission relates to a PUCCH, the power is determined at least on the basis of values dependent on the PUCCH format, values referred to by a transmit power control command, and estimation of downlink path loss calculated in the terminal device 1. When uplink transmission relates to an SRS, the power is determined at least on the basis of the number of RBs for transmitting the SRS and a state adjusted for the current power control for the PUSCH.

An example of power required for actual uplink transmission is the smallest value of the power determined on the basis of allocation of the actual uplink transmission and the transmit power control for the uplink transmission and the configured maximum output power (i.e., $P_{CMAX,\ c}$) of the cell to which the uplink transmission is allocated. Specifically, the required power for a certain cell group (power required for an actual uplink transmission) is given according to $\Sigma$ (min ($P_{CMAX,\ j}$, $P_{PUCCH}+P_{PUSCH,\ j}$)). Note that j indicates a serving cell associated with the cell group. When the serving cell is PCell or pSCell and no PUCCH transmission is to be carried out in the serving cell, $P_{PUCCH}$ is set to zero. When the serving cell is SCell (in other words, the serving cell is not PCell or pSCell), $P_{PUCCH}$ is set to zero. When no PUSCH transmission is to be carried out in the serving cell, $P_{PUSCH,\ j}$ is set to zero. Note that, for the method of calculating required power, the method to be described below in Steps (t1) to (t9) may be used.

An example of determination of $P_{alloc,\ MeNB}$ and/or $P_{alloc,\ SeNB}$ is carried out through the following steps. In the first step, $P_{pre\_MeNB}$ and $P_{pre\_SeNB}$ are obtained respectively in the MCG and SCG. Each of $P_{pre\_MeNB}$ and $P_{pre\_SeNB}$ is given, in the corresponding one of the cell groups, by the guaranteed power (i.e., $P_{MeNB}$ or $P_{SeNB}$) configured for the corresponding cell group. In the second step, the remaining power is allocated (added) to $P_{pre\_MeNB}$ and/or $P_{pre\_SeNB}$ in a prescribed method. For example, the remaining power is allocated by assuming that a cell group to be transmitted earlier has a higher priority. For example, the remaining power is allocated to the cell group to be transmitted earlier without considering the cell group which may be transmitted later. The remaining power is the power obtained by subtracting $P_{pre\_MeNB}$ and $P_{pre\_SeNB}$ from $P_{CMAX}$. Part of or all the remaining power can be used. The powers determined through these steps are used as $P_{alloc,\ MeNB}$ and $P_{alloc,\ SeNB}$.

The remaining power can be allocated to uplink channels and/or uplink signals that do not satisfy $P_{MeNB}$ or $P_{SeNB}$. The remaining power is allocated on the basis of the priorities for the types of uplink transmission. The types of uplink transmission correspond to uplink channel, uplink signal, and/or UCI. The priorities are given over the cell groups. The priorities may be defined in advance or may be configured through higher-layer signaling.

An example of the case of the priorities being defined in advance is based on cell groups and uplink channels. For example, the priorities for the types of uplink transmission are defined in the order from a PUCCH in the MCG, a PUCCH in the SCG, a PUSCH including the UCI in the MCG, a PUSCH including the UCI in the SCG, a PUSCH not including the UCI in the MCG, and then a PUSCH not including the UCI in the SCG.

An example of the case of the priorities being defined in advance is based on cell groups, uplink channels, and/or the types of UCI. For example, the priorities for the types of uplink transmission are defined in the order from a PUCCH or PUSCH including the UCI including at least HARQ-ACK and/or SR in the MCG, a PUCCH or PUSCH including the UCI including at least HARQ-ACK and/or SR in the SCG, a PUCCH or PUSCH including the UCI only including the CSI in the MCG, a PUCCH or PUSCH including the UCI only including a CSI in the SCG, a PUSCH not including the UCI in the MCG, and then a PUSCH not including the UCI in the SCG.

In an example of the case of priorities being configured through higher-layer signaling, the priorities are configured on the basis of cell groups, uplink channels, and/or the types of UCI. For example, the priorities for the types of uplink transmission are configured for each of a PUCCH in the MCG, a PUCCH in the SCG, a PUSCH including the UCI in the MCG, a PUSCH including the UCI in the SCG, a PUSCH not including the UCI in the MCG, and then a PUSCH not including the UCI in the SCG.

In an example of remaining power allocation based on priorities, the remaining power is allocated to the cell group having the type of uplink transmission with the highest priority in the cell groups. Note that the power still remaining after the allocation to the cell group having the type of uplink transmission with the highest priority is allocated to the other cell group. Details of operations of the terminal device 1 are as follows.

In an example of remaining power allocation based on priorities, the remaining power is allocated to the cell group having a high total of parameters (points) based on the priorities.

In an example of remaining power allocation based on priorities, the remaining power is allocated to the cell groups in accordance with the ratios determined on the basis of the totals of the parameters (points) based on the priorities. For example, when the totals of the parameters (points) based on the priorities for the MCG and SCG are respectively 15 and 5, 75% of the remaining power is allocated to the MCG, and 25% of the remaining power is allocated to the SCG. Parameters based on the priorities may be determined further on the basis of the number of resource blocks allocated to uplink transmission.

In an example of remaining power allocation based on priorities, the remaining power is allocated to the types of uplink transmission in the order from the type of uplink transmission having a higher priority. The allocation is carried out over the cell groups in accordance with the priorities for the types of uplink transmission. Specifically, the remaining power is allocated to the types of uplink transmission in the order from the type of transmission having a higher priority so that required power for each type of uplink transmission is satisfied. Further, the allocation is carried out by assuming that each of $P_{pre\_MeNB}$ and $P_{pre\_SeNB}$ is allocated to the type of uplink transmission having high priorities in the corresponding cell group. On the basis of this assumption, the remaining power is allocated to the types of uplink transmission in the order from the type of uplink transmission having a higher priority among the types of uplink transmission for which the required power is not satisfied.

In an example of remaining power allocation based on priorities, the remaining power is allocated to the types of uplink transmission in the order from the type of uplink transmission having a higher priority. The allocation is carried out over the cell groups in accordance with the priorities for the types of uplink transmission. Specifically, the remaining power is allocated to the type of uplink transmission in the order from the type of uplink transmission having a higher priority so that required power for each type of uplink transmission is satisfied. Further, the allocation is carried out by assuming that each of $P_{pre\_MeNB}$ and $P_{pre\_SeNB}$ is allocated to the types of uplink transmission having lower priorities in the corresponding cell group. On the basis of this assumption, the remaining power is allocated to the types of uplink transmission in the order from the type of uplink transmission having a higher priority among the types of uplink transmission for which the required power is not satisfied.

Another example of remaining power allocation based on priorities is as follows. A terminal device communicating with a base station device by using a first cell group and a second cell group includes a transmission unit that transmits a channel and/or signal on the basis of the maximum output power of the first cell group in a certain subframe. When information on uplink transmission in the second cell group is recognized, the remaining power is allocated on the basis of the priorities for the types of uplink transmission. The remaining power is given by subtracting the power determined on the basis of uplink transmission in the first cell group and the power determined on the basis of uplink transmission in the second cell group, from the total maximum output power of the terminal device. The maximum output power is the total of the power determined on the basis of the uplink transmission in the first cell group and the power allocated to the first cell group from the remaining power.

The remaining power is allocated to the cell groups in the order from the cell group having the type of uplink transmission having a higher priority.

Alternatively, the remaining power is allocated by assuming as follows. The power determined on the basis of uplink transmission in the first cell group is allocated to the types of uplink transmission having higher priorities in the first cell group. The power determined on the basis of uplink transmission in the second cell group is allocated to the types of uplink transmission having higher priorities in the second cell group.

Alternatively, the remaining power is allocated by assuming as follows. The power determined on the basis of uplink transmission in the first cell group is allocated to the types of uplink transmission having lower priorities in the first cell group. The power determined on the basis of uplink transmission in the second cell group is allocated to the types of uplink transmission having lower priorities in the second cell group.

Moreover, the remaining power is allocated on the basis of the total of parameters determined on the basis of the priorities for the types of uplink transmission in each of the cell groups.

An example of a specific method of allocating guaranteed power and remaining power (residual power) to cell groups (CGs) is as follows. In power allocation for CGs, guaranteed power allocation is carried out in the first step, and residual power allocation is carried out in the second step. The powers allocated in the first step are $P_{pre\_MeNB}$ and $P_{pre\_SeNB}$. The totals of the powers allocated in the first step and the powers allocated in the second step are $P_{alloc\_MeNB}$ and $P_{alloc\_SeNB}$. Note that guaranteed power is also referred to as "first reserve power", "power allocated in the first step" or "first allocation power." Residual power is also referred to as "second reserve power", "power allocated in the second step" or "second allocation power."

An example of guaranteed power allocation follows the following rules.

(G1) If a terminal device has recognized that, in a certain CG (first CG) (at the time of determining power to allocate to the certain CG (first CG)), uplink transmission in another CG (second CG) is not to be carried out in the subframes overlapping the subframe of the certain CG (first CG), the terminal device does not reserve (not allocate) guaranteed power for power to be allocated to the other CG (second CG) in this case.

(G2) In other cases, the terminal device reserves (allocates) guaranteed power for power to be allocated to the other CG (second CG).

An example of residual power allocation follows the following rules.

(R1) If a terminal device has recognized that, in a certain CG (first CG) (at the time of determining power to allocate to the certain CG (first CG)), uplink transmission with a higher priority than that of uplink transmission in the certain CG (first CG) is to be carried out in the subframes overlapping the subframe of the certain CG (first CG) in another CG (second CG), the terminal device reserves residual power for power to be allocated to the other CG (CG) in this case.

(R2) In other cases, the terminal device allocates the residual power to the certain CG (first CG) and does not reserve residual power for power to be allocated to the other CG (second CG).

An example of guaranteed power allocation follows the following rules.

(G1) If a terminal device does not recognize, in a certain CG (first CG) (at the time of determining power to allocate to the certain CG (first CG)), information on uplink transmission in another CG (second CG) in the subframes overlapping the subframe of the certain CG (first CG), the terminal device performs the following operations. On the basis of the information on the uplink transmission in the certain CG (first CG), the terminal device allocates required power ($P_{pre\_MeNB}$ or $P_{pre\_SeNB}$) to the power to be allocated to the certain CG (first CG). The terminal device allocates guaranteed power ($P_{MeNB}$ or $P_{SeNB}$) to power to be allocated to the other CG (second CG).

(G2) In other cases, the terminal device performs the following operations. On the basis of the information on the uplink transmission in the certain CG (first CG), the terminal device allocates required power ($P_{pre\_MeNB}$ or $P_{pre\_SeNB}$) to the power to be allocated to the certain CG (first CG). On basis of information on uplink transmission in the other CG (second CG), the terminal device allocates required power ($P_{pre\_MeNB}$ or $P_{pre\_SeNB}$) to power to be allocated to the other CG (second CG).

An example of residual power allocation follows the following rules.

(R1) If a terminal device does not recognize, in a certain CG (first CG) (at the time of determining power to allocate to the certain CG (first CG)), information on uplink transmission in another CG (second CG) in the subframes overlapping the subframe of the certain CG (first CG), the terminal device performs the following operation. The terminal device allocates residual power to the power to be allocated to the certain CG (first CG).

(R2) In other cases, the terminal device allocates the residual power to the power to be allocated to the certain CG (first CG) and the power to be allocated to the other CG (second CG), in a prescribed method. As a specific method, the method described in the present embodiment can be used.

An example of defining (a method of calculating) remaining power is as follows. This example corresponds to a case in which the terminal device 1 has recognized uplink transmission allocation to the subframes overlapping in the other cell group.

In the subframe i illustrated in FIG. 10, remaining power to be calculated in a case of computing allocation power ($P_{alloc,\ MeNB}$) for the MCG is given by subtracting, from $P_{CMAX}$, the power ($P_{pre\_MeNB}$) allocated in the first step in the subframe i of the MCG and the power for the subframes of the SCG overlapping the subframe i of the MCG. In FIG. 10, the overlapping subframes of the SCG are the subframe i−1 and the subframe i of the SCG. The power for the subframes of the SCG is the greatest value of the transmit power for actual uplink transmission in the subframe i−1 of the SCG and the power ($P_{pre\_SeNB}$) allocated in the first step in the subframe i of the SCG.

In the subframe i illustrated in FIG. 10, remaining power to be calculated in a case of computing allocation power ($P_{alloc\_SeNB}$) for the SCG is given by subtracting, from $P_{CMAX}$, the power ($P_{pre\_SeNB}$) allocated in the first step in the subframe i of the SCG and the power for the subframes of the MCG overlapping the subframe i of the SCG. In FIG. 10, the overlapping subframes of the MCG are the subframe i and the subframe i+1 of the MCG. The power for the subframes of the MCG is the greatest value of the transmit power for actual uplink transmission in the subframe i of the MCG and the power ($P_{pre\_MeNB}$) allocated in the first step in the subframe i+1 of the MCG.

Another example of defining (a method of calculating) remaining power is as follows. This example corresponds to a case in which the terminal device 1 has not recognized uplink transmission allocation to the subframes overlapping in the other cell group.

In the subframe i illustrated in FIG. 10, remaining power to be calculated in a case of computing allocation power ($P_{alloc\_MeNB}$) for the MCG is given by subtracting, from $P_{CMAX}$, the power ($P_{pre\_MeNB}$) allocated in the first step in the subframe i of the MCG and the power for the subframes of the SCG overlapping the subframe i of the MCG. In FIG. 10, the overlapping subframes of the SCG are the subframe i−1 and the subframe i of the SCG. The power for the subframes of the SCG is the greatest value of the transmit power for actual uplink transmission in the subframe i−1 of the SCG and the guaranteed power ($P_{SeNB}$) in the subframe i of the SCG.

In the subframe i illustrated in FIG. 10, remaining power to be calculated in a case of computing allocation power ($P_{alloc\_SeNB}$) for the SCG is given by subtracting, from $P_{CMAX}$, the power ($P_{pre\_SeNB}$) allocated in the first step in the subframe i of the SCG and the power for the subframes of the MCG overlapping the subframe i of the SCG. In FIG. 10, the overlapping subframes of the MCG are the subframe i and the subframe i+1 of the MCG. The power for the subframes of the MCG is the greatest value of the transmit power for actual uplink transmission in the subframe i of the MCG and the guaranteed power ($P_{MeNB}$) in the subframe i+1 of the MCG.

Another example of defining (a method of calculating) remaining power is as follows. A terminal device communicating with a base station device by using a first cell group and a second cell group includes a transmission unit that transmits a channel and/or signal on the basis of the maximum output power of the first cell group in a certain subframe. When information on uplink transmission in the second cell group in a subsequent subframe overlapping the certain subframe is recognized, the maximum output power for the first cell group is the total of the power determined on the basis of the uplink transmission of the first cell group in the certain subframe and the power allocated to the first cell group from the remaining power. The remaining power is given by subtracting the power determined on the basis of uplink transmission in the first cell group in the certain subframe and the power for the second cell group, from the total maximum output power of the terminal device. The power for the second cell group is the greatest value of the output power of the second cell group in the forward subframe overlapping the certain subframe and the power determined on the basis of uplink transmission of the second cell group in the later subframe overlapping the certain subframe.

Another example of defining (a method of calculating) remaining power is as follows. A terminal device communicating with a base station device by using a first cell group and a second cell group includes a transmission unit that transmits a channel and/or signal on the basis of the maximum output power of the first cell group in a certain subframe. When information on uplink transmission in the second cell group in a subsequent subframe overlapping the certain subframe is not recognized, the maximum output power for the first cell group is the total of the power determined on the basis of the uplink transmission of the first cell group in the certain subframe and the power allocated to the first cell group from the remaining power. The remaining power is given by subtracting the power determined on the basis of uplink transmission in the first cell group in the certain subframe and the power for the second cell group, from the total maximum output power of the terminal device. The power for the second cell group is the greatest value of the output power of the second cell group in the forward subframe overlapping the certain subframe and the guaranteed power of the second cell group in the subsequent subframe overlapping the certain subframe.

Another example of defining (a method of calculating) remaining power is as follows. A terminal device communicating with a base station device by using a first cell group and a second cell group includes a transmission unit that transmits a channel and/or signal on the basis of the maximum output power of the first cell group in a certain subframe. When information on uplink transmission in the second cell group in a subsequent subframe overlapping the certain subframe is not recognized, the maximum output power for the first cell group is given by subtracting the power for the second cell group from the total maximum output power of the terminal device. The power for the second cell group is the greatest value of the output power of the second cell group in the forward subframe overlapping the certain subframe and the guaranteed power of the second cell group in the subsequent subframe overlapping the certain subframe.

Another method of allocating guaranteed power and residual power will be described below.

First, as Step (s1), the power value of the MCG and the power value of the SCG are initialized, and excess power (excess power that is not allocated yet) is calculated. Moreover, excess guaranteed power (guaranteed power that is not allocated yet) is initialized. More specifically, it is assumed that $P_{MCG}=0$, $P_{SCG}=0$, $P_{Remaining}=P_{CMAX}-P_{MeNB}-P_{SeNB}$. Moreover, it is assumed that $P_{MeNB, Remaining}=P_{MeNB}$, and $P_{SeNB, Remaining}=P_{SeNB}$. Here, $P_{MCG}$ and $P_{SCG}$ are respectively the power value of the MCG and the power value of the SCG, and $P_{Remaining}$ is an excess power value. $P_{CMAX}$, $P_{MeNB}$, and $P_{SeNB}$ are the above-described parameters. Moreover, $P_{MeNB, Remaining}$ and $P_{SeNB, Remaining}$ are respectively the excess guaranteed power value of the MCG and the excess guaranteed power value of the SCG. Here, each power value is assumed to be a linear value.

Next, the excess power and the excess guaranteed power are sequentially allocated to the CGs in the order from a PUCCH in the MCG, a PUCCH in the SCG, a PUSCH including the UCI in the MCG, a PUSCH not including the UCI in the MCG, and then a PUSCH not including the UCI in the SCG. In this case, when there is excess guaranteed power, the excess guaranteed power is allocated first, and, after no more excess guaranteed power exists, excess guaranteed power is allocated. The power amounts to be sequentially allocated to the CGs are basically the power values required for the respective channels (power values based on transmit power control (TPC) commands and power values based on resource assignment and the like). Note that, if the excess power or the excess guaranteed power is not sufficient for a required power value, the entire excess power or the excess guaranteed power is allocated. When power is allocated to a CG, the excess power or the excess guaranteed power decreases by the amount corresponding to the allocated power. Note that allocating excess power or excess guaranteed power having a value of zero means the same as not allocating excess power or excess guaranteed power. In the following, (s2) to (s8) will be described as more specific steps of calculating a power value for each CG.

As Step (s2), the following computation is performed. If there is PUCCH transmission in the MCG (or the terminal device 1 has recognized that there is PUCCH transmission in the MCG), the following computation is performed: $P_{MCG}=P_{MCG}+\delta_1+\delta_2$, $P_{MeNB, Remaining}=P_{MeNB, Remaining}-\delta_1$, $P_{Remaining}=P_{Remaining}-\delta_2$. Here, $\delta_1=\min(P_{PUCCH, MCG}, P_{MeNB, Remaining})$, and $\delta_2=\min(P_{PUCCH, MCG}-\delta_1, P_{Remaining})$. In other words, the power value required for PUCCH transmission is allocated to the MCG from the excess guaranteed power of the MCG. In this step, if the excess guaranteed power of the MCG is insufficient for the required power of the PUCCH transmission, the entire excess guaranteed power is allocated to the MCG, and then power equivalent to the shortage is allocated for the MCG from the excess power. Here, if the excess power is still insufficient for the shortage, the entire excess power is allocated to the MCG. The power value allocated from the excess guaranteed power or the excess power is added to the power value of the MCG. The power value allocated to the MCG is subtracted from the excess guaranteed power or the excess power. Note that $P_{PUCCH, MCG}$ is a power value required for the PUCCH transmission in the MCG, and is calculated on the basis of the parameters configured by a higher layer, downlink path loss, an adjustment value determined on the basis of the UCI transmitted by the PUCCH, an adjustment value determined on the basis of the PUCCH format, an adjustment value determined on the basis of the number of antenna ports used for transmission of the PUCCH, and a value based on a TPC command, and the like.

As Step (s3), the following computation is performed. If there is PUCCH transmission in the SCG (or the terminal device 1 has recognized that there is PUCCH transmission in the SCG), the following computation is performed: $P_{SCG}=P_{SCG}+\delta_1+\delta_2$, $P_{SeNB, Remaining}=P_{SeNB, Remaining}-\delta_1$, $P_{Remaining}=P_{Remaining}-\delta_2$. Here, $\delta_1=\min(P_{PUCCH, SCG}, P_{SeNB, Remaining})$ and $\delta_2=\min(P_{PUCCH, SCG}-\delta_1, P_{Remaining})$. In other words, the power value required for PUCCH transmission is allocated to the SCG from the excess guaranteed power of the SCG. In this step, if the excess guaranteed power of the SCG is insufficient for the required power of the PUCCH transmission, the entire excess guaranteed power is allocated to the SCG, and then power equivalent to the shortage is allocated to the SCG from the excess power. Here, if the excess power is still insufficient for the shortage, the entire excess power is allocated to the SCG. The power value allocated from the excess guaranteed power or the excess power is added to the power value of the SCG. The power value allocated to the SCG is subtracted from the excess guaranteed power or excess power. Note that $P_{PUCCH, SCG}$ is a power value required for the PUCCH transmission in the SCG, and is calculated on the basis of the parameters configured by a higher layer, downlink path loss, an adjustment value determined on the basis of the UCI transmitted by the PUCCH, an adjustment value determined on the basis of the PUCCH format, an adjustment value determined on the basis of the number of antenna ports used for transmission of the PUCCH, and a value based on a TPC command.

As Step (s4), the following computation is performed. If there is transmission of a PUSCH including the UCI in the MCG (or the terminal device 1 has recognized that there is transmission of a PUSCH including the UCI in the MCG), the following computation is performed: $P_{MCG}=P_{MCG}+\delta_1+\delta_2$, $P_{MeNB, Remaining}=P_{MeNB, Remaining}+\delta_1$, $P_{Remaining}=P_{Remaining}-\delta_2$. Here, $\delta_1=\min(P_{PUSCH, j, MCG}, P_{MeNB, Remaining})$, and $\delta_2=\min(P_{PUSCH, j, MCG}-\delta_1, P_{Remaining})$. In other words, the power value required for the transmission of the PUSCH including the UCI is allocated to the MCG from the excess guaranteed power of the MCG. In this step, if the excess guaranteed power of the MCG is insufficient for the power required for the transmission of the PUSCH including the UCI, the entire excess guaranteed power is allocated to the MCG, and then power equivalent to the shortage is allocated to the MCG from the excess power. Here, if the excess power is still insufficient for the shortage, the entire excess power is allocated to the MCG. The power value allocated from the excess guaranteed power or the excess power is added to the power value of the MCG. The power value allocated to the MCG is subtracted from the excess guaranteed power or the excess power. Note that $P_{PUSCH, j, MCG}$ is a power value required for the transmission of the PUSCH including the UCI in the MCG and is calculated on the basis of the parameters configured by a higher layer, an adjustment value determined on the basis of the number of PRBs allocated to the PUSCH transmission by resource assignment, downlink path loss and a coefficient by which the path loss is multiplied, an adjustment value determined on the basis of the parameter indicating the offset of the MCS applied to the UCI, a value based on a TPC command, and the like.

As Step (s5), the following computation is performed. If there is transmission of a PUSCH including the UCI in the SCG (or the terminal device 1 has recognized that there is transmission of a PUSCH including the UCI in the SCG), the following computation is performed: $P_{SCG}=P_{SCG}+\delta_1+\delta_2$, $P_{SeNB, Remaining}=P_{SeNB, Remaining}-\delta_1$, $P_{Remaining}=P_{Remaining}-\delta_2$. Here, $\delta_1=\min(P_{PUSCH, j, SCG}, P_{SeNB, Remaining})$, and $\delta_2=\min(P_{PUSCH, j, SCG}-\delta_1, P_{Remaining})$. In other words, the power value required for the transmission of the PUSCH including the UCI is allocated to the SCG from the excess guaranteed power of the SCG. In this step, if the excess guaranteed power of the SCG is insufficient for the power required for the transmission of the PUSCH including the UCI, the entire excess guaranteed power is allocated to the SCG, and then power equivalent to the shortage is allocated from the excess power. Here, if the excess power is still insufficient for the shortage, the entire excess power is allocated to the SCG. The power value allocated from the excess guaranteed power or the excess power is added to the power value of the SCG. The power value allocated to the SCG is subtracted from the excess guaranteed power or the excess power. Note that $P_{PUSCH, j, MCG}$ is a power value required for the transmission of the PUSCH including the UCI in the SCG and is calculated on the basis of parameters configured by the higher layer, an adjustment value determined on the basis of the number of PRBs allocated to the PUSCH transmission by resource assignment, downlink path loss and a coefficient by which the path loss is multiplied, an adjustment value determined on the basis of the parameter indicating the offset of the MCS applied to the UCI, a value based on a TPC command, and the like.

As Step (s6), the following computation is performed. If there are one or more transmissions of a PUSCH (one or more transmissions of a PUSCH not including the UCI) in the MCG (or if the terminal device 1 has recognized that there is transmission of a PUSCH in the MCG), the following computation is performed: $P_{MCG}=P_{MCG}+\delta_1+\delta_2$, $P_{MeNB, Remaining}=P_{MeNB, Remaining}-\delta_1$, $P_{Remaining}=P_{Remaining}-\delta_2$. Here, $\delta_1=\min(\Sigma P_{PUSCH, c, MCG}, P_{MeNB, Remaining})$, and $\delta_2=\min(\Sigma P_{PUSCH, c, MCG}-\delta_1, P_{Remaining})$. In other words, the total value of the power values required for the PUSCH transmissions is allocated to the MCG from the excess guaranteed power of the MCG. In this step, if the excess guaranteed power of the MCG is insufficient for the total value of the powers required for the PUSCH transmissions, the entire excess guaranteed power is allocated to the MCG, and then power equivalent to the shortage is allocated for the MCG from the excess power. Here, if the excess power is still insufficient for the shortage, the entire excess power is allocated to the MCG. The power value allocated from the excess guaranteed power or excess power is added to the power value of the MCG. The power value allocated to the MCG is subtracted from the excess guaranteed power or excess power. Note that $P_{PUSCH, c, MCG}$ is a power value required for the PUSCH transmission in the serving cell c belonging to the MCG and is calculated on the basis of the parameters configured by a higher layer, an adjustment value determined on the basis of the number of PRBs allocated to the PUSCH transmission by resource assignment, downlink path loss and a coefficient by which the path loss is multiplied, a value based on a TPC command, and the like. Moreover, $\Sigma$ means the total, and $\Sigma P_{PUSCH, c, MCG}$ represents the total value of $P_{PUSCH, c, MCG}$ in the serving cell c where $c \neq j$.

As Step (s7), the following computation is performed. If there are one or more transmissions of a PUSCH (PUSCH transmissions not including the UCI) in the SCG (or the terminal device 1 has recognized that there is PUSCH transmission in the SCG), the following computation is performed: $P_{SCG}=P_{SCG}+\delta_1+\delta_2$, $P_{SeNB, Remaining}=P_{SeNB, Remaining}-\delta_1$, $P_{Remaining}=P_{Remaining}-\delta_2$. Here, $\delta_1=\min(\Sigma P_{PUSCH, c, SCG}, P_{SeNB, Remaining})$, and $\delta_2=\min(\Sigma P_{PUSCH, c, SCG}-\delta_1, P_{Remaining})$. In other words, the total value of the power values required for PUSCH transmissions is allocated to the SCG from the excess guaranteed power of the SCG. In this step, if the excess guaranteed power of the SCG is insufficient for the total value of the powers required for the PUSCH transmissions, the entire excess guaranteed power is allocated to the SCG, and then power equivalent to the shortage is allocated from the excess power. Here, if the excess power is still insufficient for the shortage, the entire excess power is allocated to the SCG. The power value allocated from the excess guaranteed power or the excess power is added to the power value of the SCG. The power value allocated to the SCG is subtracted from the excess guaranteed power or the excess power. Note that $P_{PUSCH, c, SCG}$ is a power value required for the PUSCH transmission in the serving cell c belonging to the SCG and is calculated on the basis of the parameters configured by a higher layer, an adjustment value determined on the basis of the number of PRBs allocated to the PUSCH transmission by resource assignment, downlink path loss and a coefficient by which the path loss is multiplied, a value based on a TPC command, and the like. Moreover, $\Sigma$ means the total, and $\Sigma P_{PUSCH, c, SCG}$ represents the total value of $P_{PUSCH, c, SCG}$ in the serving cell c where $c \neq j$.

As Step (s8), the following computation is performed. If the subframe that is the target of power calculation is a subframe in the MCG, $P_{CMAX, CG}$, which is the maximum output power value for the target CG, is set at $P_{CMAX, CG}=P_{MCG}$. In other cases, in other words, if the subframe that is the target of power calculation is a subframe in the SCG, $P_{CMAX, CG}$, which is the maximum output power value for the target CG, is set to $P_{CMAX, CG}=P_{SCG}$.

In this way, the maximum output power value for a target CG can be calculated from guaranteed power and excess power. Note that, as the initial values of the power value of the MCG, power value of the SCG, excess power, and excess guaranteed power in each of the above-described steps, the respective final values in the immediately previous step are used.

In this example, as the priority order for power allocation, the order from a PUCCH in the MCG, a PUCCH in the SCG, a PUSCH including a UCI in the MCG, a PUSCH not including any UCI in the MCG, and then a PUSCH not including any UCI in the SCG is used. However, the priority order is not limited to this. A different priority order may be used. For example, the priority order may be in the order from a channel in the MCG including HARQ-ACK, a channel in the SCG including HARQ-ACK, a PUSCH in the MCG (not including HARQ-ACK), and then a PUSCH in the SCG (not including HARQ). Alternatively, the order may be in the order from a channel including an SR, a channel including HARQ-ACK (not including any SR), a channel including a CSI (not including any SR or HARQ-ACK), and then a channel including data (not including any UCI), without distinguishing between the MCG and SCG. In these cases, required power values in above-described Step s2 to Step s7 are replaced. When a plurality of channels are targeted in a single step, the total value of the required powers of the channels may be used as in Step s6 and Step s7. Alternatively, a method of not using one or some of the above-described steps may be used. Moreover, the priority order may be determined in consideration of a PRACH, SRS, and the like in addition to the above-described channels. In this case, a PRACH may have a higher priority than a PUCCH, and an SRS may have a lower priority than a PUSCH (not including any UCI).

Another method of allocating guaranteed power and residual power will be described below.

First, as Step (t1), the power value of the MCG, the power value of the SCG, excess power (excess power that is not allocated yet), the total required power of the MCG, and the total required power of the SCG are initialized. More specifically, it is assumed that $P_{MCG}=0$, $P_{SCG}=0$, and $P_{Remaining}=P_{CMAX}$ In addition, $P_{MCG, Required}=0$, and $P_{SCG, Required}=0$. Here, $P_{MCG}$ and $P_{SCG}$ are respectively the power value of the MCG and the power value of the SCG, and $P_{Remaining}$ is an excess power value. $P_{CMAX}$, $P_{MeNB}$, and $P_{SeNB}$ are the above-described parameters. Moreover, $P_{MCG, Required}$ and $P_{SCG, Required}$ are respectively the total required power value required for transmitting a channel in the MCG and the total required power value required for transmitting a channel in the SCG. Here, each power value is assumed to be a linear value.

Next, the excess power is sequentially allocated to the CGs in the order from a PUCCH in the MCG, a PUCCH in the SCG, a PUSCH including a UCI in the MCG, a PUSCH not including any UCI in the MCG, and then a PUSCH not including any UCI in the SCG. In this operation, the power amounts to be sequentially allocated to the CGs are basically the power values required for the channels (power values based on transmit power control (TPC) commands, resource assignment, and the like). Note that, if the excess power is insufficient for a required power value, the entire excess power is allocated. When power is allocated to a CG, the excess power is reduced by the amount corresponding to the allocated power. In addition, the power values required for the channels are sequentially added to the total required power of the CG. Note that each required power value is added irrespective of whether the excess power is sufficient for the required value. In the following, (t2) to (t9) will be described as more specific steps of calculating a power value for each CG.

As Step (t2), the following computation is performed. If there is PUCCH transmission in the MCG, the following computation is performed: $P_{MCG}=P_{MCG}+\delta$, $P_{MCG, Required}=P_{MCG, Required}-P_{PUCCH, MCG}$, $P_{Remaining}=P_{Remaining}-\delta$. Here, $\delta=\min(P_{PUCCH, MCG}, P_{Remaining})$. In other words, the power value required for PUCCH transmission is allocated to the MCG from the excess power. In this step, if the excess power is insufficient for the power required for the PUCCH transmission, the entire excess power is allocated to the MCG. The power value required for the PUCCH transmission is added to the total required power value of the MCG. The power value allocated to the MCG is subtracted from the excess power.

As Step (t3), the following computation is performed. If there is PUCCH transmission in the SCG, the following computation is performed: $P_{SCG}=P_{SCG}+\delta$, $P_{SCG, Required}=P_{SCG, Required}-P_{PUCCH, SCG}$, $P_{Remaining}=P_{Remaining}-\delta$. Here, $\delta=\min(P_{PUCCH, SCG}, P_{Remaining})$. In other words, the power value required for PUCCH transmission is allocated to the SCG from the excess power. In this step, if the excess power is insufficient for the power required for the PUCCH transmission, the entire excess power is allocated to the SCG. The power value required for the PUCCH transmission is added to the total required power value of the SCG. The power value allocated to the SCG is subtracted from the excess power.

As Step (t4), the following computation is performed. If there is transmission of a PUSCH including the UCI in the MCG, the following computation is performed: $P_{MCG}=P_{MCG}+\delta$, $P_{MCG, Required}=P_{MCG, Required}-P_{PUSCH, j, MCG}$, $P_{Remaining}=P_{Remaining}-\delta$. Here, $\delta=\min(P_{PUCCH, j, MCG}, P_{Remaining})$. In other words, the power value required for the transmission of the PUSCH including a UCI is allocated to the MCG from the excess power. In this step, if the excess power is insufficient for the power required for the transmission of the PUSCH including a UCI, the entire excess power is allocated to the MCG. The power value required for the transmission of the PUSCH including a UCI is added to the total required power value of the MCG. The power value allocated to the MCG is subtracted from the excess power.

As Step (t5), the following computation is performed. If there is transmission of a PUSCH including the UCI in the SCG, the following computation is performed: $P_{SCG}=P_{SCG}+\delta$, $P_{SCG, Required}=P_{SCG, Required}-P_{PUSCH, j, SCG}$, $P_{Remaining}=P_{Remaining}-\delta$. Here, $\delta=\min(P_{PUSCH, j, SCG}, P_{Remaining})$. In other words, the power value required for the transmission of the PUSCH including a UCI is allocated to the SCG from the excess power. In this step, if the excess power is insufficient for the power required for the transmission of the PUSCH including a UCI, the entire excess power is allocated to the SCG. The power value required for the transmission of the PUSCH including a UCI is added to the total required power value of the SCG. The power value allocated to the SCG is subtracted from the excess power.

As Step (t6), the following computation is performed. If there are one or more transmissions of a PUSCH (PUSCH transmissions not including the UCI) in the MCG, the following computation is performed: $P_{MCG}=P_{MCG}+\delta$, $P_{MCG, Required}=P_{MCG, Required}-\Sigma P_{PUSCH, c, MCG}$, $P_{Remaining}=P_{Remaining}-\delta$. Here, $\delta=\min(\Sigma P_{PUSCH, c, MCG}, P_{Remaining})$. In other words, the total value of the power values required for the PUSCH transmissions is allocated to the MCG from the excess power. In this step, if the excess power is insufficient for the total value of the powers required for the PUSCH transmissions, the entire excess power is allocated to the MCG. The power values allocated from the excess power are added to the power value of the MCG. The total value of the power values required for the PUSCH transmissions is added to the total required power value of the MCG. The power value allocated to the MCG is subtracted from the excess power.

As Step (t7), the following computation is performed. If there are one or more transmissions of a PUSCH (PUSCH transmissions not including the UCI) in the SCG, the following computation is performed: $P_{SCG}=P_{SCG}+\delta$, $P_{SCG, Required}=P_{SCG, Required}-\Sigma P_{PUSCH, c, SCG}$, $P_{Remaining}=P_{Remaining}-\delta$. Here, $\delta=\min(\Sigma P_{PUSCH, c, SCG}, P_{Remaining})$. In other words, the total value of the power values required for the PUSCH transmissions is allocated to the SCG from the excess power. In this step, if the excess power is insufficient for the total value of the powers required for the PUSCH transmissions, the entire excess power is allocated to the SCG. The power values allocated from the excess power are added to the power value of the SCG. The total value of the power values required for the PUSCH transmissions is added to the total required power value of the SCG. The power value allocated to the SCG is subtracted from the excess power.

As Step (t8), it is checked whether the power value allocated to each of the CGs is equal to or greater than (not below) the guaranteed power. Moreover, it is checked whether the power value allocated to each of the CGs is the same as (not below) the total required power value (i.e., whether there is no channel for which the excess power value is insufficient for the required power value in the channels in the CGs). When the allocated power value is not equal to or greater than the guaranteed power (is below the guaranteed power) in a certain CG (CG1) and is not the same as the total required power value (is below the total required power value), the power value equivalent to the shortage is allocated to the CG (CG1) from the power value allocated to another CG (CG2). The final power value of the other CG (CG2) is obtained by subtracting the power value equivalent to the shortage and consequently subtracting the guaranteed power value of the CG1 from the $P_{CMAX}$. With this operation, when the allocated power value is sufficient for the required power in a certain CG, the allocated power value need not be sufficient for the guaranteed power, which enables efficient use of the power. As a more specific example, computations in Step (t8-1) and Step (t8-2) are performed.

As Step (t8-1), if $P_{MCG} < P_{MeNB}$ and $P_{MCG} < P_{MCG, Required}$, it is set $P_{MCG} = P_{MeNB}$ and also set $P_{SCG} = P_{CMAX} - P_{MCG}$ (i.e., $P_{SCG} = P_{CMAX} - P_{MeNB}$).

As Step (t8-2), if $P_{SCG} < P_{SeNB}$ and $P_{SCG} < P_{SCG, Required}$ (or the condition of Step (t8-1) is not satisfied and if $P_{SCG} < P_{SeNB}$ and $P_{SCG} < P_{SCG, Required}$), it is set $P_{SCG} = P_{SeNB}$ and also set $P_{MCG} = P_{CMAX} - P_{SCG}$ (i.e., $P_{MCG} = P_{CMAX} - P_{SeNB}$).

As Step (t9), the following computation is performed. If the subframe that is the target of power calculation is a subframe in the MCG, $P_{CMAX, CG}$, which is the maximum output power value for the target CG, is set at $P_{CMAX, CG} = P_{MCG}$. In other cases, in other words, if the subframe that is the target of power calculation is a subframe in the SCG, $P_{CMAX, CG}$, which is the maximum output power value for the target CG is set at $P_{CMAX, CG} = P_{SCG}$.

In this way, the maximum output power value for a target CG can be calculated from guaranteed power and excess power. Note that, as the initial values of the power value of the MCG, power value of the SCG, excess power, the total required power of the MCG, and the total required power of the SCG in each of the above-described steps, the respective final values in the immediately previous step are used.

Alternatively, the following step (Step (t10)) may be performed instead of Step (t8). Specifically, it is checked whether the power value allocated to each of the CGs is equal to or greater than (not below) the guaranteed power. When the allocated power value is not equal to or greater than the guaranteed power (is below the guaranteed power) in a certain CG (CG1), the power value equivalent to the shortage is allocated to the CG (CG1) from the power value allocated to another CG (CG2). The final power value of the other CG (CG2) is obtained by subtracting the power value equivalent to the shortage and consequently determined to be the smallest value of the value obtained by subtracting the guaranteed power value of the CG1 from the $P_{CMAX}$ and the total required power value of the CG2. With this operation, it is possible to surely secure guaranteed power in each CG and to hence perform stable communication. As a more specific example, computations in Step (t10-1) and Step (t10-2) are performed.

As Step (t10-1), if $P_{MCG} < P_{MeNB}$, it is set $P_{MCG} = P_{MeNB}$ and also set $P_{SCG} = \min(P_{SCG, Require}, P_{CMAX} - P_{MeNB})$.

As Step (t10-2), if $P_{SCG} < P_{SeNB}$, it is set $P_{SCG} = P_{SeNB}$ and also set $P_{MCG} = \min(P_{MCG, Required}, P_{CMAX} - P_{SeNB})$.

In this example, as the priority order for power allocation, the order from a PUCCH in the MCG, a PUCCH in the SCG, a PUSCH including a UCI in the MCG, a PUSCH not including any UCI in the MCG, and then a PUSCH not including any UCI in the SCG is used. However, the priority order is not limited to this. A different priority order (e.g., the above-described priority order) may be used.

Description has been given above of the method of allocating guaranteed power and residual power for determining the maximum output power value for each CG. In the following, power distribution in each CG under the maximum output power value of the CG will be described.

First, power distribution within the CG in the case where dual connectivity is not configured will be described.

If the total transmit power of the terminal device 1 is assumed to exceed $P_{CMAX}$, the terminal device 1 performs scaling on $P_{PUSCH, c}$ in the serving cell c so that the condition $\Sigma(wP_{PUSCH, c}) \leq (P_{CMAX} - P_{PUCCH})$ is to be satisfied. Here, w denotes a scaling factor (coefficient by which a power value is multiplied) for the serving cell c and takes a value that is equal to or greater than zero and equal to or smaller than one. When there is no PUCCH transmission, it is assumed that $P_{PUCCH} = 0$.

If the terminal device 1 performs transmission of a PUSCH including the UCI in a certain serving cell j and performs transmission of a PUSCH not including the UCI in any of the other serving cells, and the total transmit power of the terminal device 1 is assumed to exceed $P_{CMAX}$, the terminal device 1 performs scaling on $P_{PUSCH, c}$ in the serving cell c not including the UCI so that the condition $\Sigma(wP_{PUSCH, c}) \leq (P_{CMAX} - P_{PUSCH, j})$ is to be satisfied. Note that the left side represents the total in the serving cells c other than the serving cell j. Here, w is a scaling factor for the serving cell c not including any UCI. Here, as long as it is not the case where $\Sigma(wP_{PUSCH, c}) = 0$ and the total transmit power of the terminal device 1 still exceeds $P_{CMAX}$, power scaling is not applied to any PUSCH including a UCI. Note that, although w is a common value for the serving cells when w>0, w may be zero for a certain serving cell. In this case, this means that channel transmission is dropped in the certain serving cell.

If the terminal device 1 performs transmissions of a PUCCH and a PUSCH including the UCI in the certain serving cell j at the same time and performs transmission of a PUSCH not including the UCI in any of the other serving cells, and the total transmit power of the terminal device 1 is assumed to exceed $P_{CMAX}$, the terminal device 1 obtains $P_{PUSCH, c}$ on the basis of $P_{PUSCH, j} = \min(P_{PUSCH, j}, (P_{CMAX} - P_{PUCCH}))$ and $\Sigma(wP_{PUSCH, c}) \leq (P_{CMAX} - P_{PUCCH} - P_{PUSCH, j})$. In other words, the terminal device 1 reserves the power for the PUCCH first and then calculates power for the PUSCH including a UCI from the residual power. Here, when the residual power is higher than the required power of the PUSCH including the UCI ($P_{PUSCH, j}$ on the right-hand side of the first expression), the power required for the PUSCH including the UCI is assumed to be the power for the PUSCH including the UCI ($P_{PUSCH, j}$ on the left-hand side of the first expression, i.e., the actual power value for the PUSCH including the UCI), and when the residual power is lower than/equal to the power required for the PUSCH including the UCI, all the residual power is assumed to be the power for the PUSCH including the UCI. The residual power obtained by subtracting the power for the PUCCH and the power for the PUSCH including a UCI is allocated to the PUSCH not including any UCI. In this case, scaling is performed as needed.

If a plurality of timing advance groups (TAGs) are configured in the terminal device 1 and PUCCH/PUSCH transmission of the terminal device 1 in the subframe i for a certain serving cell in one of the TAGs overlaps one or some of the first symbols of PUSCH transmission in the subframe i+1 for a different serving cell in any of the other TAGs, the terminal device 1 adjusts the total transmit power so that the total transmit power is not to exceed $P_{CMAX}$ at any overlapped portion. Here, "TAG" is a group of serving cells for the adjustment of uplink transmission timing with respect to downlink reception timing. When one or more serving cells belong to a single TAG, and common adjustment is applied to the one or more serving cells in the single TAG.

If a plurality of TAGs are configured in the terminal device 1 and PUSCH transmission of the terminal device 1 in the subframe i for a certain serving cell in one of the TAGs overlaps one or some of the first symbols of PUCCH transmission in the subframe i+1 for a different serving cell in any of the other TAGs, the terminal device 1 adjusts the total transmit power so that the total transmit power is not to exceed $P_{CMAX}$ at any overlapping part.

If a plurality of TAGs are configured in the terminal device 1 and SRS transmission of the terminal device 1 at one symbol in the subframe i for a certain serving cell in one of the TAGs overlaps PUCCH/PUSCH transmission in the subframe i or the subframe i+1 in a different serving cell in any of the other TAGs, the terminal device 1 drops the SRS transmission if the total transmit power exceeds $P_{CMAX}$ at any overlapping part in the symbol.

If a plurality of TAGs and two or more serving cells are configured in the terminal device 1 and SRS transmission of the terminal device 1 at one symbol in the subframe i for a certain serving cell overlaps SRS transmission in the subframe in a different subframe and PUCCH/PUSCH transmission in the subframe i or the subframe i+1 in a different serving cell, the terminal device 1 drops the SRS transmission if the total transmit power exceeds $P_{CMAX}$ at any part that the symbol overlaps.

If a plurality of TAGs are configured in the terminal device 1 and a higher layer requests that PRACH transmission in a secondary serving cell is performed in parallel with SRS transmission at a symbol in a subframe of a different serving cell belonging to a different one of the TAGs, the terminal device 1 drops the SRS transmission if the total transmit power exceeds $P_{CMAX}$ at any part that the symbol overlaps.

If a plurality of TAGs are configured in the terminal device 1 and a higher layer requests that PRACH transmission in a secondary serving cell is performed in parallel with PUSCH/PUCCH transmission in a subframe of a different serving cell belonging to a different one of the TAGs, the terminal device 1 adjusts the transmit power of the PUSCH/PUCCH so that the total transmit power is not to exceed $P_{CMAX}$ at the overlapping part.

Next, power distribution in the CGs in the case where dual connectivity is configured will be described.

If the total transmit power of the terminal device 1 in a certain CG is assumed to exceed $P_{CMAX, CG}$, the terminal device 1 performs scaling on $P_{PUSCH, c}$ in the serving cell c of the CG so that the condition $P_{PUCCH}=\min (P_{PUCCH}, P_{CMAX, CG})$ and $\Sigma (wP_{PUSCH, c}) \le (P_{CMAX, CG}-P_{PUCCH})$ is to be satisfied. In other words, when the maximum output power value of the CG is greater than the required power of the PUCCH ($P_{PUCCH}$ on the right-hand side of the first expression), the required power of the PUCCH is set as the power for the PUCCH ($P_{PUCCH}$ on the left-hand side of the first expression, i.e., the actual power value of the PUCCH), and, when the maximum output power value of the CG is smaller than/equal to the required power of the PUCCH, the entire maximum output power value of the CG is set as the power for the PUCCH. The residual power obtained by subtracting the power of the PUCCH from $P_{CMAX, CG}$ is allocated to the PUSCH. In this case, scaling is performed as needed. When there is no PUCCH transmission in the CG, it is assumed that $P_{PUCCH}=0$. Note that $P_{PUCCH}$ on the right side of the second expression is $P_{PUCCH}$ calculated according to the first expression.

If the terminal device 1 performs transmission of a PUSCH including a UCI in the certain serving cell j in a certain CG and performs transmission of a PUSCH not including any UCI in any of the other serving cells in the CG, and the total transmit power of the terminal device 1 in the CG is assumed to exceed $P_{CMAX, CG}$, the terminal device 1 performs scaling on the $P_{PUSCH, c}$ in the serving cell c not including any UCI so as to satisfy the condition $P_{PUSCH, j}=\min (P_{PUSCH, j}, (P_{CMAX, CG}-P_{PUCCH}))$ and $\Sigma (wP_{PUSCH, c}) \le (P_{CMAX, CG}-P_{PUSCH,j})$. Note that the left side of the second expression represents the total in the serving cells c other than the serving cell j. Note that $P_{PUSCH,}$ on the right side of the second expression is $P_{PUSCH, j}$ calculated according to the first expression.

If the terminal device 1 performs transmissions of a PUCCH and a PUSCH including the UCI in the certain serving cell j at the same time and performs transmission of a PUSCH not including the UCI in any of the other serving cells, in a certain CG, and the total transmit power of the terminal device 1 in the CG is assumed to exceed $P_{CMAX, CG}$, the terminal device 1 obtains $P_{PUSCH, c}$ on the basis of $P_{PUCCH}=\min (P_{PUCCH}, P_{CMAX, CG})$, $P_{PUSCH, j}=\min (P_{PUSCH, j}, (P_{CMAX, CG}-P_{PUCCH}))$, and $\Sigma (wP_{PUSCH, c}) \le (P_{CMAX, CG}-P_{PUCCH}-P_{PUSCH, j})$. In other words, the terminal device 1 first reserves the power for the PUCCH first from the maximum output power of the CG and then calculates power for the PUSCH including the UCI from the residual power. Specifically, when the maximum output power of the CG is greater than the required power of the PUCCH, the required power of the PUCCH is set as the transmit power for the PUCCH, and, when the maximum output power of the CG is smaller than/equal to the required power of the PUCCH, the maximum output power of the CG is set as the transmit power of the PUCCH. Similarly, when the residual power is higher than the required power of the PUSCH including the UCI, the required power of the PUSCH including a UCI is set as the transmit power for the PUSCH including a UCI, and when the residual power is lower than/equal to the required power of the PUSCH including the UCI, all the residual power is set as the transmit power for the PUSCH including the UCI. The residual power obtained by subtracting the power for the PUCCH and the power for the PUSCH including a UCI is allocated to the PUSCH not including the UCI. In this case, scaling is performed as needed.

For power adjustment and SRS drop when a plurality of TAGs are configured, substantially the same process as that for the case where dual connectivity is not configured may be carried out. In this case, it is preferable that the same process be carried out for the plurality of TAGs in a CG and also substantially the same process be carried out for the plurality of TAGs in the different CG. Alternatively, the following process may be carried out. Still alternatively, both processes may be carried out.

If a plurality of TAGs are configured in a CG for the terminal device 1 and PUCCH/PUSCH transmission of the terminal device 1 in the subframe i for a certain serving cell in one of the TAGs in the CG overlaps one or some of the first symbols of PUCCH transmission in the subframe i+1 for a different serving cell in any of the other TAGs in the CG, the terminal device 1 adjusts the total transmit power so that the total transmit power is not to exceed $P_{CMAX, CG}$ of the CG at any overlapping part.

If a plurality of TAGs are configured in a CG for the terminal device 1 and PUSCH transmission of the terminal device 1 in the subframe i for a certain serving cell in one of the TAGs in the CG overlaps one or some of the first symbols of PUCCH transmission in the subframe i+1 for a different serving cell in any of the other TAGs in the CG, the terminal device 1 adjusts the total transmit power so that the total transmit power is not to exceed $P_{CMAX, CG}$ of the CG at any overlapping part.

If a plurality of TAGs are configured in a CG for the terminal device 1 and SRS transmission of the terminal device 1 at one symbol in the subframe i for a certain serving cell in one of the TAGs in the CG overlaps PUCCH/PUSCH transmission in the subframe i or the subframe i+1 in a different serving cell in any of the other TAGs in the CG, the terminal device 1 drops the SRS transmission if the total transmit power exceeds $P_{CMAX, CG}$ of the CG at any part that the symbol overlaps.

If a plurality of TAGs and two or more serving cells are configured in a CG for the terminal device 1 and SRS transmission of the terminal device 1 at one symbol in the subframe i for a certain serving cell in the CG overlaps SRS transmission in the subframe i for a different serving cell in the CG and PUCCH/PUSCH transmission in the subframe i or the subframe i+1 in a different serving cell in the CG, the terminal device 1 drops the SRS transmission if the total transmit power exceeds $P_{CMAX, CG}$ of the CG at any part that the symbol overlaps.

If a plurality of TAGs are configured in a CG for the terminal device 1 and a higher layer requests that PRACH transmission in the secondary serving cell of the CG is performed in parallel with SRS transmission at a symbol in a subframe of a different serving cell belonging to a different one of the TAGs in the CG, the terminal device 1 drops the SRS transmission if the total transmit power exceeds $P_{CMAX, CG}$ of the CG at any part that the symbol overlaps.

If a plurality of TAGs are configured in a CG for the terminal device 1 and a higher layer requests that PRACH transmission in the secondary serving cell of the CG is performed in parallel with PUSCH/PUCCH transmission in a subframe of a different serving cell belonging to a different one of the TAGs in the CG, the terminal device 1 adjusts the transmit power of the PUSCH/PUCCH so that the total transmit power is not to exceed $P_{CMAX, CG}$ of the CG at the overlapping part.

As described above, transmit power can be efficiently controlled among cell groups even when dual connectivity is configured.

Description has been given above of the case in which required power is calculated for each channel first, then the maximum output power is calculated for each CG, and lastly power scaling is performed in each CG. In this example, guaranteed power and priority rules are used for the calculation of the maximum output power for each CG. Moreover, power scaling in each CG is applied when the total transmit power of the CG exceeds maximum output power calculated for the CG.

In contrast to the above, description will be given below of a case in which required power is calculated for each channel first, then power scaling is performed in each CG, and lastly excess power is allocated among the CGs. Here, for power scaling in each CG, a power scaling method as that described above is applied when the total transmit power of the CG exceeds the guaranteed power of the CG that is calculated. Moreover, a similar priority rule as that described above is used for excess power allocation among CGs.

First, power scaling in the MCG in the case where dual connectivity is configured will be described. In the MCG, power scaling is applied when the total required power is assumed to exceed $P_{pre, MeNB}$. Calculation for power scaling in the MCG is performed when a power calculation target subframe is a subframe in the MCG, when a power calculation target subframe is a subframe in the SCG and the subframes in the MCG and the subframes in the SCG are synchronized (when the timing of reception between the subframes is equal to or smaller than (or smaller than) a predetermined value), or when a power calculation target subframe is a subframe in the SCG and required powers can be calculated for the MCG subframes overlapping the power calculation target subframe in the SCG (the subframe overlapping the forward part and the subframe overlapping the later part) (i.e., when the terminal device 1 has recognized the power value required for uplink transmission in the MCG subframe).

Here, $P_{pre, MeNB}$ is a temporary total power value (in a previous step) to be allocated to the MCG in this step. When the terminal device 1 has recognized (can calculate) the total required power of the subframes in the MCG (the total of the required power values of the channels/signals calculated on the basis of $P_{CMAX, c}$, TPC commands, and resource assignment, e.g., the total value of $P_{PUCCH}$, $P_{PUSCH}$, and $P_{SRS}$), $P_{pre, MeNB}$ can take the smaller (smallest) value of the total required power and guaranteed power $P_{MeNB}$. Alternatively, when the subframes in the MCG and the subframes in the SCG are synchronized, $P_{pre, MeNB}$ can take the smaller value of the total required power and guaranteed power $P_{MeNB}$. In contrast, when the terminal device 1 has not recognized (cannot calculate) the total required power of the subframes in the MCG, $P_{pre, MeNB}$ takes the value of the guaranteed power $P_{MeNB}$. Alternatively, when the subframes in the MCG and the subframes in the SCG are synchronized and the subframes in the MCG are transmitted subsequent time points to those of the subframes in the SCG, $P_{pre, MeNB}$ can take the value of the guaranteed power $P_{MeNB}$.

If the total transmit power of the terminal device 1 in the MCG is assumed to exceed $P_{pre, MeNB}$ (or $P_{MeNB}$), the terminal device 1 performs scaling on $P_{PUSCH, c}$ in the serving cell c so that the condition $\Sigma (wP_{PUSCH, c}) \le (P_{pre, MeNB} - P_{PUCCH})$ (or the condition $\Sigma (wP_{PUCCH, c}) \le (P_{MeNB} - P_{PUCCH})$ is to be satisfied. Here, w denotes a scaling factor (coefficient by which a power value is multiplied) for the serving cell c and takes a value that is equal to or greater than zero and equal to or smaller than one. $P_{PUSCH, c}$ is power required for PUSCH transmission in the serving cell c. $P_{PUCCH}$ is power required for PUCCH transmission in the CG (i.e., MCG) and is set as $P_{PUCCH}=0$ when there is no PUCCH transmission in the CG. Here, as long, as it is not the case where $\Sigma (wP_{PUSCH, c})=0$ and the total transmit power of the terminal device 1 still exceeds $P_{pre, MeNB}$ (or $P_{MeNB}$), power scaling is not applied to any PUCCH. In contrast, when $\Sigma (wP_{PUSCH, c})=0$ and the total transmit power of the terminal device 1 still exceeds $P_{MeNB}$, power scaling is applied to PUCCHs.

If the terminal device 1 performs transmission of a PUSCH including the UCI in the certain serving cell j and performs transmission of a PUSCH not including the UCI in any of the other serving cells, and the total transmit power of the terminal device 1 in the MCG is assumed to exceed $P_{pre, MeNB}$ (or $P_{MeNB}$), the terminal device 1 performs scaling on the $P_{PUSCH, c}$ in the serving cell c not including the UCI so as to satisfy the condition $\Sigma (wP_{PUSCH, c}) \le (P_{pre, MeNB} - P_{PUSCH, j})$ (or the condition $\Sigma (wP_{PUSCH, c}) \le (P_{MeNB} - P_{PUSCH, j})$). Note that the left side represents the total in the serving cells c other than the serving cell j. Here, w is a scaling factor for the serving cell c not including the UCI. Here, as long as it is not the case where $\Sigma$ (w$P_{PUSCH, c}$)=0 and the total transmit power of the terminal device 1 still exceeds $P_{pre, MeNB}$ (or $P_{MeNB}$), power scaling is not applied to the PUSCH including the UCI. In contrast, when $\Sigma$ (w$P_{PUSCH, c}$)=0 and the total transmit power of the terminal device 1 still exceeds $P_{pre, MeNB}$ (or $P_{MeNB}$), power scaling is applied to the PUSCH including the UCI. Note that, although w is a common value for the serving cells when w>0, w may be zero for a certain serving cell. In this case, this means that channel transmission is dropped in the certain serving cell.

If the terminal device 1 transmits a PUCCH and a PUSCH including the UCI in the certain serving cell j at the same time and performs transmission of a PUSCH not including the UCI in any of the other serving cells, and the total transmit power of the terminal device 1 in the MCG is assumed to exceed $P_{pre, MeNB}$ (or $P_{MeNB}$), the terminal device 1 obtains $P_{PUSCH, c}$ on the basis of $P_{PUSCH, j}$=min($P_{PUSCH, j}$, ($P_{pre, MeNB}$−$P_{PUCCH}$)) and $\Sigma$ (w$P_{PUSCH, c}$)≤($P_{pre, MeNB}$−$P_{PUCCH}$−$P_{PUSCH, j}$) (or on the basis of $P_{PUSCH, j}$=min ($P_{PUSCH, j}$, ($P_{MeNB}$−$P_{PUCCH}$)) and $\Sigma$ (w$P_{PUSCH, c}$)≤($P_{MeNB}$−$P_{PUCCH}$−$P_{PUSCH, j}$). In other words, the terminal device 1 reserves the power for the PUCCH first and then calculates power for the PUSCH including the UCI from the residual power. In this operation, when $P_{pre, MeNB}$ (or $P_{MeNB}$) is smaller than/equal to the power required for the PUCCH, all $P_{pre, MeNB}$ (or $P_{MeNB}$) is determined to be the power for the PUCCH. When the residual power is higher than the power required for the PUSCH including the UCI ($P_{PUSCH, j}$ on the right-hand side of the first expression), the power required for the PUSCH including the UCI is assumed to be the power for the PUSCH including the UCI ($P_{PUSCH, j}$ on the left-hand side of the first expression, i.e., the actual power value of the PUSCH including the UCI), and when the residual power is lower than/equal to the power required for the PUSCH including the UCI, all the residual power is determined to be the power for the PUSCH including the UCI. The residual power obtained by subtracting the power for the PUCCH and the power for the PUSCH including the UCI is allocated to the PUSCH not including the UCI. In this case, scaling is performed as needed.

If a plurality of timing advance groups (TAGs) in the MCG are configured in the terminal device 1 and PUCCH/PUSCH transmission of the terminal device 1 in the subframe i for a certain serving cell in one of the TAGs overlaps one or some of the first symbols of PUSCH transmission in the subframe i+1 for a different serving cell in any of the other TAGs, the terminal device 1 adjusts the total transmit power of the MCH so that the total transmit power is not to exceed $P_{pre, MeNB}$ (or $P_{MeNB}$) at any overlapping part. Here, "TAG" is a group of serving cells for adjustment of uplink transmission timing with respect to downlink reception timing. One or more serving cells belong to a single TAG, and common adjustment is applied to the one or more serving cells in the single TAG.

If a plurality of TAGs in the MCG are configured in the terminal device 1 and PUSCH transmission of the terminal device 1 in the subframe i for a certain serving cell in one of the TAGs overlaps one or some of the first symbols of PUCCH transmission in the subframe i+1 for a different serving cell in any of the other TAGs, the terminal device 1 adjusts the total transmit power of the MCG so that the total transmit power is not to exceed $P_{pre, MeNB}$ (or $P_{MeNB}$) at any overlapping part.

If a plurality of TAGs in the MCG are configured in the terminal device 1 and SRS transmission of the terminal device 1 at one symbol in the subframe i for a certain serving cell in one of the TAGs overlaps PUCCH/PUSCH transmission in the subframe i or the subframe i+1 in a different serving cell in any of the other TAGs, the terminal device 1 drops the SRS transmission if the total transmit power of the MCG exceeds $P_{pre, MeNB}$ (or $P_{MeNB}$) at any part that the symbol overlaps.

If a plurality of TAGs in the MCG and two or more serving cells are configured in the terminal device 1 and SRS transmission of the terminal device 1 at one symbol in the subframe i for a certain serving cell overlaps SRS transmission in the subframe i for a different serving cell and PUCCH/PUSCH transmission in the subframe i or the subframe i+1 in a different serving cell, the terminal device 1 drops the SRS transmission if the total transmit power of the MCG exceeds $P_{pre, MeNB}$ (or $P_{MeNB}$) at any part that the symbol overlaps.

If a plurality of TAGs in the MCG are configured in the terminal device 1 and a higher layer requests that PRACH transmission in a secondary serving cell is performed in parallel with SRS transmission at a symbol in a subframe of a different serving cell belonging to a different one of the TAGs, the terminal device 1 drops the SRS transmission if the total transmit power of the MCG exceeds $P_{pre, MeNB}$ (or $P_{MeNB}$) at any part that the symbol overlaps.

If a plurality of TAGs in the MCG are configured in the terminal device 1 and a higher layer requests that PRACH transmission in a secondary serving cell is performed in parallel with PUSCH/PUCCH transmission in a subframe of a different serving cell belonging to a different one of the TAGs, the terminal device 1 adjusts the transmit power of the PUSCH/PUCCH so that the total transmit power of the MCG is not to exceed $P_{pre, MeNB}$ (or $P_{MeNB}$) at the overlapping part.

Next, power scaling in the SCG will be described. In the SCG, power scaling is applied when the total required power is assumed to exceed $P_{pre, SeNB}$ ($P_{SeNB}$). Calculation for power scaling in the SCG is performed when a power calculation target subframe is a subframe in the SCG, when a power calculation target subframe is a subframe in the MCG and the subframes in the MCG and the subframes in the SCG are synchronized (when the timing of reception between the subframes is equal to or smaller than (or smaller than) a predetermined value), or when a power calculation target subframe is a subframe in the MCG and required powers can be calculated for the SCG subframes overlapping the calculation target subframe in the MCG (the subframe overlapping the first part and the subframe overlapping the later part) (i.e., when the terminal device 1 has recognized the power values required for uplink transmission in the SCG subframes).

Here, $P_{pre, SeNB}$ is a temporary total power value (in a previous step) to be allocated to the SCG in this step. When the terminal device 1 has recognized (can calculate) the total required power of the subframes in the SCG (the total of the required power values of the channels/signals calculated on the basis of $P_{CMAX, c}$, TPC commands, and resource assignment, e.g., the total value of $P_{PUCCH}$, $P_{PUSCH}$, and $P_{SRS}$), $P_{pre, SeNB}$ can take the smaller (smallest) value of the total required power and guaranteed power $P_{SeNB}$. Alternatively, when the subframes in the MCG and the subframes in the SCG are synchronized, $P_{pre, SeNB}$ can take the smaller value of the total required power and guaranteed power $P_{MeNB}$. In contrast, when the terminal device 1 has not recognized (cannot calculate) the total required power of the subframes in the SCG, $P_{pre,\ SeNB}$ takes the value of the guaranteed power $P_{SeNB}$. Alternatively, when the subframes in the MCG and the subframes in the SCG are synchronized and the subframes in the SCG are transmitted later time points to those of the subframes in the MCG, $P_{pre,\ SeNB}$ can take the value of the guaranteed power $P_{SeNB}$.

If the total transmit power of the terminal device 1 in the SCG is assumed to exceed $P_{pre,\ SeNB}$ (or $P_{SeNB}$), the terminal device 1 performs scaling on $P_{PUSCH,\ c}$ in the serving cell c so that the condition $\Sigma\ (wP_{PUSCH,\ c}) \leq (P_{pre,\ SeNB} - P_{PUCCH})$ (or the condition $\Sigma\ (wP_{PUSCH,\ c}) \leq (P_{SeNB} - P_{PUCCH})$ is to be satisfied. Here, w denotes a scaling factor (coefficient by which a power value is multiplied) for the serving cell c and takes a value that is equal to or greater than zero and equal to or smaller than one. $P_{PUSCH,\ c}$ is power required for PUSCH transmission in the serving cell c. $P_{PUCCH}$ is power required for PUCCH transmission in the CG (i.e., SCG) and is set as $P_{PUCCH} = 0$ when there is no PUCCH transmission in the CG. Here, as long as it is not the case where $\Sigma\ (wP_{PUSCH,\ c}) = 0$ and the total transmit power of the terminal device 1 in the SCG still exceeds $P_{pre,\ SeNB}$ (or $P_{SeNB}$), power scaling is not applied to any PUCCH. In contrast, when $\Sigma\ (wP_{PUSCH,\ c}) = 0$ and the total transmit power of the terminal device 1 in the SCG still exceeds $P_{pre,\ SeNB}$ (or $P_{SeNB}$), power scaling is applied to the PUCCHs.

If the terminal device 1 performs transmission of a PUSCH including the UCI in the certain serving cell j and performs transmission of a PUSCH not including the UCI in any of the other serving cells, and the total transmit power of the terminal device 1 in the SCG is assumed to exceed $P_{pre,\ SeNB}$ (or $P_{SeNB}$), the terminal device 1 performs scaling on $P_{PUSCH,\ c}$ in the serving cell c not including the UCI so as to satisfy the condition $\Sigma(wP_{PUSCH,\ c}) \leq (P_{pre,\ SeNB} - P_{PUSCH,\ j})$ (or the condition $\Sigma\ (wP_{PUSCH,\ c}) \leq (P_{SeNB} - P_{PUSCH,\ j})$). Note that the left-hand side represents the total in the serving cells c other than the serving cell j. Here, w is a scaling factor for the serving cell c not including the UCI. Here, as long as it is not the case where $\Sigma\ (wP_{PUSCH,\ c}) = 0$ and the total transmit power of the terminal device 1 in the SCG still exceeds $P_{pre,\ SeNB}$ (or $P_{SeNB}$), power scaling is not applied to the PUSCH including the UCI. In contrast, when $\Sigma\ (wP_{PUSCH,\ c}) = 0$ and the total transmit power of the terminal device 1 in the SCG still exceeds $P_{pre,\ SeNB}$ (or $P_{SeNB}$), power scaling is applied to the PUSCH including the UCI. Note that, although w is a common value for the serving cells when w>0, w may be zero for a certain serving cell. In this case, this means that channel transmission is dropped in the certain serving cell.

If the terminal device 1 transmits a PUCCH and a PUSCH including the UCI in the certain serving cell j at the same time and performs transmission of a PUSCH not including the UCI in any of the other serving cells, and the total transmit power of the terminal device 1 in the SCG is assumed to exceed $P_{pre,\ SeNB}$ (or $P_{SeNB}$), the terminal device 1 obtains $P_{PUSCH,\ c}$ on the basis of $P_{PUSCH,\ j} = \min(P_{PUSCH,\ j}, (P_{pre,\ SeNB} - P_{PUCCH}))$ and $\Sigma\ (wP_{PUSCH,\ c}) \leq (P_{pre,\ SeNB} - P_{PUCCH} - P_{PUSCH,\ j})$ (or on the basis of $P_{PUSCH,\ j} = \min(P_{PUSCH,\ j}, (P_{SeNB} - P_{PUCCH}))$ and $\Sigma\ (wP_{PUSCH,\ c}) \leq (P_{SeNB} - P_{PUCCH} - P_{PUSCH,\ j})$. In other words, the terminal device 1 reserves the power for the PUCCH first and then calculates power for the PUSCH including the UCI from the residual power. In this operation, when $P_{pre,\ SeNB}$ (or $P_{SeNB}$) is smaller than/equal to the power required for the PUCCH, all $P_{pre,\ SeNB}$ (or $P_{MeNB}$) is determined to be the power for the PUCCH. When the residual power is higher than the power required for the PUSCH including the UCI ($P_{PUSCH,\ j}$ on the right-hand side of the first expression), the power required for the PUSCH including the UCI is assumed to be the power for the PUSCH including the UCI ($P_{PUSCH,\ j}$ on the left-hand side of the first expression, i.e., the actual power value of the PUSCH including the UCI), and when the residual power is lower than/equal to the power required for the PUSCH including the UCI, all the residual power is determined to be the power for the PUSCH including the UCI. The residual power obtained by subtracting the power for the PUCCH and the power for the PUSCH including the UCI is allocated to the PUSCH not including the UCI. In this case, scaling is performed as needed.

If a plurality of timing advance groups (TAGs) in the SCG are configured in the terminal device 1 and PUCCH/PUSCH transmission of the terminal device 1 in the subframe i for a certain serving cell in one of the TAGs overlaps one or some of the first symbols of PUSCH transmission in the subframe i+1 for a different serving cell in any of the other TAGs, the terminal device 1 adjusts the total transmit power of the SCG so that the total transmit power is not to exceed $P_{pre,\ SeNB}$ (or $P_{SeNB}$) at any overlapping part. Here, a TAG is a group of serving cells for adjustment of uplink transmission timing with respect to downlink reception timing. One or more serving cells belong to a single TAG, and common adjustment is applied to the one or more serving cells in the single TAG.

If a plurality of TAGs in the SCG are configured in the terminal device 1 and PUSCH transmission of the terminal device 1 in the subframe i for a certain serving cell in one of the TAGs overlaps one or some of the first symbols of PUCCH transmission in the subframe i+1 for a different serving cell in any of the other TAGs, the terminal device 1 adjusts the total transmit power of the SCG so that the total transmit power is not to exceed $P_{pre,\ SeNB}$ (or $P_{SeNB}$) at any overlapping part.

If a plurality of TAGs in the SCG are configured in the terminal device 1 and SRS transmission of the terminal device 1 at one symbol in the subframe i for a certain serving cell in one of the TAGs overlaps PUCCH/PUSCH transmission in the subframe i or the subframe i+1 in a different serving cell in any of the other TAGs, the terminal device 1 drops the SRS transmission if the total transmit power of the SCG exceeds $P_{pre,\ SeNB}$ (or $P_{SeNB}$) at any part that the symbol overlaps.

If a plurality of TAGs in the SCG and two or more serving cells are configured in the terminal device 1 and SRS transmission of the terminal device 1 at one symbol in the subframe i for a certain serving cell overlaps SRS transmission in the subframe i for a different serving cell and PUCCH/PUSCH transmission in the subframe i or the subframe i+1 in a different serving cell, the terminal device 1 drops the SRS transmission if the total transmit power of the SCG exceeds $P_{pre,\ SeNB}$ (or $P_{SeNB}$) at any part that the symbol overlaps.

If a plurality of TAGs in the SCG are configured in the terminal device 1 and a higher layer requests that PRACH transmission in a secondary serving cell is performed in parallel with SRS transmission at a symbol in a subframe of a different serving cell belonging to a different one of the TAGs, the terminal device 1 drops the SRS transmission if the total transmit power of the SCG exceeds $P_{pre,\ SeNB}$ (or $P_{SeNB}$) at any part that the symbol overlaps.

If a plurality of TAGs in the SCG are configured in the terminal device 1 and a higher layer requests that PRACH transmission in a secondary serving cell is performed in parallel with PUSCH/PUCCH transmission in a subframe of a different serving cell belonging to a different one of the TAGs, the terminal device 1 adjusts the transmit power of the PUSCH/PUCCH so that the total transmit power of the SCG is not to exceed $P_{pre, SeNB}$ (or $P_{SeNB}$) at the overlapping part.

In the next step, excess power in the previous step (e.g., the residual power obtained by subtracting $P_{pre, MeNB}$ and $P_{pre, SeNB}$ from $P_{CMAX}$) is distributed among the CGs. In this operation, the excess power is distributed to the channels/signals on which power scaling was performed in the previous step, in the order of the predetermined priorities. In this operation, the excess power is not distributed to the channels/signals of any CG to which power scaling is not applied in the previous step (for which required power is not recognized (cannot be calculated) or which has the total required power that is equal to or greater than guaranteed power).

When the terminal device 1 has recognized (cannot calculate), in the calculation of the power of a subframe of one of the CGs, required power of the subframe of the other CG overlapping the later part of the subframe, all the excess power in this step is allocated to the power calculation target CG as long as the total output power of the terminal device 1 does not exceed $P_{CMAX}$ at any part of the subframe (including the part overlapping the earlier subframe in the other CG in terms of time). When the excess power is allocated in the order of a PUCCH, a PUSCH including the UCI, and then a PUSCH not including the UCI, the result of allocation of the excess power matches the result of performing power scaling similar to the power scaling in the previous step except that $P_{pre, MeNB}$ or $P_{pre, SeNB}$ is replaced with a value obtained by adding the excess power to $P_{pre, MeNB}$ or $P_{pre, SeNB}$. However, when power scaling was not applied to the power calculation target CG in the previous step, in other words, required power is already allocated to each of all the uplink channels/signals in the CG, the allocation of the excess power need not be performed. In this case, power scaling in this step need not be performed either.

When the terminal device 1 has obtained (can calculate), in the calculation of the power of a subframe of one of the CGs, required power of the subframe of the other CG overlapping the later part of the subframe (or a TPC command, which is information for calculating required power, resource assignment information, and the like), the excess power in this step is allocated to the channels/signals to which power scaling was applied, in the order of priority over the CGs as long as the total output power of the terminal device 1 does not exceed $P_{CMAX}$ at any part of the subframe. However, when power scaling was not applied to the power calculation target CG in the previous step, in other words, required power is already allocated to each of all the uplink channels/signals in the CG, the allocation of the excess power need not be performed. Here, as the order of priority, the above-described order of priority (the order of priority based on the CGs, channels/signals, contents, and the like) can be used.

In any of the above cases, power higher than that allocated in the previous step can be allocated by replacing the scaling factor w in the previous step with a greater value (value closer to one) or replacing the scaling factor with one (i.e., being equivalent to not performing multiplication with the scaling factor). Additionally, the scaling factor w can be replaced with a scaling factor greater than zero (including one) for channels/signals for which the scaling factor w of zero was used (dropped channels/signals) in the previous step. In this way, it is also possible to prevent uplink transmission that was dropped in the previous step, from being dropped (to perform the uplink transmission). Alternatively, for simplicity, it is also possible not to allocate excess power to the channels/signals for which the scaling factor w of zero was used in the previous step. In this case, the excess power is allocated only for the channels/signals for which the scaling factor w of a value greater than zero was used in the previous step.

For example, the excess power is sequentially allocated to the CGs in the order from a PUCCH in the MCG, a PUCCH in the SCG, a PUSCH including the UCI in the MCG, a PUSCH not including the UCI in the MCG, and then a PUSCH not including the UCI in the SCG. More specifically, allocation of excess power is performed in the following procedure.

As Step (x1), excess power is initialized. More specifically, it is assumed that $P_{Remaining} = P_{CMAX} - P_{pre, MeNB} - P_{pre, SeNB}$. Note that, when a power calculation target is a subframe in the MCG, $P_{pre, SeNB}$ is the value of the SCG subframe overlapping the later part of the subframe. In this case, it may be assumed that $P_{Remaining} = P_{CMAX} - P_{pre, MeNB} - \max(P_{SCG}(i-1), P_{pre, SeNB})$. Here, $P_{SCG}(i-1)$ denotes the actual total transmit power of the SCG subframe overlapping the forward part of the power calculation target MCG subframe. Moreover, when a power calculation target is a subframe in the SCG, $P_{pre, MeNB}$ is the value of the MCG subframe overlapping the later part of the subframe. In this case, it may be assumed that $P_{Remaining} = P_{CMAX} - \max(P_{MCG}(i-1), P_{pre, MeNB}) - P_{pre, SeNB}$. Here, $P_{MCG}(i-1)$ denotes the actual total transmit power of the MCG subframe overlapping the forward part of the power calculation target SCG subframe.

As Step (x2), the following computation is performed. If there is PUCCH transmission in the MCG, and scaling using the scaling factor w is applied to the PUCCH and $P_{Remaining} > 0$ (i.e., there is excess power), a new scaling factor w' with which $(w'-w)P_{PUCCH}$ does not exceed $P_{Remaining}$ is determined. Here, $w < w' \le 1$, and $P_{PUCCH}$ denotes the required power of the PUCCH in the MCG. By setting $P_{Remaining} = P_{Remaining} - (w'-w)P_{PUCCH}$, the excess power value is updated in such a manner as to be reduced by the allocated power.

As Step (x3), the following computation is performed. If there is PUCCH transmission in the SCG, and scaling using the scaling factor w is applied to the PUCCH and $P_{Remaining} > 0$ (i.e., there is excess power), a new scaling factor w' with which $(w'-w)P_{PUCCH}$ does not exceed $P_{Remaining}$ is determined. Here, $w < w' \le 1$, and $P_{PUCCH}$ denotes the required power of the PUCCH in the SCG. By setting $P_{Remaining} = P_{Remaining} - (w'-w)P_{PUCCH}$, the excess power value is updated in such a manner as to be reduced by the allocated power.

As Step (x4), the following computation is performed. If there is transmission of a PUSCH including the UCI in the MCG, and scaling using the scaling factor w is applied to the PUSCH and $P_{Remaining} > 0$ (i.e., there is excess power), a new scaling factor w' with which $(w'-w)P_{PUSCH, j}$ does not exceed $P_{Remaining}$ is determined. Here, $w < w' \le 1$, and $P_{PUSCH, j}$ denotes the required power of the PUSCH including the UCI in the MCG. By setting $P_{Remaining} = P_{Remaining} - (w'-w)P_{PUSCH, j}$, the excess power value is updated in such a manner as to be reduced by the allocated power.

As Step (x5), the following computation is performed. If there is transmission of a PUSCH including the UCI in the SCG, and scaling using the scaling factor w is applied to the PUSCH and $P_{Remaining} > 0$ (i.e., there is excess power), a new scaling factor w' with which $(w'-w)P_{PUSCH, j}$ does not exceed $P_{Remaining}$ is determined. Here, $w < w' \le 1$, and $P_{PUSCH, j}$ denotes the required power of the PUSCH including the UCI in the SCG. By setting $P_{Remaining}=P_{Remaining}-(w'-w)P_{PUSCH,j}$, the excess power value is updated in such a manner as to be reduced by the allocated power.

As Step (x6), the following computation is performed. If there is transmission of a PUSCH not including the UCI in the MCG, and scaling using the scaling factor w is applied to the PUSCH and $P_{Remaining}>0$ (i.e., there is excess power), a new scaling factor w' with which $(w'-w) P_{PUSCH, c}$ does not exceed $P_{Remaining}$ is determined. Here, $w<w'\leq 1$, and $P_{PUSCH, c}$ denotes the required power for the PUSCH in the serving cell c in the MCG. By setting $P_{Remaining}=P_{Remaining}-(w'-w)\Sigma P_{PUSCH, c}$, the excess power value is updated in such a manner as to be reduced by the allocated power.

As Step (x7), the following computation is performed. If there is transmission of a PUSCH not including the UCI in the SCG, and scaling using the scaling factor w is applied to the PUSCH and $P_{Remaining}>0$ (i.e., there is excess power), a new scaling factor w' with which $(w'-w)\Sigma_{PUSCH, c}$ does not exceed $P_{Remaining}$ is determined. Here, $w<w'\leq 1$, and $P_{PUSCH, c}$ denotes the required power for the PUSCH in the serving cell c in the SCG. By setting $P_{Remaining}=P_{Remaining}-(w'-w)\Sigma P_{PUSCH, c}$, the excess power value is updated in such a manner as to be reduced by the allocated power.

As another example, the excess power is sequentially allocated to the CGs in the order from a channel including HARQ-ACK in the MCG, a channel including HARQ-ACK in the SCG, a PUSCH not including HARQ-ACK in the MCG, and then a PUSCH not including HARQ-ACK in the SCG. More specifically, allocation of excess power is performed in the following procedure.

As Step (y1), excess power is initialized. Note that Step (y1) is carried out through a similar process as that in Step (x1).

As Step (y2), the following computation is performed. If there is PUCCH transmission carrying HARQ-ACK in the MCG, and scaling using the scaling factor w is applied to the PUCCH and $P_{Remaining}>0$ (i.e., there is excess power), a new scaling factor w' with which $(w'-w)P_{PUCCH}$ does not exceed $P_{Remaining}$ is determined. Here, $w<w'\leq 1$, and $P_{PUCCH}$ denotes the required power of the PUCCH in the MCG. By setting $P_{Remaining}=P_{Remaining}-(w'-w)P_{PUCCH}$, the excess power value is updated in such a manner as to be reduced by the allocated power.

As Step (y3), the following computation is performed. If there is PUSCH transmission carrying HARQ-ACK in the MCG, and scaling using the scaling factor w is applied to the PUSCH and $P_{Remaining}>0$ (i.e., there is excess power), a new scaling factor w' with which $(w'-w)P_{PUSCH, j}$ does not exceed $P_{Remaining}$ is determined. Here, $w<w'\leq 1$, and $P_{PUSCH,j}$ denotes the required power of the PUSCH carrying HARQ-ACK in the MCG. By setting $P_{Remaining}=P_{Remaining}-(w'-w)P_{PUSCH,j}$, the excess power value is updated in such a manner as to be reduced by the allocated power.

As Step (y4), the following computation is performed. If there is PUCCH transmission carrying HARQ-ACK in the SCG, and scaling using the scaling factor w is applied to the PUCCH and $P_{Remaining}>0$ (i.e., there is excess power), a new scaling factor w' with which $(w'-w)P_{PUCCH}$ does not exceed $P_{Remaining}$ is determined. Here, $w<w'\leq 1$, and $P_{PUCCH}$ denotes the required power of the PUCCH in the SCG. By setting $P_{Remaining}=P_{Remaining}-(w'-w)P_{PUCCH}$, the excess power value is updated in such a manner as to be reduced by the allocated power.

As Step (y5), the following computation is performed. If there is PUSCH transmission carrying HARQ-ACK in the SCG, and scaling using the scaling factor w is applied to the PUSCH and $P_{Remaining}>0$ (i.e., there is excess power), a new scaling factor w' with which $(w'-w)P_{PUCCH, j}$ does not exceed $P_{Remaining}$ is determined. Here, $w<w'\leq 1$, and $P_{PUSCH,j}$ denotes the required power of the PUSCH carrying HARQ-ACK in the SCG. By setting $P_{Remaining}=P_{Remaining}-(w'-w)P_{PUSCH,j}$, the excess power value is updated in such a manner as to be reduced by the allocated power.

As Step (y6), the following computation is performed. If there is PUSCH transmission not including HARQ-ACK in the MCG, and scaling using the scaling factor w is applied to the PUSCH and $P_{Remaining}>0$ (i.e., there is excess power), a new scaling factor w' with which $(w'-w)\Sigma P_{PUSCH, c}$ does not exceed $P_{Remaining}$ is determined. Here, $w<w'\leq 1$, and $P_{PUSCH, c}$ denotes the required power for the PUSCH in the serving cell c in the MCG. By setting $P_{Remaining}=P_{Remaining}-(w'-w) P_{PUSCH, c}$ the excess power value is updated in such a manner as to be reduced by the allocated power.

As Step (y7), the following computation is performed. If there is PUSCH transmission not including HARQ-ACK in the SCG, and scaling using the scaling factor w is applied to the PUSCH and $P_{Remaining}>0$ (i.e., there is excess power), a new scaling factor w' with which $(w'-w)\Sigma P_{PUSCH, c}$ does not exceed $P_{Remaining}$ is determined. Here, $w<w'\leq 1$, and $P_{PUSCH, c}$ denotes the required power for the PUSCH in the serving cell c in the SCG. By setting $P_{Remaining}=P_{Remaining}-(w'-w)\Sigma P_{PUSCH, c}$, the excess power value is updated in such a manner as to be reduced by the allocated power.

As described above, required powers of the channels/signals of both CGs are calculated first, and subsequently, temporary power scaling is performed for each CG as needed (when the total required power of the CG exceeds the guaranteed power of the CG). Lastly, the excess power is allocated in order, to the channels/signals which was multiplied by a scaling factor in the previous step. In this way, uplink transmit power can be used effectively.

In the above, description has been given of a case in which required power is calculated for each channel first, then power scaling is performed in each CG, and lastly excess power is allocated among the CGs.

In contrast to the above, description will be given below of one example of a case in which required power is calculated for each channel first, and power scaling is performed while excess power is allocated. Here, a similar priority rule as that described above can be used for excess power allocation among CGs. The excess power is allocated to the channels in the order based on the priority rule. In this processing, power scaling is applied when the total transmit power at that time in the target CG exceeds a power value obtained by subtracting the total power already allocated to the other CG from $P_{CMAX}$. Regardless of whether the power scaling is performed or not, the allocated power value is subtracted from the excess power when the power is allocated to the target channel. These steps are repeated until no excess power is left.

First, power for a PUCCH of a certain serving cell (for example, PCell) belonging to the MCG is allocated. The power for the PUCCH of the certain serving cell belonging to the MCG may be called $P_{PUCCH, MCG}$. Since the total transmit power (power required for the PUCCH) at this time of the MCG does not exceed $P_{CMAX}$ or $P_{CMAX, c}$, $P_{PUCCH}$ of the MCG is allocated. When there is no PUCCH transmission in the MCG, it is assumed that $P_{PUCCH, MCG}=0$.

When the MCG and the SCG are configured, in other words, a plurality of CGs are configured, the power for a PUCCH of a certain serving cell belonging to the MCG is configured such that the power does not exceed the upper limit value ($P_{CMAX}$ or $P_{CMAX, c}$) of power for the PUCCH of the MCG. In other words, $P_{PUCCH, MCG}$ are configured on the basis of the smallest value (value of the smaller one) of power required for the PUCCH and the upper limit value of power.

When the power required for the PUCCH of the MCG is larger than $P_{CMAX}$, with respect to the power required for the PUCCH, a scaling factor is calculated so that the power does not exceed the upper limit value of power for the PUCCH of the MCG, and the factor is applied to the power required for the PUCCH. When scaling of the power required for the PUCCH of the MCG is performed, in other words, a scaling factor is applied to the power required for the PUCCH of the MCG, it is not necessary to allocate power to other uplink physical channels (for example, a PUSCH including a UCI and a PUSCH not including the UCI).

Next, power for a PUCCH of a certain serving cell (for example, pSCell) belonging to the SCG is allocated. The power for the PUCCH of the certain serving cell (for example, pSCell) belonging to the SCG may be called $P_{PUCCH, SCG}$. Note that the PCell and pSCell are different serving cells from each other. $P_{PUCCH}$ of the SCG is allocated unless the total transmit power (power required for the PUCCH) at this time in the SCG exceeds a value obtained by subtracting the power already allocated to the MCG from $P_{CMAX}$. When the total transmit power exceeds the value, on the other hand, scaling is performed or it is dropped. When there is no PUCCH transmission in the SCG, it is assumed that $P_{PUCCH, SCG}=0$. The power which has already been allocated to the MCG may be called $P_{CMAX, MCG}$. $P_{CMAX, MCG}$ may be constituted by $P_{PUCCH, MCG}$ and/or $P_{PUSCH, MCG}$ and/or $P_{PUSCH, c, MCG}$. In other words, $P_{CMAX, MCG}$ may be constituted by using any one of $P_{PUCCH, MCG}$, $P_{PUSCH, j, MCG}$, and $P_{PUSCH, c, MCG}$, by using any two of them, or by using all of them. For example, $P_{CMAX, MCG}$ may be $P_{PUCCH, MCG}+P_{PUSCH, j, MCG}$, may be $P_{PUCCH, MCG}+P_{PUSCH, j, MCG}+P_{PUSCH, c, MCG}$, or may be 0 when there is no power which has already been allocated to the MCG.

When the MCG and the SCG are configured, in other words, a plurality of CGs are configured, power $P_{PUCCH, SCG}$ for a PUCCH of a certain serving cell belonging to the SCG is configured such that the power does not exceed the upper limit value ($P_{CMAX}$ or $P_{CMAX}-P_{CMAX, MCG}$) of power for the PUCCH of the SCG. In other words, $P_{PUCCH, SCG}$ is configured on the basis of the smallest value of power required for the PUCCH and the upper limit value of power. When the excess power allocatable to the power for the PUCCH of the certain serving cell belonging to the SCG is smaller than a prescribed value (or threshold) with respect to power required for the PUCCH, the PUCCH transmission of the certain serving cell belonging to the SCG may be dropped. The prescribed value may be configured as a higher-layer parameter, or may be configured as a default value in a terminal device in advance, and a default value may be used when the prescribed value is not configured by higher-layer signaling.

When the power required for the PUCCH of the SCG is larger than the $P_{CMAX}$ and $P_{CMAX}-P_{CMAX, MCG}$, with respect to the power required for the PUCCH of the SCG, a scaling factor is calculated so that the power does not exceed the upper limit value of power for the PUCCH of the SCG, and the factor is applied to the power required for the PUCCH of the SCG. When scaling of the power required for the PUCCH of the SCG is performed, in other words, a scaling factor is applied to the power required for the PUCCH of the SCG, it is not necessary to allocate power to other uplink physical channels (for example, a PUSCH including a UCI and a PUSCH not including the UCI).

Next, power for a PUSCH including the UCI of a certain serving cell j belonging to the MCG is allocated. Here, the power for the PUSCH including the UCI of the certain serving cell j belonging to the MCG may be called $P_{PUSCH, j, MCG}$. Note that the certain serving cell j belonging to the MCG is a serving cell different at least from the pSCell, in other words, from a serving cell belonging to the SCG. $P_{PUSCH, j, MCG}$ is allocated unless the total transmit power (total of $P_{PUCCH}$ and $P_{PUSCH, j}$, in other words, total of $P_{PUCCH, MCG}$ and $P_{PUSCH, j, MCG}$) at this time in the MCG exceeds a value obtained by subtracting the power already allocated to the SCG from $P_{CMAX}$. When the total transmit power exceeds the value, on the other hand, scaling is performed or it is dropped. When there is no PUSCH transmission including the UCI in the MCG, it is assumed that $P_{PUSCH, j, MCG}=0$. The power which has already been allocated to the SCG may be called $P_{CMAX, SCG}$. $P_{CMAX, SCG}$ may be constituted by $P_{PUCCH, SCG}$ and/or $P_{PUSCH, k, SCG}$ and/or $P_{PUSCH, d, SCG}$. In other words, $P_{CMAX, SCG}$ may be constituted by using any one of $P_{PUCCH, SCG}$, $P_{PUSCH, k, SCG}$, and $P_{PUSCH, d, SCG}$, by using any two of them, or by using all of them. For example, $P_{CMAX, SCG}$ may be $P_{PUCCH, SCG}+P_{PUSCH, k, SCG}$, may be $P_{PUCCH, SCG}+P_{PUSCH, k, SCG}+P_{PUSCH, d, SCG}$, or may be 0 when there is no power which has already been allocated to the SCG.

When the MCG and the SCG are configured, in other words, a plurality of CGs are configured, the power $P_{PUSCH, j, MCG}$ for the PUSCH including the UCI of the certain serving cell j belonging to the MCG is configured such that the power does not exceed the upper limit value ($P_{CMAX}$, $P_{CMAX}-P_{PUCCH, MCG}$, $P_{CMAX}-P_{CMAX, SCG}$, or $P_{CMAX}-P_{PUCCH, MCG}-P_{CMAX, SCG}$) of power for the PUSCH including the UCI of the certain serving cell j belonging to the MCG. In other words, $P_{PUSCH, j, MCG}$ is configured on the basis of the smallest value of power required for the PUCCH and the upper limit value of the power for the PUSCH including the UCI of the certain serving cell j belonging to the MCG. When the excess power allocatable to the power for the PUSCH including the UCI of the certain serving cell j belonging to the MCG is smaller than a prescribed value (or threshold) with respect to the power required for the PUSCH, the transmission of the PUSCH including the UCI of the certain serving cell j belonging to the MCG may be dropped.

When the power required for the PUSCH including the UCI of the certain serving cell j belonging to the MCG is larger than the upper limit value of the power for the PUSCH including the UCI of the serving cell j, with respect to the power required for the PUSCH including the UCI of the serving cell j, a scaling factor is calculated so that the power does not exceed the upper limit value of power for the PUSCH including the UCI of the serving cell j, and the factor is applied to the power required for the PUSCH including the UCI of the serving cell j. When scaling of the power required for the PUSCH including the UCI of the certain serving cell j is performed, in other words, the scaling factor is applied to the power required for the PUSCH including the UCI of the serving cell j, it is not necessary to allocate power to other uplink physical channels (for example, a PUSCH not including the UCI).

Next, power for a PUSCH including the UCI of a serving cell k belonging to the SCG is allocated. The power for the PUSCH including the UCI of the certain serving cell k belonging to the SCG may be called $P_{PUSCH, k}$ SCG. Note that the certain serving cell k belonging to the SCG is a serving cell different from the PCell and the serving cell j, in other words, from a serving cell belonging to the MCG.

$P_{PUSCH, j, MCG}$ is allocated unless the total transmit power (total of $P_{PUCCH}$ and $P_{PUSCH, k}$, in other words, total of $P_{PUCCH, SCG}$ in the SCG, and $P_{PUSCH, k, SCG}$) at this time in the SCG exceeds a value obtained by subtracting the power already allocated to the MCG from $P_{CMAX}$. When the total transmit power exceeds the value, on the other hand, scaling is performed or it is dropped. When there is no transmission of PUSCH including the UCI in the SCG, it is assumed that $P_{PUSCH, k, SCG}=0$.

When the MCG and the SCG are configured, in other words, a plurality of CGs are configured, the power $P_{PUSCH, k, SCG}$ for the PUSCH including the UCI of the certain serving cell k belonging to the SCG is configured such that the power does not exceed the upper limit value ($P_{CMAX}$, $P_{CMAX}-P_{PUCCH, SCG}$, $P_{CMAX}-P_{CMAX, MCG}$, or $P_{CMAX}-P_{PUCCH, SCG}-P_{CMAX, MCG}$) of power for the PUSCH including the UCI of the certain serving cell k belonging to the SCG. In other words, $P_{PUSCH, k, SCG}$ are configured on the basis of the smallest value of power required for the PUSCH and the upper limit value of the power for the PUSCH including the UCI of the certain serving cell k belonging to the SCG. When the excess power allocatable to the power for the PUSCH including the UCI of the certain serving cell k belonging to the SCG is smaller than a prescribed value (or threshold) with respect to power required for the PUSCH, the transmission of the PUSCH including the UCI for the certain serving cell k belonging to the SCG may be dropped.

When the power required for the PUSCH including the UCI of the serving cell k belonging to the SCG is larger than the upper limit value of the power for the PUSCH including the UCI of the serving cell k, with respect to the power required for the PUSCH including the UCI of the serving cell k, a scaling factor is calculated so that the power does not exceed the upper limit value of power for the PUSCH including the UCI of the serving cell k, and the factor is applied to the power required for the PUSCH including the UCI of the serving cell k. When scaling of the power required for the PUSCH including the UCI of the serving cell k is performed, in other words, the scaling factor is applied to the power required for the PUSCH including the UCI of the serving cell k, it is not necessary to allocate power to other uplink physical channels (for example, a PUSCH not including the UCI).

Next, power for a PUSCH not including the UCI of a certain serving cell c belonging to the MCG, in other words, only including UL-SCH data is allocated. Note that the power for the PUSCH not including the UCI of the certain serving cell c belonging to the MCG may be called $P_{PUSCH, c, MCG}$. Note that the certain serving cell c belonging to the MCG is a serving cell different from the pSCell and the serving cell k, in other words, from a serving cell belonging to the SCG and from the above-described serving cell j. $P_{PUSCH, c, MCG}$ is allocated unless the total transmit power (total of $P_{PUCCH}$, $P_{PUSCH, j}$, and $P_{PUSCH, c}$ in the MCG, in other words, total of $P_{PUCCH, MCG}$, $P_{PUSCH, j, MCG}$, and $P_{PUSCH, c, MCG}$) at this time in the MCG exceeds a value obtained by subtracting the power already allocated to the SCG from $P_{CMAX}$. When the total transmit power exceeds the value, on the other hand, scaling is performed or it is dropped. When there is no transmission of PUSCH not including the UCI in the MCG, it is assumed that $P_{PUSCH, c, MCG}=0$. The UL-SCH data may be called a transport block.

When the MCG and the SCG are configured, in other words, a plurality of CGs are configured, the power $P_{PUSCH, c, MCG}$ for the PUSCH not including the UCI of the certain serving cell c belonging to the MCG is configured such that the power does not exceed the upper limit value ($P_{CMAX}$, or $P_{CMAX}-P_{PUCCH, MCG}$, or $P_{CMAX}-P_{PUSCH, j, MCG}$, or $P_{CMAX}-P_{PUCCH, MCG}-P_{PUSCH, j, MCG}$, or $P_{CMAX}-P_{CMAX, SCG}$, or $P_{CMAX}-P_{PUCCH, MCG}-P_{CMAX, SCG}$, or $P_{CMAX}-P_{PUCCH, MCG}-P_{PUSCH, j, MCG}-P_{CMAX, SCG}$) of power for the PUSCH not including the UCI of the certain serving cell c belonging to the MCG. In other words, $P_{PUSCH, c, MCG}$ is configured on the basis of the smallest value of power required for the PUSCH and the upper limit value of the power for the PUSCH not including the UCI of the certain serving cell c belonging to the MCG. When transmissions of PUSCHs not including the UCI occur simultaneously in a plurality of serving cells, the power is configured using the scaling factors having the same value so as not to exceed the smallest value. When the excess power allocatable to the power for the PUSCH not including the UCI of the certain serving cell c belonging to the MCG is smaller than a prescribed value (or threshold) with respect to power required for the PUSCH, the transmission of the PUSCH not including the UCI of the certain serving cell c belonging to the MCG may be dropped.

When the power required for the PUSCH not including the UCI of the serving cell c belonging to the MCG is larger than the upper limit value of the power for the PUSCH not including the UCI of the serving cell c, with respect to the power required for the PUSCH not including the UCI of the serving cell c, a scaling factor is calculated so that the power does not exceed the upper limit value of power for the PUSCH not including the UCI of the serving cell c, and the factor is applied to the power required for the PUSCH not including the UCI of the serving cell c. When scaling of the power required for the PUSCH not including the UCI of the serving cell c is performed, in other words, the scaling factor is applied to the power required for the PUSCH not including the UCI of the serving cell c, it is not necessary to allocate power to other uplink physical channels (for example, SRSs).

Next, power for a PUSCH not including the UCI of a certain serving cell d belonging to the SCG, in other words, only including the UL-SCH data is allocated. Note that the power for the PUSCH not including the UCI of the certain serving cell d belonging to the SCG may be called $P_{PUSCH, d, SCG}$. Note that the certain serving cell d belonging to the SCG is a serving cell different from the PCell, the serving cell j, and the serving cell c, in other words, from a serving cell belonging to the MCG, and is further different from the above-described serving cell k. $P_{PUSCH, d, SCG}$ is allocated unless the total transmit power (total of $P_{PUCCH}$, $P_{PUSCH, k}$, and $P_{PUSCH, d}$ in the SCG, in other words, total of $P_{PUCCH, SCG}$, $P_{PUSCH, k, SCG}$, and $P_{PUSCH, d, SCG}$) at this time in the SCG exceeds a value obtained by subtracting the power already allocated to the SCG from $P_{CMAX}$. When the total transmit power exceeds the value, on the other hand, scaling is performed or it is dropped. When there is no transmission of PUSCH not including the UCI in the SCG, it is assumed that $P_{PUSCH\ d, SCG}=0$.

When the MCG and the SCG are configured, in other words, a plurality of CGs are configured, the power $P_{PUSCH, d, SCG}$ for the PUSCH not including the UCI of the certain serving cell d belonging to the SCG is configured such that the power does not exceed the upper limit value ($P_{CMAX}$, $P_{CMAX}-P_{PUCCH, SCG}$, $P_{CMAX}-P_{PUSCH, k, SCG}$, $P_{CMAX}-P_{PUCCH, SCG}-P_{PUSCH, k, SCG}$, $P_{CMAX}-P_{CMAX, MCG}$, $P_{CMAX}-P_{PUCCH, SCG}-P_{CMAX, MCG}$, or $P_{CMAX}-P_{PUCCH, SCG}-P_{PUSCH, k, SCG}-P_{CMAX, MCG}$) of power for the PUSCH not including the UCI of the certain serving cell d belonging to the SCG. In other words, $P_{PUSCH, d, SCG}$ is configured on the basis of the smallest value of power required for the PUSCH and the upper limit value of the power for the PUSCH not including the UCI of the certain serving cell d belonging to the SCG. When the excess power allocatable to the power for the PUSCH not including the UCI of the certain serving cell d belonging to the SCG is smaller than a prescribed value (or threshold) with respect to power required for the PUSCH, the transmission of the PUSCH not including the UCI of the certain serving cell d belonging to the SCG may be dropped.

When the power required for the PUSCH not including the UCI of the certain serving cell d belonging to the SCG is larger than the upper limit value of the power for the PUSCH not including the UCI of the serving cell d, with respect to the power required for the PUSCH not including the UCI of the serving cell d, a scaling factor is calculated so that the power does not exceed the upper limit value of power for the PUSCH not including the UCI of the certain serving cell d, and the factor is applied to the power required for the PUSCH not including the UCI of the serving cell d. When scaling of the power required for the PUSCH not including the UCI of the serving cell d is performed, in other words, the scaling factor is applied to the power required for the PUSCH not including the UCI of the certain serving cell d, it is not necessary to allocate power to other uplink physical channels (for example, SRSs).

In a case in which the minimum guaranteed powers $P_{MCG}$ and $P_{SCG}$ are configured for the MCG and the SCG, respectively, when the excess power is much lower than the minimum guaranteed power in the power allocation to $P_{PUCCH, SCG}$, $P_{PUSCH, j, MCG}$, $P_{PUSCH, k, SCG}$, $P_{PUSCH, c, MCG}$, and $P_{PUSCH, d, SCG}$, it s not necessary to perform subsequent power allocation. For example, when the most of power is allocated to the transmit power of the PUCCH for each CG, it is not necessary to allocate power to the transmit power of the PUSCH for the MCG or the SCG. In other words, when satisfying $P_{MCG}$ (or $P_{SCG}$)$>>P_{CMAX}-P_{CMAX, MCG}-P_{CMAX, SCG}$ (or $P_{CMAX}-P_{CMAX, MCG}$, or $P_{CMAX}-P_{CMAX, SCG}$, the upper limit value of power for each uplink physical channel), it is not necessary to allocate power to the uplink physical channel for the MCG or the SCG. In other words, the transmission of the uplink physical channel to which power is not allocated may be dropped.

In a case in which the minimum guaranteed powers $P_{MCG}$ and $P_{SCG}$ are configured for the MCG and the SCG, respectively, when the excess power is much lower than the minimum guaranteed power in the power allocation to $P_{PUCCH, SCG}$, $P_{PUSCH, j, MCG}$, $P_{PUSCH, k, SCG}$, $P_{PUSCH, c, MCG}$, and $P_{PUSCH, d, SCG}$, it is not necessary to perform subsequent power allocation. For example, when the most of power is allocated to the transmit power of the PUCCH for each CG, it is not necessary to allocate power to the transmit power of the PUSCH for the MCG or the SCG. In other words, when satisfying power required for the uplink physical channel (PUSCH, PUCCH)$>>P_{CMAX}-P_{CMAX, MCG}-P_{CMAX, SCG}$ (or $P_{CMAX}-P_{CMAX, MCG}$, or $P_{CMAX}-P_{CMAX, SCG}$, the upper limit value of power for each uplink physical channel), it is not necessary to allocate power to the uplink physical channel for the MCG or the SCG. In other words, the transmission of the uplink physical channel to which power is not allocated may be dropped.

In a case in which the minimum guaranteed powers $P_{MCG}$ and $P_{SCG}$ are configured for the MCG and the SCG, respectively, and the power required for an uplink physical channel of a serving cell belonging to a certain CG exceeds the minimum guaranteed power of the certain CG, when the excess power is much lower than the minimum guaranteed power in the power allocation to $P_{PUCCH, SCG}$, $P_{PUSCH, j, MCG}$, $P_{PUSCH, k, SCG}$, $P_{PUSCH, c, MCG}$, and $P_{PUSCH, d, SCG}$, it is not necessary to perform subsequent power allocation. For example, when the most of power is allocated to the transmit power of the PUCCH for each CG, in other words, the excess power is very small, it is not necessary to allocate power to the transmit power of the PUSCH for the MCG or the SCG. In other words, when satisfying $P_{MCG}$ (or $P_{SCG}$)$>>P_{CMAX}-P_{CMAX, MCG}-P_{CMAX, SCG}$ (or $P_{CMAX}-P_{CMAX, MCG}$, or $P_{CMAX}-P_{CMAX, SCG}$, the upper limit value of power for each uplink physical channel), it is not necessary to allocate power to the uplink physical channel for the MCG or the SCG. In other words, the transmission of the uplink physical channel to which power is not allocated may be dropped.

When a plurality of CGs are configured and transmissions of a plurality of uplink physical channels overlap over CGs and/or in a CG, the upper limit value of power for the uplink physical channel changes according to the priority of the CG(s) and the priority of the uplink physical channel.

Note that above-described $P_{CMAX}$, $P_{CMAX, MCG}$, $P_{CMAX, SCG}$, $P_{PUCCH, SCG}$, $P_{PUSCH, j, MCG}$, $P_{PUSCH, k, SCG}$, $P_{PUSCH, c, MCG}$, $P_{PUSCH, d, SCG}$, and the like may be indicated by linear values other than relative values and ratios. For example, the units (also referred to as dimension) of the linear values may be dBm, W, and mW.

In one example described above, a case in which the power scaling is applied to the allocated power to the channel when the total transmit power at that time in the target CG exceeds a power value obtained by subtracting the total power already allocated to the other CG from $P_{CMAX}$ in the power allocation to the channel is described. As another example, the power scaling may be applied to the allocated power to the channel when required power for the target channel exceeds a power value obtained by subtracting the sum of the total power already allocated to the target CG and the total power already allocated to the other CG from $P_{CMAX}$.

A specific description is as follows. Description will be given below of another example in which required power is calculated for each channel first, power scaling is performed while excess power is allocated. Note that, in the following description, some contents overlapping the description in one example described above are omitted. Here, a similar priority rule as that described above can be used for excess power allocation among CGs. The excess power is allocated to the channels in the order based on the priority rule. In the allocation, the power scaling may be applied when required power for the target channel exceeds the power value obtained by subtracting the sum of the total power already allocated to the target CG and the total power already allocated to the other CG from $P_{CMAX}$. Regardless of whether the power scaling is performed or not, the power value allocated is subtracted from the excess power when the allocated power is to the target channel. These steps are repeated until no excess power is left.

First, power for a PUCCH of a certain serving cell (for example, PCell) belonging to the MCG is allocated. The power for the PUCCH of the certain serving cell belonging to the MCG may be called $P_{PUCCH, MCG}$. When the power required for the PUCCH of the certain serving cell belonging to the MCG does not exceed $P_{CMAX}$ or $P_{CMAX, c}$, $P_{PUCCH}$ of the MCG is allocated. When the power required for the PUCCH of the certain serving cell belonging to the MCG exceeds $P_{CMAX}$ or $P_{CMAX, c}$, $P_{PUCCH}$ of the MCG is scaled and allocated. When there is no PUCCH transmission in the MCG, it is assumed that $P_{PUCCH, MCG}=0$.

Next, power for a PUCCH of a certain serving cell (for example, pSCell) belonging to the SCG is allocated. The power for the PUCCH of the certain serving cell (for example, pSCell) belonging to the SCG may be called $P_{PUCCH}$ SCG Note that the PCell and pSCell are different serving cells from each other. $P_{PUCCH}$ of the SCG is allocated unless the power required for the PUCCH in the SCG exceeds a value obtained by subtracting the power already allocated to the MCG from $P_{CMAX}$. When the total transmit power exceeds the value, on the other hand, scaling is performed or it is dropped. When there is no PUCCH transmission in the SCG, it is assumed that $P_{PUCCH, SCG}=0$.

Next, power for a PUSCH including a UCI of the certain serving cell j belonging to the MCG is allocated. The power for the PUCCH including the UCI of the certain serving cell j belonging to the MCG may be called $P_{PUSCH, MCG}$ Note that the certain serving cell j belonging to the MCG is a serving cell different at least from the pSCell, in other words, from a serving cell belonging to the SCG. $P_{PUSCH, j, MCG}$ is allocated unless the total of $P_{PUSCH, j}$ in the MCG (in other words, total of $P_{PUSCH, j, MCG}$) exceeds a value obtained by subtracting the sum of the power already allocated to the MCG and the power already allocated to the SCG from $P_{CMAX}$. When the total transmit power exceeds the value, on the other hand, scaling is performed or it is dropped. When there is no PUSCH transmission including the UCI in the MCG, it is assumed that $P_{PUSCH, j, MCG}=0$.

Next, power for a PUSCH including a UCI of the serving cell k belonging to the SCG is allocated. The power for the PUSCH including the UCI of the certain serving cell k belonging to the SCG may be called $P_{PUSCH, k}$, SCG. Note that the certain serving cell k belonging to the SCG is a serving cell different from the PCell and the serving cell j, in other words, from a serving cell belonging to the MCG. $P_{PUSCH, j, SCG}$ is allocated unless the total of $P_{PUSCH, k}$ in the SCG (in other words, total of $P_{PUSCH, j, SCG}$) exceeds a value obtained by subtracting the sum of the power already allocated to the MCG and the power already allocated to the SCG from $P_{CMAX}$. When the total transmit power exceeds the value, on the other hand, scaling is performed or it is dropped. When there is no transmission of PUSCH including the UCI in the SCG, it is assumed that $P_{PUSCH, k, SCG}=0$.

Next, power for a PUSCH not including the UCI of the certain serving cell c belonging to the MCG, in other words, only including UL-SCH data is allocated. Note that the power for the PUSCH not including the UCI of the certain serving cell c belonging to the MCG may be called $P_{PUSCH, c, MCG}$. Note that the certain serving cell c belonging to the MCG is a serving cell different from the pSCell and the serving cell k, in other words, from a serving cell belonging to the SCG and from the above-described serving cell j. $P_{PUSCH, c, MCG}$ is allocated unless the total of $P_{PUSCH, c}$ in the MCG (in other words, total of $P_{PUSCH, c, MCG}$) exceeds a value obtained by subtracting the sum of the power already allocated to the MCG and the power already allocated to the SCG from $P_{CMAX}$. When the total transmit power exceeds the value, on the other hand, scaling is performed or it is dropped. When there is no transmission of PUSCH not including the UCI in the MCG, it is assumed that $P_{PUSCH, c, MCG}=0$. The UL-SCH data may be called a transport block.

Next, power for a PUSCH not including the UCI of the certain serving cell d belonging to the SCG, in other words, only including the UL-SCH data is allocated. Note that the power for the PUSCH not including the UCI of the certain serving cell d belonging to the SCG may be called $P_{PUSCH, d, SCG}$. Note that the certain serving cell d belonging to the SCG is a serving cell different from the PCell, the serving cell j, and the serving cell c, in other words, from a serving cell belonging to the MCG, and is further different from the above-described serving cell k. $P_{PUSCH, d, SCG}$ is allocated unless the total of $P_{PUSCH, d}$ in the SCG (in other words, total of $P_{PUSCH, d, SCG}$) exceeds a value obtained by subtracting the sum of the power already allocated to the MCG and the power already allocated to the SCG from $P_{CMAX}$. When the total transmit power exceeds the value, on the other hand, scaling is performed or it is dropped. When there is no transmission of PUSCH not including the UCI in the SCG, it is assumed that $P_{PUSCH, d, SCG}=0$.

As another example, the power allocation to the target channel can be determined by further taking the guaranteed power configured for each CG into consideration in the above-described method. For example, when required power for the target channel exceeds a power value obtained by subtracting the sum of power regarding the target CG and power regarding the other CG from $P_{CMAX}$, the power scaling may be applied to the allocated power to the channel. The power regarding the target CG is the maximum value of the total power already allocated to the target CG and the guaranteed power for the target CG. The power regarding the other CG is the maximum value of the total power already allocated to the other CG and the guaranteed power for the other CG.

A specific description is as follows. Description will be given below of another example in which required power is calculated for each channel first, power scaling is performed while excess power is allocated. Note that, in the following description, some contents overlapping the description in one example described above are omitted. Here, a similar priority rule as that described above can be used for excess power allocation among CGs. The excess power is allocated to the channels in the order based on the priority rule. In the allocation, the power scaling is applied when required power for the target channel exceeds the power value obtained by subtracting the sum of the power regarding the target CG and the power regarding the other CG from $P_{CMAX}$. Regardless of whether the power scaling is performed or not, the allocated power value is subtracted from the excess power when power is allocated to the target channel. These steps are repeated until no excess power is left.

Note that, in the following description, the power regarding the MCG is the maximum value of the total power already allocated to the MCG and the guaranteed power for the MCG. The power regarding the SCG is the maximum value of the total power already allocated to the SCG and the guaranteed power for the SCG.

First, power for a PUCCH of a certain serving cell (for example, PCell) belonging to the MCG is allocated. The power for the PUCCH of the certain serving cell belonging to the MCG may be called $P_{PUCCH, MCG}$. When the power required for the PUCCH of the certain serving cell belonging to the MCG does not exceed $P_{CMAX}$ or $P_{CMAX, c}$, $P_{PUCCH}$ of the MCG is allocated. When the power required for the PUCCH of the certain serving cell belonging to the MCG exceeds $P_{CMAX}$ or $P_{CMAX, c}$, $P_{PUCCH}$ of the MCG is scaled and allocated. When there is no PUCCH transmission in the MCG, it is assumed that $P_{PUCCH, MCG}=0$.

Next, power for a PUCCH of a certain serving cell (for example, pSCell) belonging to the SCG is allocated. Here, the power for the PUCCH of the certain serving cell (for example, pSCell) belonging to the SCG may be called $P_{PUCCH, SCG}$. Note that the PCell and pSCell are different serving cells from each other. $P_{PUCCH}$ of the SCG is allocated unless the power required for the PUCCH in the SCG exceeds a value obtained by subtracting the power regarding, the MCG from $P_{CMAX}$. When the total transmit power exceeds the value, on the other hand, scaling is performed or it is dropped. When there is no PUCCH transmission in the SCG, it is assumed that $P_{PUCCH, SCG}=0$.

Next, power for a PUSCH including a UCI of a certain serving cell j belonging to the MCG is allocated. Here, the power for the PUSCH including the UCI of the certain serving cell j belonging to the MCG may be called $P_{PUSCH, MCG}$. Note that the certain serving cell j belonging to the MCG is a serving cell different at least from the pSCell, in other words, from a serving cell belonging to the SCG. $P_{PUSCH, j, MCG}$ is allocated unless the total of $P_{PUSCH, j}$ in the MCG (in other words, total of $P_{PUSCH, j, MCG}$) exceeds a value obtained by subtracting the sum of the power regarding the MCG and the power regarding the SCG from $P_{CMAX}$. When the total transmit power exceeds the value, on the other hand, scaling is performed or it is dropped. When there is no PUSCH transmission including the UCI in the MCG, it is assumed that $P_{PUSCH, j, MCG}=0$.

Next, power for a PUSCH including a UCI of a certain serving cell k belonging to the SCG is allocated. Here, the power for the PUSCH including the UCI of the certain serving cell k belonging to the SCG may be called $P_{PUSCH, k, SCG}$. Note that the certain serving cell k belonging to the SCG is a serving cell different from the PCell and the serving cell j, in other words, from a serving cell belonging to the MCG. $P_{PUSCH, k, SCG}$ is allocated unless the total of $P_{PUSCH, k}$ in the SCG (in other words, total of $P_{PUSCH, k, SCG}$) exceeds a value obtained by subtracting the sum of the power regarding the MCG and the power regarding the SCG from $P_{CMAX}$. When the total transmit power exceeds the value, on the other hand, scaling is performed or it is dropped. When there is no transmission of PUSCH including the UCI in the SCG, it is assumed that $P_{PUSCH, k, SCG}=0$.

Next, power for a PUSCH not including the UCI of a certain serving cell c belonging to the MCG, in other words, only including UL-SCH data is allocated. Note that the power for the PUSCH not including the UCI of the certain serving cell c belonging to the MCG may be called $P_{PUSCH, c, MCG}$. Note that the certain serving cell c belonging to the MCG is a serving cell different from the pSCell and the serving cell k, in other words, from a serving cell belonging to the SCG and from the above-described serving cell j. $P_{PUSCH, c, MCG}$ is allocated unless the total of $P_{PUSCH, c}$ in the MCG (in other words, total of $P_{PUSCH, c, MCG}$) exceeds a value obtained by subtracting the sum of the power regarding the MCG and the power regarding the SCG from $P_{CMAX}$. When the total transmit power exceeds the value, on the other hand, scaling is performed or it is dropped. When there is no transmission of PUSCH not including the UCI in the MCG, it is assumed that $P_{PUSCH, c, MCG}=0$. The UL-SCH data may be called a transport block.

Next, power for a PUSCH not including the UCI of the certain serving cell d belonging to the SCG, in other words, only including the UL-SCH data is allocated. Note that the power for the PUSCH not including the UCI of the certain serving cell d belonging to the SCG may be called $P_{PUSCH, d, SCG}$. Note that the certain serving cell d belonging to the SCG is a serving cell different from the PCell, the serving cell j, and the serving cell c, in other words, from a serving cell belonging to the MCG, and is further different from the above-described serving cell k. $P_{PUSCH, d, SCG}$ is allocated unless the total of $P_{PUSCH, d}$ in the SCG (in other words, total of $P_{PUSCH, d, SCG}$) exceeds a value obtained by subtracting the sum of the power regarding the MCG and the power regarding the SCG from $P_{CMAX}$. When the total transmit power exceeds the value, on the other hand, scaling is performed or it is dropped. When there is no transmission of PUSCH not including the UCI in the SCG, it is assumed that $P_{PUSCH, d, SCG}=0$.

The base station device assumes the maximum output power $P_{CMAX}$ configured by the terminal device, from a power headroom report, and assumes the upper limit value of power for each uplink physical channel on the basis of the uplink physical channel received from the terminal device. The base station device determines a value of a transmit power control command for the uplink physical channel on the basis of the assumptions and transmits the value to the terminal device by using the PDCCH having a downlink control information format. With these operations, power adjustment for the transmit power of the uplink physical channel transmitted from the terminal device is performed.

In the terminal device, when required power for the target uplink physical channel exceeds the power value obtained by subtracting the sum of the total power already allocated to the target CG and the total power already allocated to the other CG from $P_{CMAX}$, the power scaling is applied to the required power for the target uplink physical channel not to exceed the subtracted power value. In this case, the power for the target uplink physical channel is configured not to exceed the subtracted power value. When the request power for the target uplink physical channel does not exceed the subtracted power value, the request power is allocated.

In the terminal device, when the required power for the target uplink physical channel exceeds the power value obtained by subtracting the sum of a first maximum value of the total power already allocated to the target CG and the minimum guaranteed power, and a second maximum value of the total power already allocated to the other CG, from $P_{CMAX}$, the power scaling is applied to the required power for the target uplink physical channel. In this case, the power for the target uplink physical channel is configured not to exceed the subtracted power value. When the request power for the target uplink physical channel does not exceed the subtracted power value, the request power is allocated.

Note that, in the above-described embodiments, the power required for each PUSCH transmission is described as being calculated on the basis of the parameters configured by a higher layer, an adjustment value determined on the basis of the number of PRBs allocated to the PUSCH transmission by resource assignment, downlink path loss and a coefficient by which the path loss is multiplied, an adjustment value determined on the basis of the parameter indicating the offset of the MCS applied to the UCI, a value based on a TPC command, and the like. The power value required for each PUCCH transmission has been described under the assumption that the value is calculated on the basis of the parameters configured by a higher layer, downlink path loss, an adjustment value determined on the basis of the UCI transmitted by the PUCCH, an adjustment value determined on the basis of the PUCCH format, an adjustment value determined on the basis of the number of antenna ports used for transmission of the PUCCH, and a value based on a TPC command. However, the required power values are not limited to these. An upper limit value may be set for the required power value, and the smallest value of the value based on the above-described parameters and the upper limit value (e.g., $P_{CMAX, c}$, which is the maximum output power value of the serving cell c) may be used as the required power value.

Although the description has been given of the case where the serving cells are grouped into connectivity groups in the above-described embodiments, the configuration is not limited to this. For example, it is possible to group, in a plurality of serving cells, only downlink signals or only uplink signals. In this case, connectivity identifiers are configured for downlink signals or uplink signals. It is also possible to group downlink signals and uplink signals separately. In this case, connectivity identifiers are configured separately for downlink signals and uplink signals. Alternatively, it is possible to group downlink component carriers or group uplink component carriers. In this case, connectivity identifiers are configured separately for component carriers.

Moreover, although the description has been given by using connectivity groups in each of the above-described embodiments, a set of serving cells provided by the same base station device (transmission point) need not always be defined by using a connectivity group. Connectivity identifiers or cell indices may be used for defining instead of connectivity groups. For example, in the case of using connectivity identifiers for defining, each connectivity group in each of the above-described embodiments may be rephrased as a set of serving cells having the same connectivity identifier value. In the case of using cell indices for defining, each connectivity group in each of the above-described embodiments may be rephrased as a set of serving cells having a prescribed cell index value (or a cell index value within a prescribed range).

Moreover, although the description has been given in each of the above-described embodiments by using the terms "primary cell" and "PS cell", these terms need not always be used. For example, "primary cell" in each of the above-described embodiments may be referred to as "master cell", and "PS cell" in each of the above-described embodiments may be referred to as "primary cell".

A program running on each of the base station device 2-1 or base station device 2-2 and the terminal device 1 according to the present invention may be a program that controls a central processing unit (CPU) and the like (a program for causing a computer to operate) in such a manner as to realize the functions according to the above-described embodiments of the present invention. The information handled in these devices is temporarily stored in a random access memory (RAM) while being processed. Thereafter, the information is stored in various types of read only memory (ROM) such as a flash ROM or a hard disk drive (HDD) and when necessary, is read by the CPU to be modified or rewritten.

Moreover, the terminal device 1 and the base station device 2-1 or base station device 2-2 according to the above-described embodiments may be partially realized by the computer. This configuration may be realized by recording a program for realizing such control functions on a computer-readable recording medium and causing a computer system to read the program recorded on the recording medium for execution.

Moreover, the "computer system" here is defined as a computer system built into the terminal device 1 or the base station device 2-1 or base station device 2-2, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 2-1 or the base station device 2-2 according to the above-described embodiments can be realized as an aggregation (a device group) constituted of a plurality of devices. Devices constituting the device group may be each equipped with some or all portions of each function or each functional block of the base station device 2-1 or the base station device 2-2 according to the above-described embodiments. It is only required that the device group itself include general functions or general functional blocks of the base station device 2-1 or the base station device 2-2. Furthermore, the terminal device 1 according to the above-described embodiments can also communicate with the base station device as the aggregation.

Furthermore, the base station device 2-1 or the base station device 2-2 according to the above-described embodiments may be an evolved universal terrestrial radio access network (E-UTRAN). Furthermore, the base station device 2-1 or the base station device 2-2 according to the above-described embodiments may have some or all portions of a function of a higher node for an eNodeB.

Furthermore, some or all portions of each of the terminal device 1 and the base station device 2-1 or the base station device 2-2 according to the above-described embodiments may be typically realized as a large-scale integration (LSI) that is an integrated circuit or may be realized as a chip set. The functional blocks of each of the terminal device 1 and the base station device 2-1 or the base station device 2-2 may be individually realized as a chip, or some or all of the functional blocks may be integrated into a chip. Furthermore, a circuit integration technique is not limited to the LSI, and may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiments, the cellular mobile station device is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, a change to a design that falls within the scope that does not depart from the gist of the present invention. Furthermore, various modifications are possible within the scope of claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

Note that the present invention includes the following features.

(1) A terminal device according to an aspect of the present invention is a terminal device communicating with a base station device. The terminal device includes a transmission unit that, if transmission of a physical uplink control channel (PUCCH) of a first cell group (CG) overlaps transmission of a physical uplink shared channel (PUSCH) and/or a PUCCH of a second CG in a certain subframe and uplink control information (UCI) including hybrid auto repeat request-acknowledgement (HARQ-ACK) is transmitted in the PUCCH of the first CG, upon transmit power of the PUCCH of the first CG exceeding a first upper limit value, performs scaling on the transmit power of the PUCCH of the first CG such that the transmit power of the PUCCH does not exceed the first upper limit value, and upon the transmit power of the PUCCH of the first CG not exceeding the first upper limit value, sets the transmit power of the PUCCH of the first CG to power required for the PUCCH of the first CG.

(2) A terminal device according to an aspect of the present invention is the terminal device described above. In such a device, the transmission unit, upon UCI not including the HARQ-ACK being transmitted with the transmit power of the PUCCH of the first CG and the transmit power of the PUCCH of the first CG exceeding a second upper limit value, performs scaling on the transmit power of the PUCCH of the first CG such that the transmit power of the PUCCH does not exceed the second upper limit value, upon the transmit power of the PUCCH of the first CG not exceeding the second upper limit value, sets the transmit power of the PUCCH of the first CG to the power required for the PUCCH of the first CG, and the second upper limit value does not exceed the first upper limit value.

(3) A terminal device according to an aspect of the present invention is the terminal device described above. In such a device, the transmission unit, if the UCI is transmitted on the PUSCH in a first serving cell belonging to the first CG, upon transmit power of the PUSCH exceeding the first upper limit value, performs scaling on the transmit power of the PUSCH such that the transmit power of the PUSCH does not exceed the first upper limit value, and upon the transmit power of the PUSCH not exceeding the first upper limit value, sets the transmit power of the PUSCH to power required for the PUSCH.

(4) A terminal device according to an aspect of the present invention is the terminal device described above. The terminal device includes a reception unit that receives a first parameter regarding guaranteed power for the first CG and a second parameter regarding correction power for the second CG through a higher layer signal, wherein the transmission unit determines the first upper limit value and the second upper limit value on the basis of the first parameter and the second parameter.

(5) A method according to an aspect of the present invention is a method in a terminal device configured to communicate with a base station device. The method includes the steps of: if transmission of a physical uplink control channel (PUCCH) of a first cell group (CG) overlaps transmission of a physical uplink shared channel (PUSCH) and/or a PUCCH of a second CG in a certain subframe and uplink control information (UCI) including hybrid auto repeat request-acknowledgement (HARQ-ACK) is transmitted on the PUCCH of the first CG, upon transmit power of the PUCCH of the first CG exceeding a first upper limit value, scaling the transmit power of the PUCCH of the first CG such that the transmit power of the PUCCH does not exceed the first upper limit value; and upon the transmit power of the PUCCH of the first CG not exceeding the first upper limit value, setting the transmit power of the PUCCH of the first CG to power required for the PUCCH of the first CG.

(6) A method according to an aspect of the present invention is the method described above. The method includes the steps of: upon UCI not including the HARQ-ACK being transmitted with the transmit power of the PUCCH of the first CG and the transmit power of the PUCCH of the first CG exceeding a second upper limit value, scaling the transmit power of the PUCCH of the first CG such that the transmit power of the PUCCH does not exceed the second upper limit value; and upon the transmit power of the PUCCH of the first CG not exceeding the second upper limit value, setting the transmit power of the PUCCH of the first CG to the power required for the PUCCH of the first CG, wherein the second upper limit value does not exceed the first upper limit value.

(7) A method according to an aspect of the present invention is the method described above. The method includes the steps of: if the UCI is transmitted on the PUSCH in a first serving cell belonging to the first CG, upon transmit power of the PUSCH exceeding the first upper limit value, scaling the transmit power of the PUSCH such that the transmit power of the PUSCH does not exceed the first upper limit value; and upon the transmit power of the PUSCH not exceeding the first upper limit value, setting the transmit power of the PUSCH to power required for the PUSCH.

(8) A method according to an aspect of the present invention is the method described above. The method includes the steps of: receiving a first parameter regarding guaranteed power for the first CG and a second parameter regarding correction power for the second CG through a higher layer signal; and determining the first upper limit value and the second upper limit value on the basis of the first parameter and the second parameter.

(9) A base station device according to an aspect of the present invention is a base station device configured to communicate with a terminal device. The base station device includes a transmission unit that transmits a first parameter regarding guaranteed power for a first cell group (CG) and a second parameter regarding guaranteed power for a second CG through a higher layer signal.

(10) A method according to an aspect of the present invention is a method in a base station device configured to communicate with a terminal device. The method includes the step of transmitting a first parameter regarding guaranteed power for a first cell group (CG) and a second parameter regarding guaranteed power for a second CC through a higher layer signal.

(11) An aspect of the present invention is a terminal device configured to communicate with a base station device. The terminal device includes: a higher-layer processing unit configuring a first cell group and a second cell group, and configuring first guaranteed power being guaranteed power in the first cell group and second guaranteed power being guaranteed power in the second cell group; and an uplink subframe generation unit generating an uplink physical channel in the first cell group and an uplink physical channel in the second cell group, wherein when determining transmit power of the uplink physical channels in the first cell group and the second cell group, transmit power of a first physical uplink control channel in a serving cell belonging to the first cell group is calculated on the basis of a first smallest value that is the smallest value of power required for the first physical uplink control channel and a first upper limit value, and transmit power of a second physical uplink control channel in a serving cell belonging to the second cell group is calculated on the basis of a second smallest value that is the smallest value of power required for the second physical uplink control channel, and a second upper limit value obtained from the first upper limit value and the first smallest value.

(12) A terminal device according to an aspect of the present invention is the terminal device described above. In such a device, transmit power of a first physical uplink shared channel including uplink control information in a first serving cell belonging to the first cell group is calculated on the basis of a third smallest value that is the smallest value of power required for the first physical uplink shared channel, and a third upper limit value obtained from the second upper limit value and the second smallest value.

(13) A terminal device according to an aspect of the present invention is the terminal device described above. In such a device, transmit power of a second physical uplink shared channel including uplink control information in a second serving cell belonging to the second cell group is calculated on the basis of a fourth smallest value that is the smallest value of power required for the second physical uplink shared channel, and a fourth upper limit value obtained from the third upper limit value and the third smallest value.

(14) A terminal device according to an aspect of the present invention is the terminal device described above. In such a device, if minimum guaranteed power is configured for the first cell group and/or the second cell group, the terminal device compares each of the second upper limit value, the third upper limit value, and the fourth upper limit value with the minimum guaranteed power, and upon one or more of the upper limit values are less than a prescribed value with respect to the minimum guaranteed power, transmits no uplink physical channel corresponding to the upper limit values.

(15) A method according to an aspect of the present invention is a method in a terminal device configured to communicate with a base station device. The method includes the steps of: configuring a first cell group and a second cell group; configuring first guaranteed power being guaranteed power in the first cell group and second guaranteed power being guaranteed power in the second cell group; generating an uplink physical channel in the first cell group and an uplink physical channel in the second cell group; and when determining transmit power of the uplink physical channels in the first cell group and the second cell group, calculating transmit power of a first physical uplink control channel in a serving cell belonging to the first cell group on the basis of a first smallest value that is the smallest value of power required for the first physical uplink control channel and a first upper limit value; and calculating transmit power of a second physical uplink control channel in a serving cell belonging to the second cell group on the basis of a second smallest value that is the smallest value of power required for the second physical uplink control channel, and a second upper limit value obtained from the first upper limit value and the first smallest value.

(16) A method according to an aspect of the present invention is the method described above. The method includes the step of calculating transmit power of a first physical uplink shared channel including uplink control information in a first serving cell belonging to the first cell group on the basis of a third smallest value that is the smallest value of power required for the first physical uplink shared channel, and a third upper limit value obtained from the second upper limit value and the second smallest value.

(17) A method according to an aspect of the present invention is the method described above. The method includes the step of calculating transmit power of a second physical uplink shared channel including uplink control information in a second serving cell belonging to the second cell group on the basis of a fourth smallest value that is the smallest value of power required for the second physical uplink shared channel, and a fourth upper limit value obtained from the third upper limit value and the third smallest value.

(18) A method according to an aspect of the present invention is the method described above. The method includes the step of, if minimum guaranteed power is configured for the first cell group and/or the second cell group, comparing each of the second upper limit value, the third upper limit value, and the fourth upper limit value with the minimum guaranteed power, and upon one or more of the upper limit values are less than a prescribed value with respect to the minimum guaranteed power, transmitting no uplink physical channel corresponding to the upper limit values.

(19) A base station device according to an aspect of the present invention is a base station device configured to communicate with a terminal apparatus. The base station device includes: a higher-layer processing unit configuring a serving cell belonging to a first cell group and a serving cell belonging to a second cell group, configuring first guaranteed power for the first cell group and second guaranteed power for the second cell group, and configuring transmit power, with respect to the terminal device, for each uplink physical channel of the serving cell belonging to the first cell group and the serving cell belonging to the second cell group, wherein, when configuring transmit power of a first physical uplink control channel in the first cell group and a second physical uplink control channel in the second cell group, a value of a transmit power control command for the first physical uplink control channel in the serving cell belonging to the first cell group is determined on the basis of a first upper limit value, a value of a transmit power control command for the second physical uplink control channel in the serving cell belonging to the second cell group is determined on the basis of a second upper limit value, and the first upper limit and the second upper limit are configured on the basis of maximum output power configured in the terminal device, and the first guaranteed power and/or the second guaranteed power.

(20) A base station device according to an aspect of the present invention is a method in a base station device configured to communicate with a terminal apparatus. The method includes the steps of: configuring a serving cell belonging to a first cell group and a serving cell belonging to a second cell group; configuring first guaranteed power for the first cell group and second guaranteed power for the second cell group; configuring transmit power, with respect to the terminal device, for each uplink physical channel of the serving cell belonging to the first cell group and the serving cell belonging to the second cell group; and when configuring transmit power of a first physical uplink control channel in the first cell group and a second physical uplink control channel in the second cell group, determining a value of a transmit power control command for the first physical uplink control channel in the serving cell belonging to the first cell group on the basis of a first upper limit value; determining a value of a transmit power control command for the second physical uplink control channel in the serving cell belonging to the second cell group on the basis of a second upper limit value, and configuring the first upper limit and the second upper limit on the basis of maximum output power configured in the terminal device, and the first guaranteed power and/or the second guaranteed power.

INDUSTRIAL APPLICABILITY

As have been described above, the terminal device, the base station device and the method according to the present invention are useful to improve transmission efficiency in a radio communication system.

REFERENCE SIGNS LIST

501 Higher layer
502 Control unit
503 Codeword generation unit
504 Downlink subframe generation unit
505 Downlink reference signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606, 1006 Control unit
607, 1007 Higher layer
608 Channel state measurement unit
609, 1009 Uplink subframe generation unit
610 Uplink control information generation unit
611, 612, 1011 SC-FDMA signal transmission unit
613, 614, 1013 Transmit antenna

The invention claimed is:

1. A terminal device comprising:
a transmitter which transmits a physical uplink control channel (PUCCH) and/or a physical uplink shared channel (PUSCH) in a subframe, wherein
in a first case that the PUCCH is transmitted in a subframe of a first cell group and the PUSCH is transmitted in a subframe of a second cell group, wherein the first cell group is a master cell group (MCG) and the second cell group is a secondary cell group (SCG), in a second case that the PUCCH is transmitted with uplink control information including hybrid auto repeat request acknowledgement (HARQ-ACK), and in a third case that transmit power of the PUCCH exceeds a first threshold, the transmitter scales the transmit power of the PUCCH by applying a scaling factor only to the PUCCH such that the transmit power of the PUCCH does not exceed the first threshold,
in the first case, in the second case, and in a fourth case that transmit power of the PUCCH does not exceed the first threshold, the transmitter sets transmit power for transmission of the PUCCH,
in a fifth case that a PUSCH of the first cell group is transmitted with the uplink control information including the HARQ-ACK, and in a sixth case that a transmit power of the PUSCH exceeds the first threshold, the transmitter scales the transmit power of the PUSCH such that the transmit power of the PUSCH does not exceed the first threshold,
in the fifth case, and in a seventh case that a transmit power of the PUSCH does not exceed the first threshold, the transmitter sets transmit power for transmission of the PUSCH,
in an eighth case that a PUSCH of the first cell group is transmitted without the uplink control information, in a ninth case that a transmit power of the PUSCH exceeds a second threshold, the transmitter scales the transmit power of the PUSCH such that the transmit power of the PUSCH does not exceed the second threshold,
the first threshold is based on a configured maximum output power $P_{CMAX}$ that is a physical-layer maximum output power, and
the second threshold is based on the $P_{CMAX}$ and transmit power allocated to the second cell group.

2. A method of a terminal device, the method comprising:
(i) transmitting a physical uplink control channel (PUCCH) and/or a physical uplink shared channel (PUSCH) in a subframe, wherein
in a first case that the PUCCH is transmitted in a subframe of a first cell group and the PUSCH is transmitted in a subframe of a second cell group, wherein the first cell group is a master cell group (MCG) and the second cell group is a secondary cell group (SCG), in a second case that the PUCCH is transmitted with uplink control information including hybrid auto repeat request acknowledgement (HARQ-ACK), and in a third case that transmit power of the PUCCH exceeds a first threshold, (ii) scaling the transmit power of the PUCCH by applying a scaling factor only to the PUCCH such that the transmit power of the PUCCH does not exceed the first threshold,
in the first case, in the second case, and in a fourth case that transmit power of the PUCCH does not exceed the first threshold, (iii) setting transmit power for transmission of the PUCCH,
in a fifth case that a PUSCH of the first cell group is transmitted with the uplink control information including the HARQ-ACK, and in a sixth case that a transmit power of the PUSCH exceeds the first threshold, the transmitter scales the transmit power of the PUSCH such that the transmit power of the PUSCH does not exceed the first threshold,
in the fifth case, and in a seventh case that a transmit power of the PUSCH does not exceed the first threshold, the transmitter sets transmit power for transmission of the PUSCH,
in an eighth case that a PUSCH of the first cell group is transmitted without the uplink control information, in a ninth case that a transmit power of the PUSCH exceeds a second threshold, the transmitter scales the transmit power of the PUSCH such that the transmit power of the PUSCH dos not exceed the second threshold,
the first threshold is based on a configured maximum output power $P_{CMAX}$ that is a physical-layer maximum output power, and
the second threshold is based on the $P_{CMAX}$ and transmit power allocated to the second cell group.

* * * * *